(12) United States Patent
Schreiter et al.

(10) Patent No.: US 12,474,345 B2
(45) Date of Patent: *Nov. 18, 2025

(54) CHEMIGENETIC VOLTAGE INDICATORS

(71) Applicant: HOWARD HUGHES MEDICAL INSTITUTE, Chevy Chase, MD (US)

(72) Inventors: Eric R. Schreiter, Leesburg, VA (US); Luke D. Lavis, Ashburn, VA (US); Ahmed Abdelfattah, Barrington, RI (US)

(73) Assignee: HOWARD HUGHES MEDICAL INSTITUTE, Chevy Chase, MD (US)

( * ) Notice: Subject to any disclaimer, the term of this patent is extended or adjusted under 35 U.S.C. 154(b) by 754 days.

This patent is subject to a terminal disclaimer.

(21) Appl. No.: 17/835,535

(22) Filed: Jun. 8, 2022

(65) Prior Publication Data
US 2022/0299518 A1    Sep. 22, 2022

Related U.S. Application Data

(63) Continuation of application No. 16/347,765, filed as application No. PCT/US2017/063998 on Nov. 30, 2017, now Pat. No. 11,385,236.
(Continued)

(51) Int. Cl.
*G01N 33/58* (2006.01)
*C07K 14/195* (2006.01)
(Continued)

(52) U.S. Cl.
CPC ......... *G01N 33/582* (2013.01); *C07K 14/195* (2013.01); *C07K 14/215* (2013.01);
(Continued)

(58) Field of Classification Search
CPC ............ G01N 33/582; G01N 21/6428; G01N 33/566; G01N 2021/6439; G01N 2333/726; C07K 14/195; C07K 14/215; C07K 14/43504; C07K 14/461; C07K 14/465; C07K 2319/60; C07K 2319/00;
(Continued)

(56) References Cited

U.S. PATENT DOCUMENTS 11,385,236 B2 *  7/2022  Schreiter .............. G01N 33/582
11,598,792 B2 *  3/2023  Schreiter ........ C12Y 308/01005
(Continued)

OTHER PUBLICATIONS

Bedbrook et al. Genetically Encoded Spy Peptide Fusion System to Detect Plasma Membrane-Localized Proteins In Vivo. Chemistry & Biology 22, 1108-1121, Aug. 20, 2015 (Year: 2015).*
(Continued)

*Primary Examiner* — Shafiqul Haq
(74) *Attorney, Agent, or Firm* — Stites & Harbison, PLLC; Mandy Wilson Decker

(57) ABSTRACT

Provided herein are a voltage indicator and a method of measuring voltage. The voltage indicator includes a membrane-localized voltage-sensitive protein coupled to a capture protein. The method of measuring voltage includes administering a voltage indicator including a membrane-localized voltage-sensitive protein coupled to a capture protein, and determining changes in fluorescence of a small-molecule fluorescent dye captured by the capture protein.

20 Claims, 20 Drawing Sheets

Specification includes a Sequence Listing.

Related U.S. Application Data

(60) Provisional application No. 62/428,066, filed on Nov. 30, 2016.

(51) Int. Cl.
| | |
|---|---|
| *C07K 14/215* | (2006.01) |
| *C07K 14/435* | (2006.01) |
| *C07K 14/46* | (2006.01) |
| *C07K 14/465* | (2006.01) |
| *C12N 9/14* | (2006.01) |
| *G01N 21/64* | (2006.01) |
| *G01N 33/566* | (2006.01) |

(52) U.S. Cl.
CPC ...... *C07K 14/43504* (2013.01); *C07K 14/461* (2013.01); *C07K 14/465* (2013.01); *C12N 9/14* (2013.01); *C12Y 308/01005* (2013.01); *G01N 21/6428* (2013.01); *G01N 33/566* (2013.01); *C07K 2319/60* (2013.01); *G01N 2021/6439* (2013.01)

(58) Field of Classification Search
CPC ........ C07K 14/405; C07K 14/47; C12N 9/14; C12Y 308/01005
See application file for complete search history.

(56) References Cited

U.S. PATENT DOCUMENTS 12,105,122 B2* 10/2024 Schreiter ................ G01R 15/22
2015/0301029 A1* 10/2015 Eggan ................ G01N 33/6872
435/34

OTHER PUBLICATIONS

Grimm et al. Bright photoactivatable fluorophores for single-molecule imaging. nature methods, vol. 13 No. 12, Dec. 2016, pp. 985-988. (Year: 2016).*

Jing et al. Chemical Tags for Labeling Proteins Inside Living Cells. Acc Chem Res. Sep. 20, 2011; 44(9): pp. 784-792. (Year: 2011).*

* cited by examiner

CHEMIGENETIC VOLTAGE INDICATORS

RELATED APPLICATIONS

This application is a continuation of U.S. patent application Ser. No. 16/347,765, which is now allowed, and which is a 371 of International Patent Application No. PCT/US17/63998, filed Nov. 30, 2017, which claims the benefit of U.S. Provisional Application Ser. No. 62/428,066, filed Nov. 30, 2016, the entire disclosures of which are incorporated herein by this reference.

SEQUENCE LISTING

This application contains a Sequence Listing which has been submitted in ASCII format via EFS-Web and is hereby incorporated by reference in its entirety. The ASCII copy of the Sequence Listing, which was created on Nov. 30, 2017, is named 18074N-16049.txt and is 112 kilobytes in size.

TECHNICAL FIELD

The presently-disclosed subject matter generally relates to voltage indicators and methods of use thereof. More specifically, the presently-disclosed subject matter relates to chemigenetic voltage indicators and methods of measuring voltage using chemigenetic voltage indicators.

BACKGROUND

Optical imaging of membrane potential allows direct visualization of the rapid electrical signals that neurons use to communicate. Because electrical signals in neurons are fast, current optical methods are limited by the number of photons that can be collected by an imaging camera for each image of a movie.[1] Therefore, voltage indicators that emit more photons during each image, and that do so over more images before irreversible photobleaching occurs, produce qualitative improvements in the accuracy and duration of voltage measurements.

The current collection of small-molecule voltage indicator dyes are bright and produce large changes in fluorescence with changes in cell membrane potential. However, they cannot easily be targeted to specific neurons, which limits their in vivo utility because all cell membranes are stained with the dye and no individual neurons can be seen clearly. Conversely, protein-based indicators (genetically encoded voltage indicators, GEVIs) can be targeted to individual neurons or specific populations of neurons, but have limited brightness and photostability.

Accordingly, there remains a need for targeted voltage indicators that produce increased brightness and photostability.

SUMMARY

The presently-disclosed subject matter meets some or all of the above-identified needs, as will become evident to those of ordinary skill in the art after a study of information provided in this document.

This Summary describes several embodiments of the presently-disclosed subject matter, and in many cases lists variations and permutations of these embodiments. This Summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently-disclosed subject matter, whether listed in this Summary or not. To avoid excessive repetition, this Summary does not list or suggest all possible combinations of such features.

In some embodiments, the presently-disclosed subject matter is directed to a voltage indicator. In some embodiments, the voltage indicator includes a membrane-localized voltage-sensitive protein coupled to a capture protein. In some embodiments, the capture protein is arranged and disposed to capture small-molecule fluorescent dyes. In one embodiment, the fluorescent dyes include azetidine-containing Janelia Fluor™ dyes. In another embodiment, the Janelia Fluor™ dyes are selected from the group consisting of Janelia Fluor™$_{505}$, Janelia Fluor™$_{525}$, Janelia Fluor™$_{549}$, Janelia Fluor™$_{585}$, Janelia Fluor™$_{646}$, and combinations thereof.

In some embodiments, the voltage sensitive protein is an opsin, such as, but not limited to, a microbial opsin. Suitable microbial opsins include, but are not limited to, QuasAr2, Ace2N, or a combination thereof. In some embodiments, the voltage sensitive protein includes at least one voltage-sensing domain selected from the group consisting of a Ciona intestinalis voltage-sensing domain (CiVSD), *Danio rerio* voltage-sensing domain (DrVSD), *Gallus gallus* voltage-sensing domain (GgVSD), and a combination thereof.

In some embodiments, capture protein is a covalent capture protein. In one embodiment, the covalent capture protein is selected from the group consisting of HaloTag, SNAP-tag, TMP-tag, βLac-tag, CLIP-tag, or a combination thereof. In some embodiments, the capture protein is a non-covalent capture protein. In one embodiment, the non-covalent capture protein is selected from the group consisting of TMP-tag, biotin-avidin, and a combination thereof.

In some embodiments, the presently-disclosed subject matter is directed to a method of measuring voltage, the method comprising administering a voltage indicator including a membrane-localized voltage-sensitive protein coupled to a capture protein, and determining changes in fluorescence of a small-molecule fluorescent dye captured by the capture protein. In some embodiments, the changes in fluorescence are observed with a microscope. In some embodiments, the method further comprises determining changes in voltage based upon changes in fluorescence.

In some embodiments, the voltage indicator further comprises a linker between the voltage-sensitive protein and the capture protein. In some embodiments, the method further comprises modifying a length of the linker. In one embodiment, modifying the length of the linker includes removing at least one amino acid residue. In another embodiment, removing at least one amino acid residue includes removing between 1 and 22 amino acid residues. In a further embodiment, modifying the length of the linker modifies the size of a fluorescence response.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are used, and the accompanying drawings of which:

DESCRIPTION OF EXEMPLARY EMBODIMENTS

Figure 1:
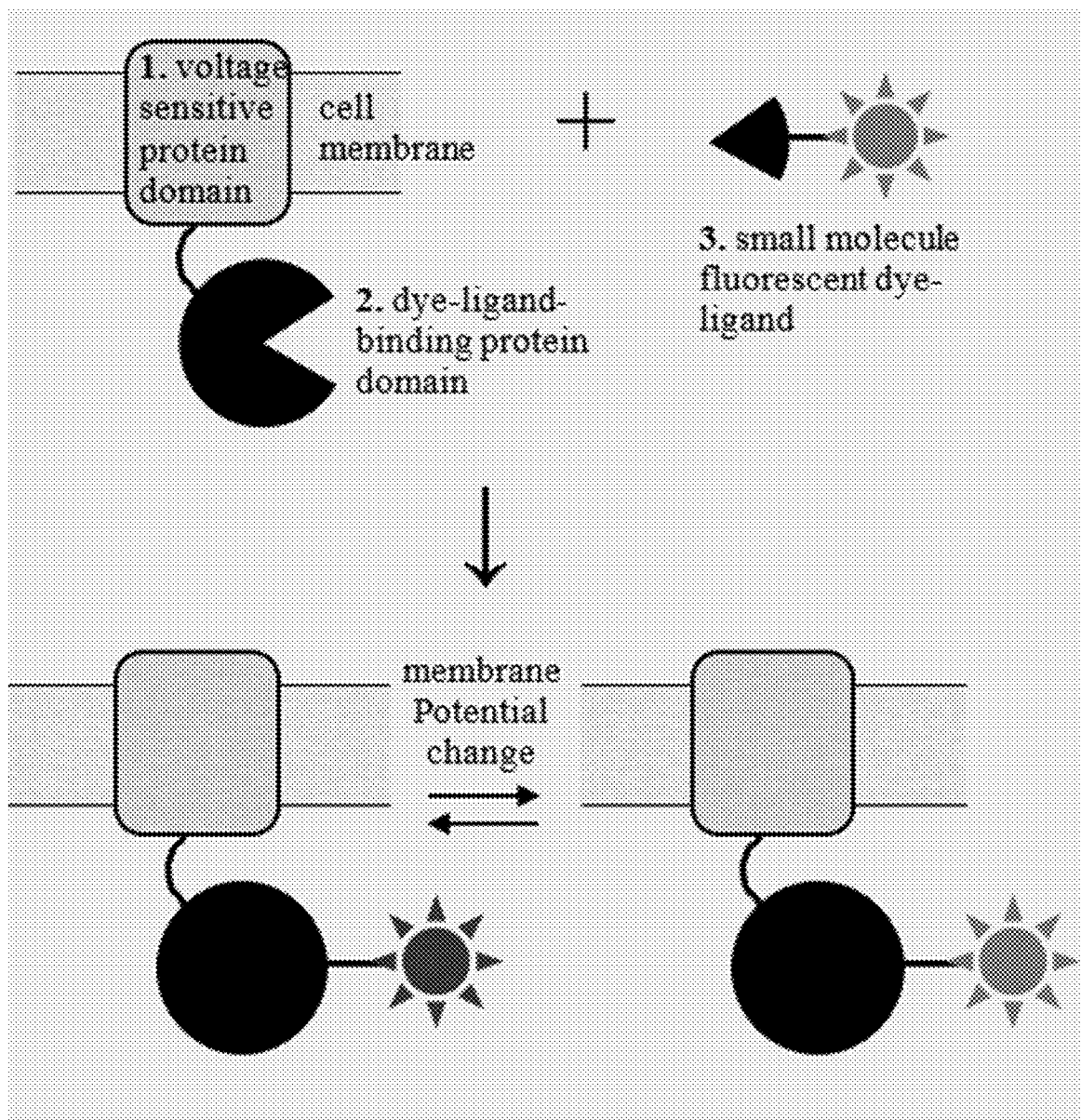
FIG. 1 is a schematic representation of the chemigenetic voltage indicators according to an embodiment of the disclosure.
Figure 2A:
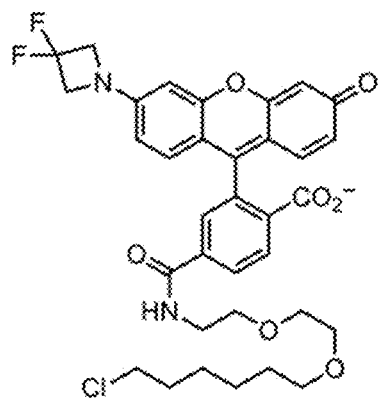
FIGS. 2A-F show chemical structures of various fluorescent dye-ligands according to an embodiment of the disclosure. The structures include $JF_{505}$-HaloTag ligand (FIG. 2A), $JF_{525}$-HaloTag ligand (FIG. 2B), $JF_{549}$-HaloTag ligand (FIG. 2C), $JF_{585}$-HaloTag ligand (FIG. 2D), $JF_{635}$-HaloTag ligand (FIG. 2E), and $JF_{549}$-SNAP-Tag ligand (FIG. 2F).
Figure 2B:
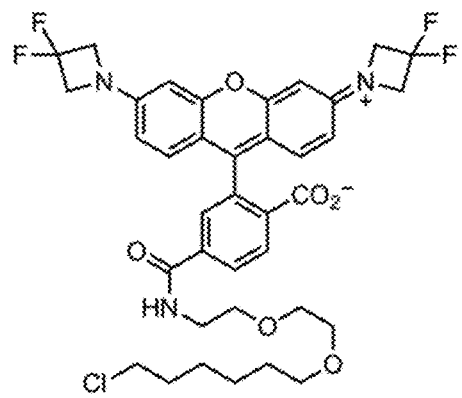
Figure 2C:
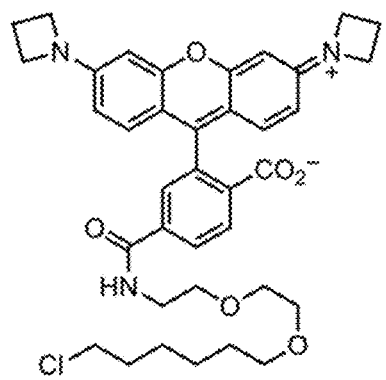
Figure 2D:
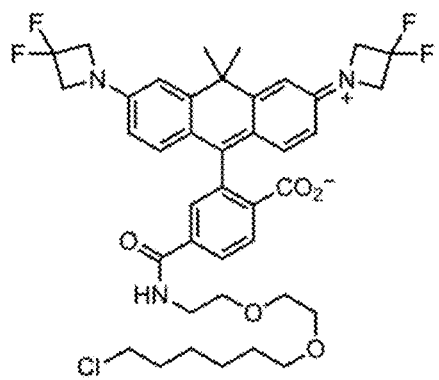
Figure 2E:
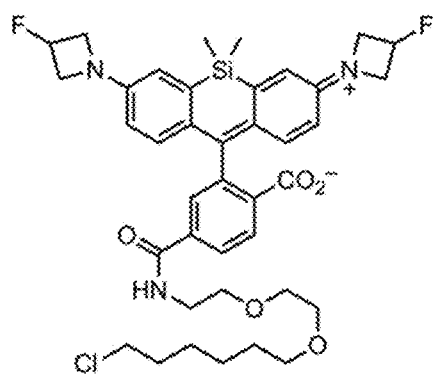
Figure 2F:
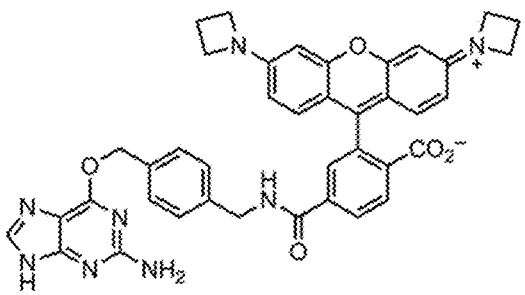

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

While the terms used herein are believed to be well understood by those of ordinary skill in the art, certain definitions are set forth to facilitate explanation of the presently-disclosed subject matter.

Unless defined otherwise, all technical and scientific terms used herein have the same meaning as is commonly understood by one of skill in the art to which the invention(s) belong.

All patents, patent applications, published applications and publications, GenBank sequences, databases, websites and other published materials referred to throughout the entire disclosure herein, unless noted otherwise, are incorporated by reference in their entirety.

Where reference is made to a URL or other such identifier or address, it understood that such identifiers can change and particular information on the internet can come and go, but equivalent information can be found by searching the internet. Reference thereto evidences the availability and public dissemination of such information.

As used herein, the abbreviations for any protective groups, amino acids and other compounds, are, unless indicated otherwise, in accord with their common usage, recognized abbreviations, or the IUPAC-IUB Commission on Biochemical Nomenclature (see, Biochem. (1972) 11(9): 1726-1732).

Although any methods, devices, and materials similar or equivalent to those described herein can be used in the practice or testing of the presently-disclosed subject matter, representative methods, devices, and materials are described herein.

The present application can "comprise" (open ended) or "consist essentially of" the components of the present invention as well as other ingredients or elements described herein. As used herein, "comprising" is open ended and means the elements recited, or their equivalent in structure or function, plus any other element or elements which are not recited. The terms "having" and "including" are also to be construed as open ended unless the context suggests otherwise.

Following long-standing patent law convention, the terms "a", "an", and "the" refer to "one or more" when used in this application, including the claims. Thus, for example, reference to "a cell" includes a plurality of such cells, and so forth.

Unless otherwise indicated, all numbers expressing quantities of ingredients, properties such as reaction conditions, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, "optional" or "optionally" means that the subsequently described event or circumstance does or does not occur and that the description includes instances where said event or circumstance occurs and instances where it does not. For example, an optionally variant portion means that the portion is variant or non-variant.

The presently-disclosed subject matter includes voltage indicators and methods of measuring voltage with voltage indicators. In some embodiments, the voltage indicators include membrane-localized voltage-sensitive proteins coupled to enzymes engineered to capture small-molecule fluorescent dyes (FIG. 1). In one embodiment, these voltage indicators combine the brightness and photostability of small-molecule dyes with the genetic targetability of proteins. In another embodiment, these voltage indicators are formed from any suitable combination of dyes, voltage sensitive proteins, and capture proteins. In a further embodiment, the voltage indicators include different inter-domain linker lengths, topological variations, or combinations thereof. The various combinations allow for modulation of fluorescence excitation and emission wavelengths of the dye, kinetics of the covalent capture protein, and kinetics of the voltage sensitive protein.

Suitable small-molecule fluorescent dyes include, but are not limited to, one or more fluorophore dyes. In one embodiment, the fluorophore dye includes a fluorophore containing one or more cyclic amine substituents. In another embodiment, the fluorophore dye includes an azetidine-containing Janelia Fluor™ dye. In a further embodiment, the Janelia Fluor™ dye includes one or more four-membered azetidine rings in place of the ubiquitous dimethylamino groups of existing fluorophores, forming small, cell-permeable fluorophores having increased brightness and photostability. Such Janelia Fluor™ dyes include, but are not limited to, Janelia Fluor™₅₀₅, Janelia Fluor™₅₂₅, Janelia Fluor™₅₄₉, Janelia Fluor™₅₈₅, Janelia Fluor™₆₃₅, and combinations thereof (FIGS. 2A-F).

Suitable voltage sensitive proteins include, but are not limited to, one or more opsins, one or more other molecules including a voltage-sensing domain, or a combination thereof. For example, in one embodiment, the voltage sensitive protein includes a microbial opsin, such as, but not limited to, QuasAr2, Ace2N. In another embodiment, the voltage sensitive protein includes a Ciona intestinalis voltage-sensing domain (CiVSD), *Danio rerio* voltage-sensing domain (DrVSD), *Gallus gallus* voltage-sensing domain (GgVSD), or a combination thereof.

Suitable capture proteins include any protein configured to bind a desired ligand. For example, in one embodiment, the capture protein includes a covalent capture protein. In another embodiment, the covalent capture protein includes, but is not limited to, HaloTag (FIGS. 2A-E), SNAP-tag (FIG. 2F), or a combination thereof. Other suitable covalent capture proteins include, but are not limited to, TMP-tag, βLac-tag, CLIP-tag, or a combination thereof. Additionally or alternatively, the capture protein may include a non-covalent capture proteins which capture, or bind, the desired ligand with non-covalent interactions. Suitable non-covalent capture proteins include, but are not limited to, certain TMP-tag, biotin-avidin, or a combination thereof.

The dyes, voltage sensitive proteins, and capture proteins discussed above demonstrate the modularity and generality of the instant voltage indicator design. In some embodiments, this allows for modulation of the fluorescence excitation and emission wavelengths of the dye, the chemical nature of the linker connecting the dye to the capture protein, the kinetics of the capture protein, and/or the kinetics of the voltage sensitive protein. For example, in one embodiment, the voltage sensitive protein QuasAr2 may be combined with the HaloTag or SNAP-tag capture protein, along with any suitable dye. In another embodiment, the voltage sensitive protein Ace2N may be combined with the HaloTag or SNAP-tag capture protein, along with any suitable dye. As will be understood by those of ordinary skill in the art, the dyes, voltage sensitive proteins, and capture proteins discussed above are for illustration only and are not intended to limit the scope of the instant disclosure. Accordingly, voltage indicators including any suitable dye, voltage sensitive protein, and/or capture protein substitute are expressly contemplated herein.

Figure 3A:
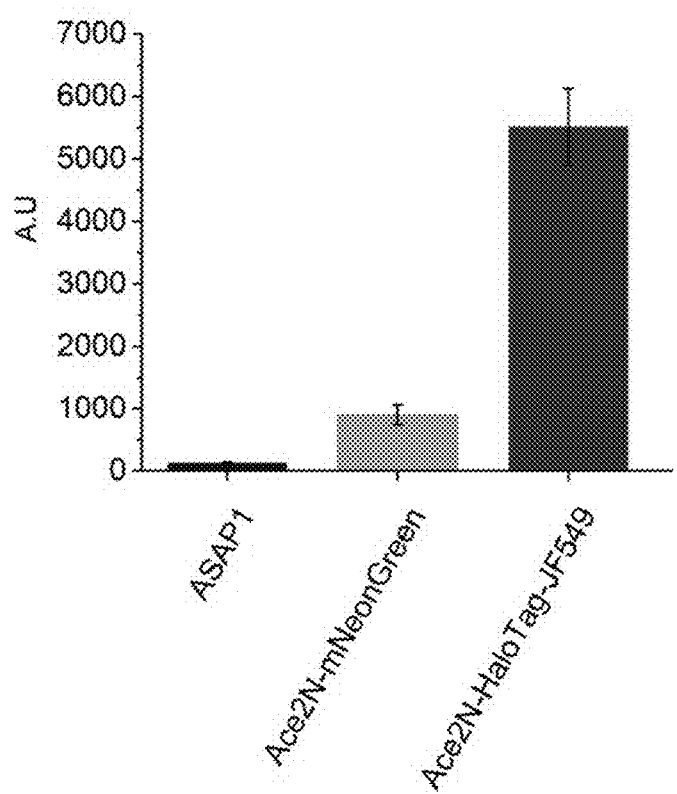
FIGS. 3A-B show graphs comparing fluorescence brightness (A) and fluorescence photobleaching rates (B) of ASAP1, Ace2N-mNeonGreen, and Ace2N-HaloTag-$JF_{549}$ in rat hippocampal neurons in culture.
Figure 3B:
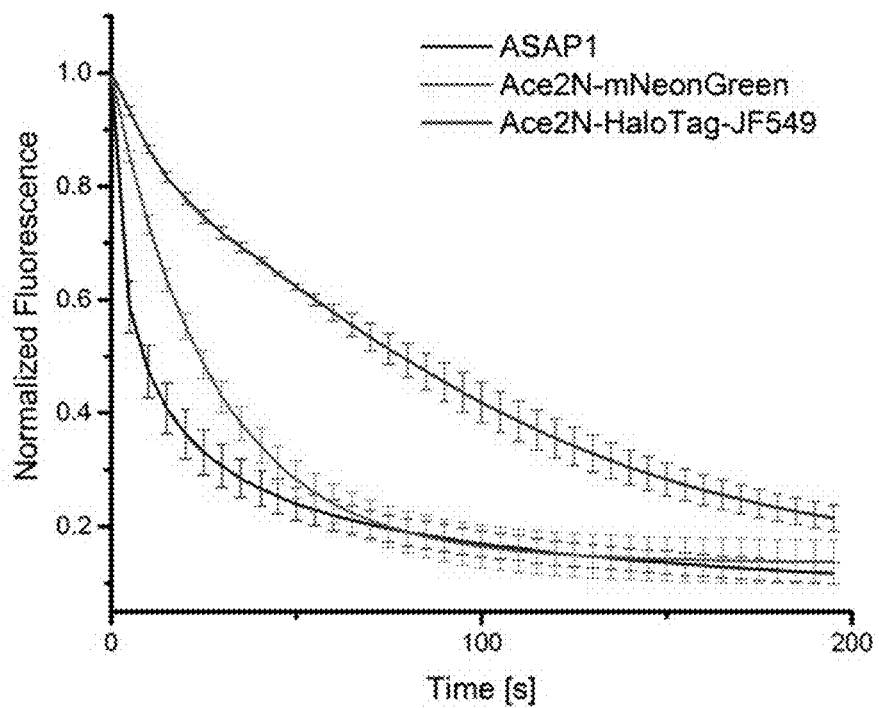

The presently-disclosed subject matter also includes methods of measuring voltage using the voltage indicators. In some embodiments, the methods include administering the voltage indicators and measuring changes in fluorescence of the dye by any suitable method. The changes in fluorescence may be measured through any suitable method such as, but not limited to, observation with a microscope, image capture, video recording, or a combination thereof. In one embodiment, the voltage indicators disclosed herein are substantially brighter and more photostable than existing GEVIs (FIGS. 3A-B). In another embodiment, the amplitude of the indicator response may be increased by shortening or eliminating the linker peptide between the voltage sensitive protein and the covalent capture protein. In further embodiment, shortening the linker peptide includes removing at least one amino acid residue therefrom. As will be appreciated by those skilled in the art, the number of amino acid residues removed may be determined by the desired amplitude and/or the specific linker peptide. In certain embodiments, the number of amino acid residues removed is at least 1, up to all but 1, between 1 and 22, between 2 and 22, 4, 8, 12, 16, 18, 20, 22, or any suitable combination, sub-combination, range, or sub-range thereof.

The presently-disclosed subject matter is further illustrated by the following specific but non-limiting examples. The following examples may include compilations of data that are representative of data gathered at various times during the course of development and experimentation related to the presently-disclosed subject matter.

EXAMPLES

The following examples describe properties of various chemigenetic voltage indicators according to the instant disclosure.

Example 1

This example compares the fluorescence response of various QuasAr2-HaloTag voltage indicators having different length linkers connecting QuasAr2 and HaloTag. To form the different lengths, amino acid residues were removed from the linker. A total of 8 voltage indicators with different linker lengths were formed, including QuasAr2-HaloTag (SEQ ID NO: 1 and SEQ ID NO: 2), QuasAr2-HaloTag-4 (SEQ ID NO: 3 and SEQ ID NO: 4), QuasAr2-HaloTag-8 (SEQ ID NO: 5 and SEQ ID NO: 6), QuasAr2-HaloTag-12 (SEQ ID NO: 7 and SEQ ID NO: 8), QuasAr2-HaloTag-16 (SEQ ID NO: 9 and SEQ ID NO: 10), QuasAr2-HaloTag-18 (SEQ ID NO: 11 and SEQ ID NO: 12), QuasAr2-HaloTag-20 (SEQ ID NO: 13 and SEQ ID NO: 14), and QuasAr2-HaloTag-22 (SEQ ID NO: 15 and SEQ ID NO: 16). The number at the end of each voltage indicator reflects the number of amino acid residues that were removed from the linker. For example, QuasAr2-HaloTag-4 is a voltage indicator where 4 amino acid residues were removed from the linker, while QuasAr2-HaloTag-12 is a voltage indicator where 12 amino acid residues were removed from the linker.

Figure 4:
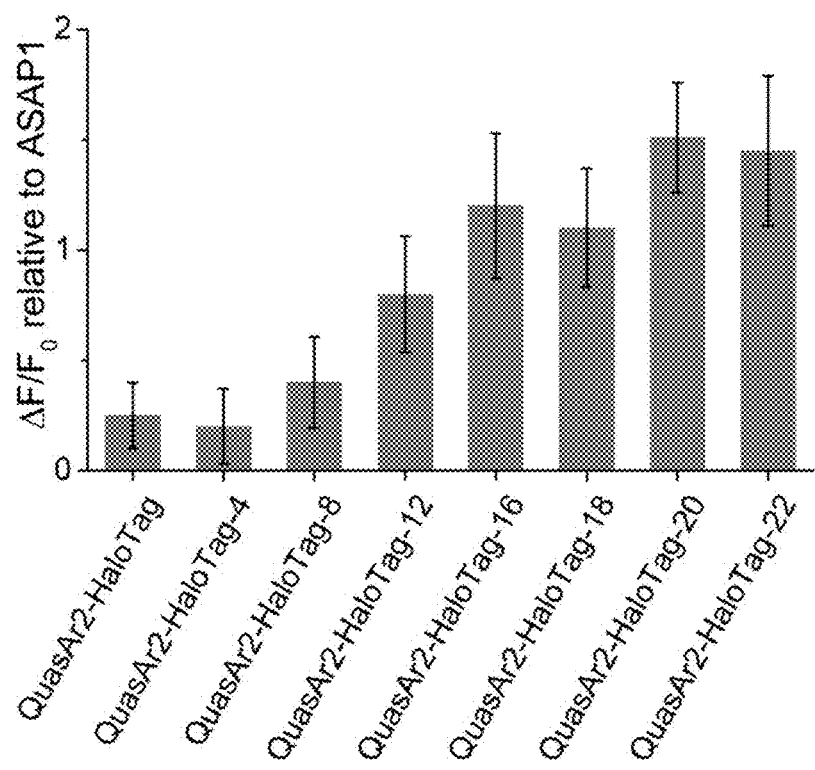
FIG. 4 shows a graph illustrating size of the fluorescence response of QuasAr2-HaloTag voltage indicators with different sized linkers connecting QuasAr2 and HaloTag. Fluorescence response measured relative to ASAP1.

The fluorescence of these voltage indicator was measure relative to ASAP1. As illustrated in FIG. 4, each different linker length provided a different size fluorescence response.

Example 2

Figure 5A:
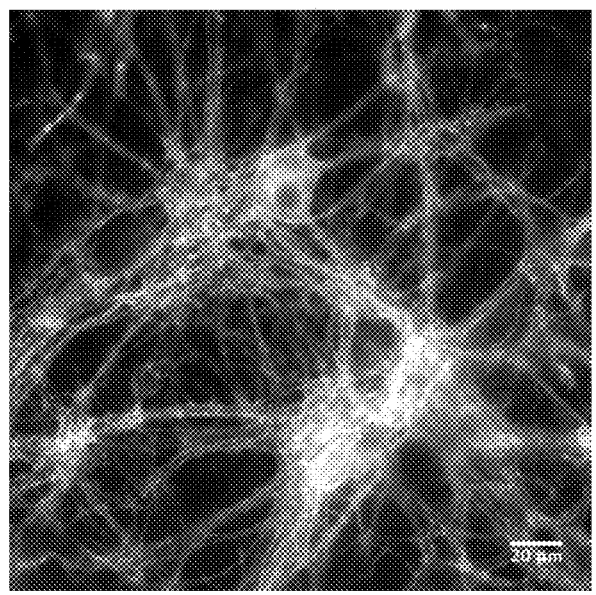
FIGS. 5A-B shows graphs and images illustrating fluorescence of rat hippocampal neurons expressing QuasAr-HaloTag labeled with $JF_{549}$. (A) Fluorescence micrograph of rat hippocampal neurons in culture expressing QuasAr-HaloTag labeled with $JF_{549}$. (B) Fluorescence traces from three regions within the image from (A) showing voltage-dependent fluorescence changes resulting from field electrode-induced depolarization of the neurons.
Figure 5B:
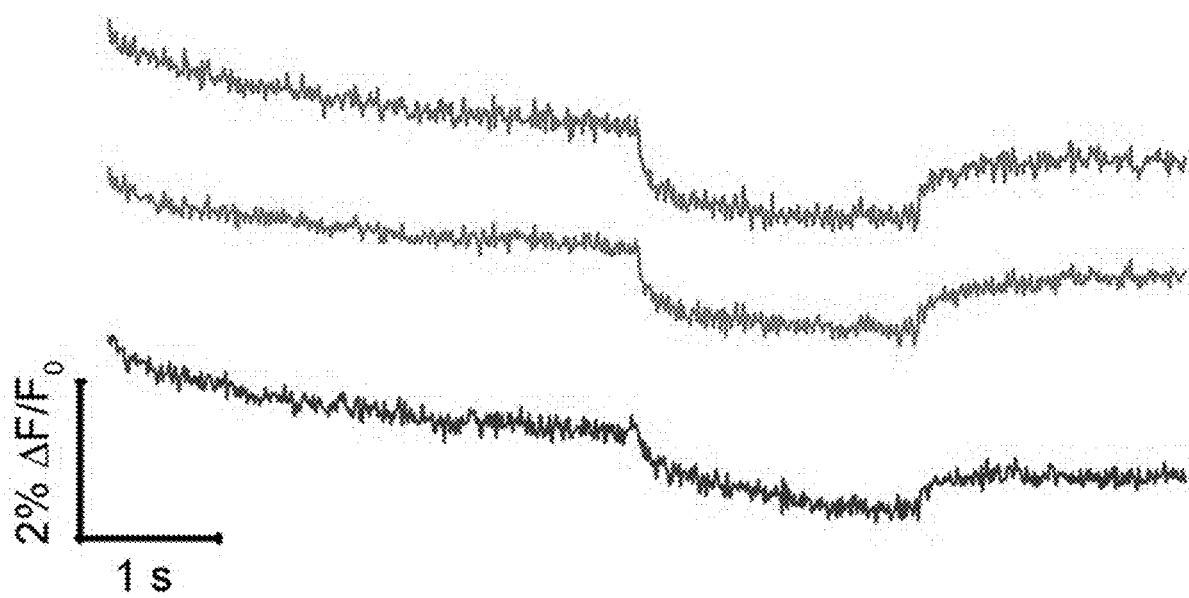
Figure 6A:
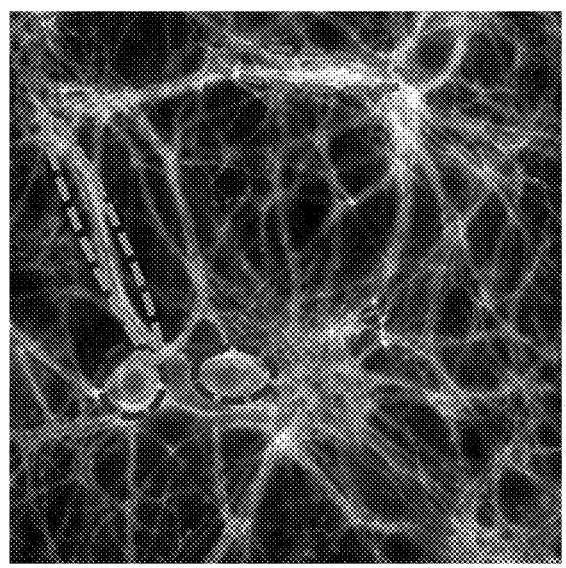
FIGS. 6A-B shows graphs and images illustrating fluorescence of rat hippocampal neurons expressing QuasAr2-HaloTag-16 labeled with $JF_{549}$. (A) Fluorescence micrograph of rat hippocampal neurons in culture expressing QuasAr2-HaloTag-16 labeled with $JF_{549}$. (B) Fluorescence traces from four regions within the image from (A) showing voltage-dependent fluorescence changes resulting from spontaneous action potentials of the neurons.
Figure 6B:
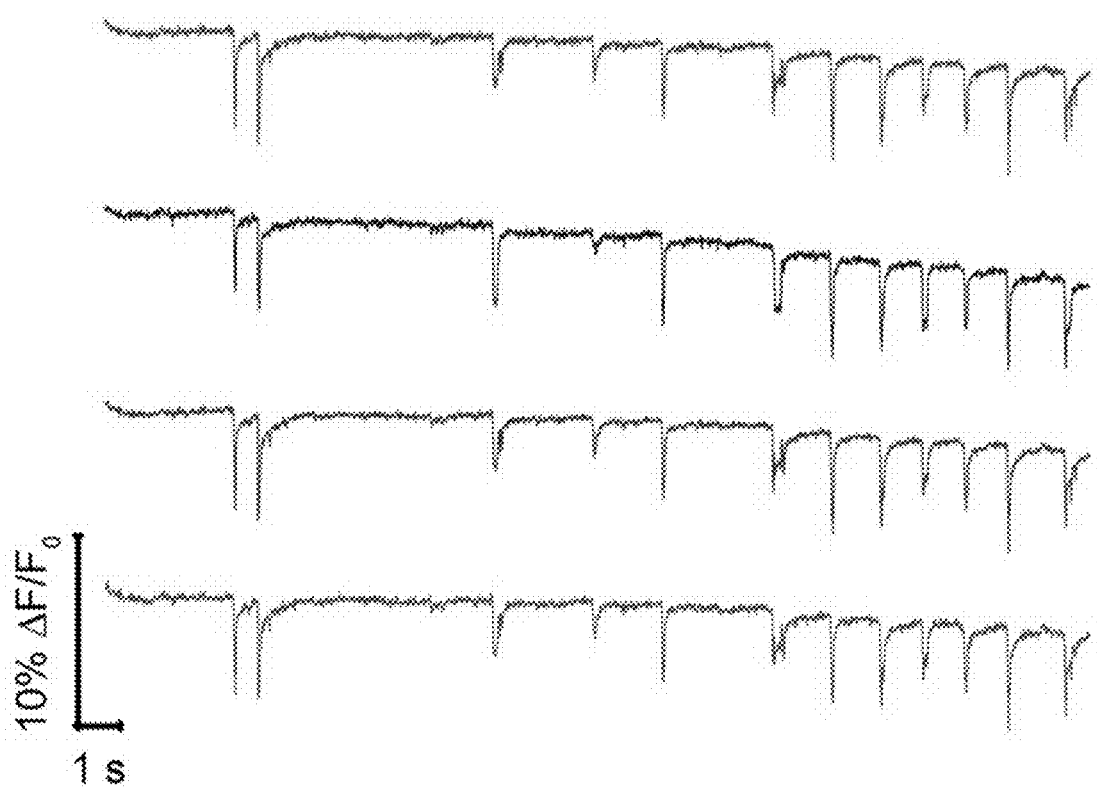
Figure 7A:
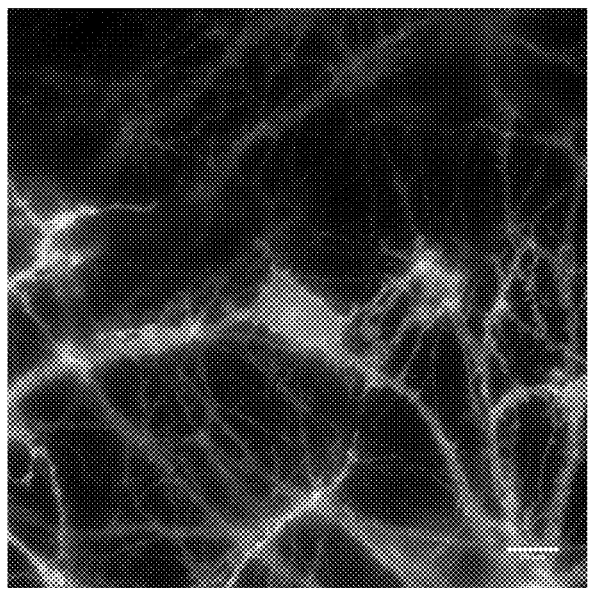
FIGS. 7A-B shows graphs and images illustrating fluorescence of rat hippocampal neurons expressing QuasAr-cpHaloTag labeled with $JF_{549}$. (A) Fluorescence micrograph of rat hippocampal neurons in culture expressing QuasAr-cpHaloTag labeled with $JF_{549}$. (B) Fluorescence traces from three regions within the image from (A) showing voltage-dependent fluorescence changes resulting from field electrode-induced depolarization of the neurons.
Figure 7B:
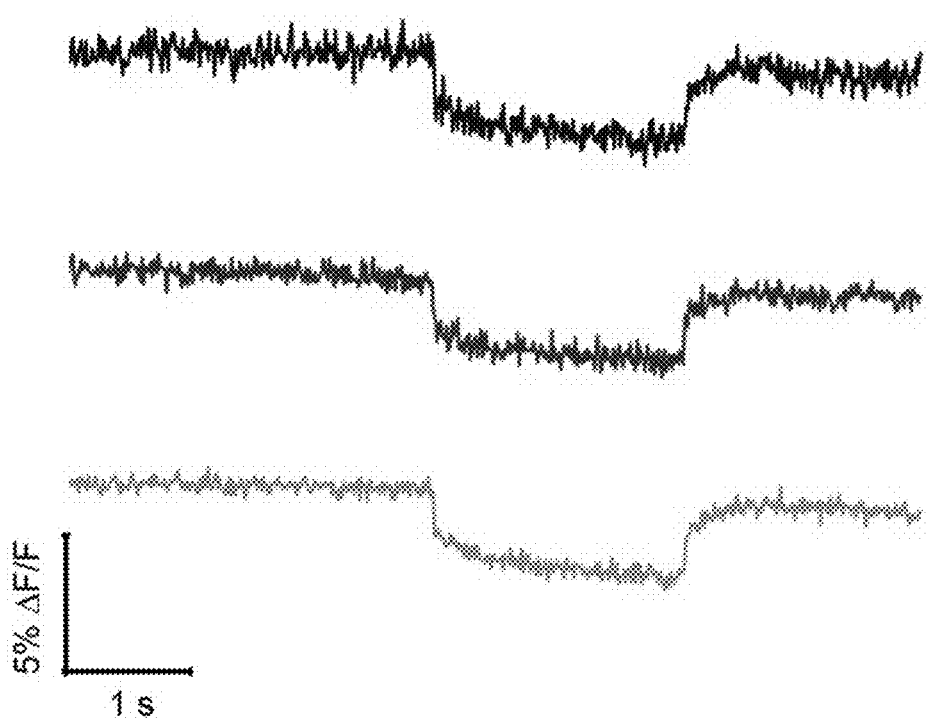
Figure 8A:
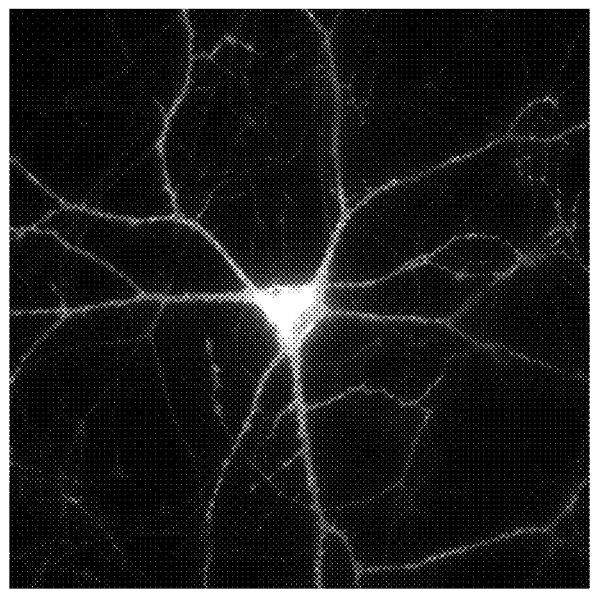
FIGS. 8A-B shows graphs and images illustrating fluorescence of rat hippocampal neurons expressing QuasAr2-SNAP-Tag labeled with $JF_{549}$. (A) Fluorescence micrograph of rat hippocampal neurons in culture expressing QuasAr2-SNAP-Tag labeled with $JF_{549}$. (B) Fluorescence traces from three regions within the image from (A) showing voltage-dependent fluorescence changes resulting from field electrode-induced action potentials of the neurons.
Figure 8B:
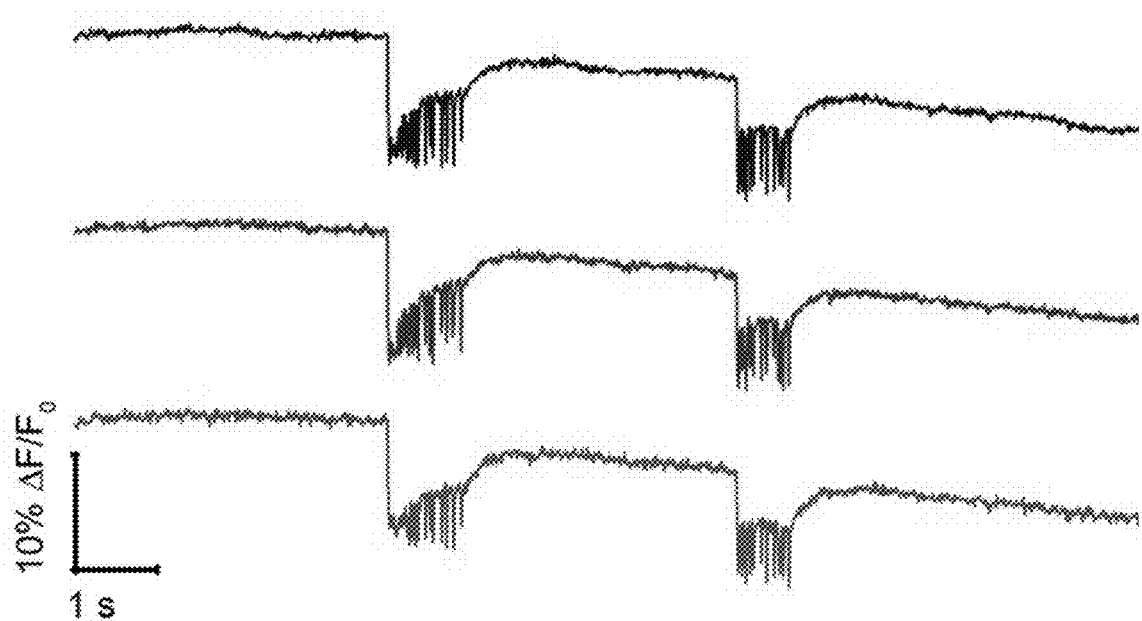
Figure 9A:
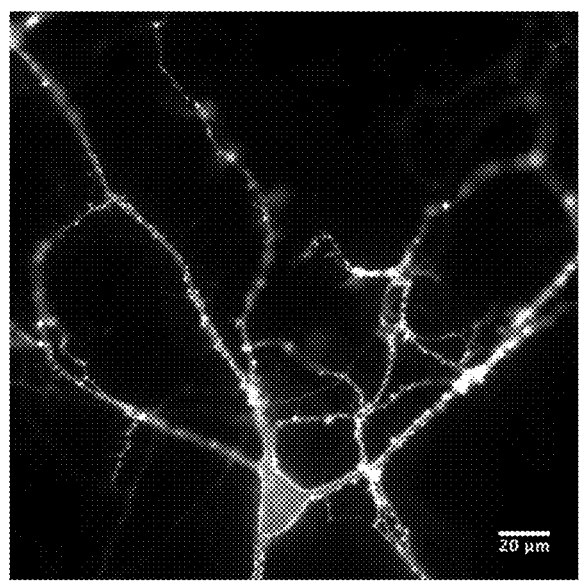
FIGS. 9A-B shows graphs and images illustrating fluorescence of rat hippocampal neurons expressing HaloTag-QuasAr2 labeled with $JF_{549}$. (A) Fluorescence micrograph of rat hippocampal neurons in culture expressing HaloTag-QuasAr2 labeled with $JF_{549}$. (B) Fluorescence traces from one region within the image from (A) showing voltage-dependent fluorescence changes resulting from field electrode-induced depolarization of the neurons.
Figure 9B:
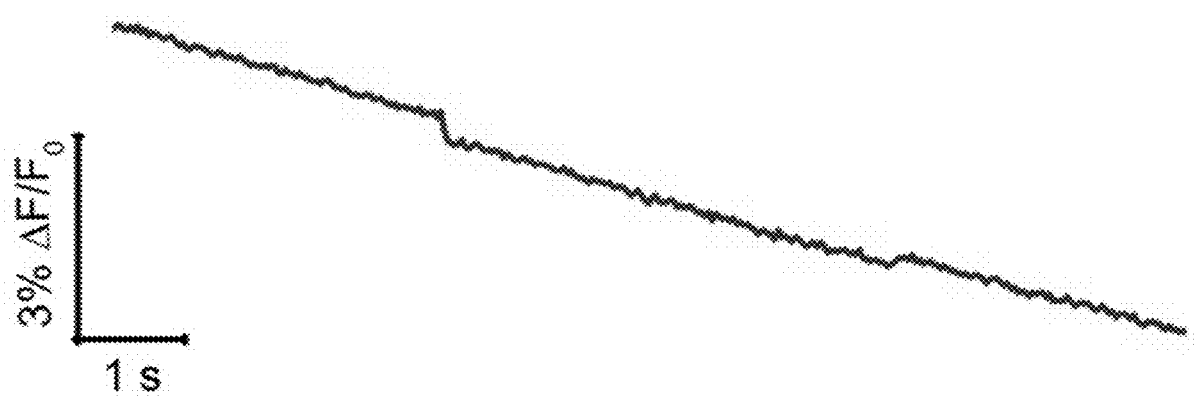
Figure 10A:
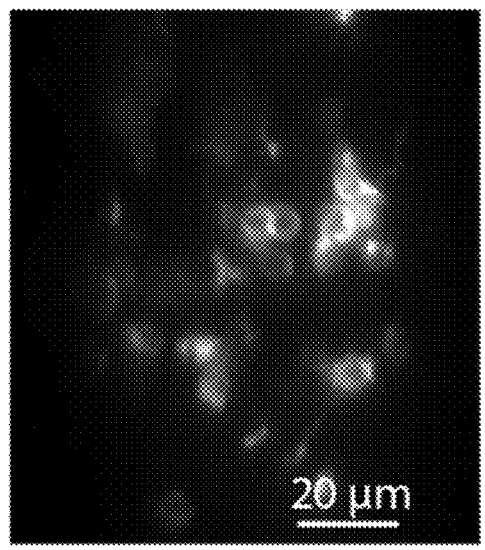
FIGS. 10A-D show graphs and images illustrating in vivo voltage imaging in zebrafish larvae (6 days post-fertilization). (A) Fluorescence micrograph of fluorescence from neurons in the larval zebrafish ventral midbrain expressing Ace2N-HaloTag and labeled with $JF_{525}$. A light sheet microscope with 488 nm excitation was use. (B) Same as (A) except with regions of interest overlayed that correspond to fluorescence traces in (C) and (D). (C) The status of a visual stimulus displayed to the fish and electrophysiological recording showing the fish's intended swimming (top), with fluorescence traces from 12 individual neurons shown in (B). (D) Zoom-in of (C) at the region indicated.
Figure 10B:
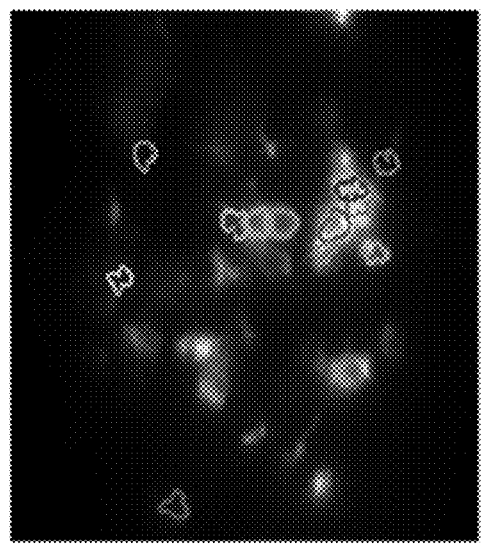
Figure 10C:
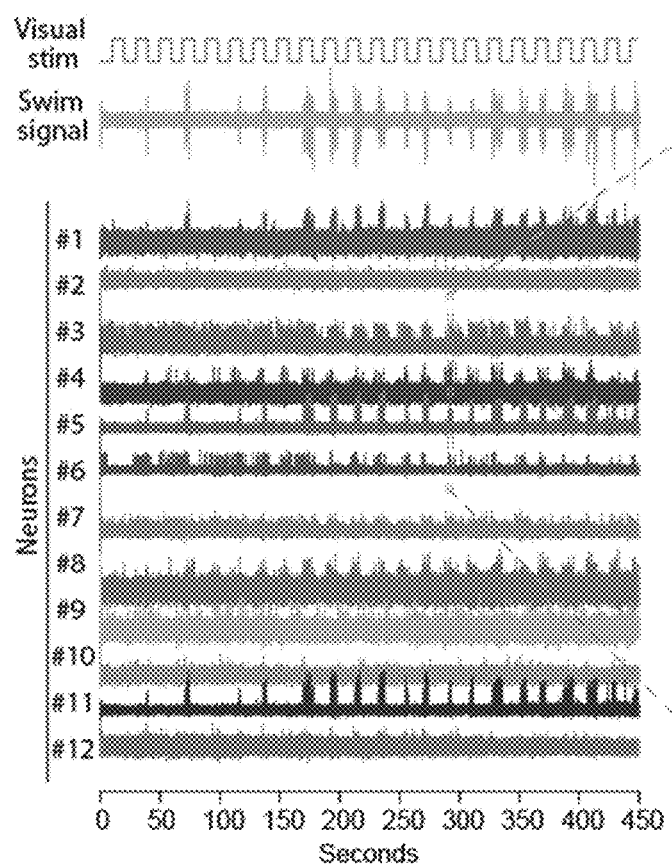
Figure 10D:
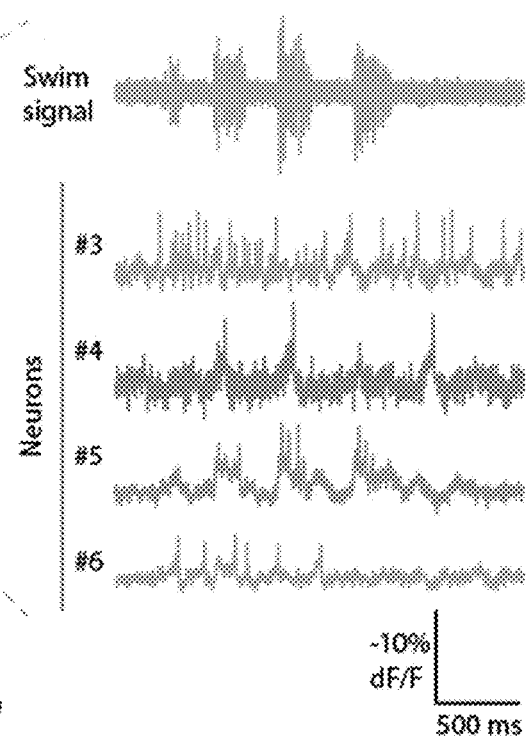

In this example, the fluorescence of various JF₅₄₉ labeled QuasAr2 containing voltage indicators was measured in rat hippocampal neurons in culture. In particular, FIGS. 5A-B show the fluorescence of rat hippocampal neurons expressing QuasAr-HaloTag (SEQ ID NO: 1 and SEQ ID NO: 2) labeled with JF₅₄₉ (FIG. 5A) and voltage-dependent fluorescence changes resulting from field electrode-induced depolarization of the neurons (FIG. 5B). FIGS. 6A-B show the fluorescence of rat hippocampal neurons expressing QuasAr2-HaloTag-16 (SEQ ID NO: 9 and SEQ ID NO: 10) labeled with JF₅₄₉ (FIG. 6A) and voltage-dependent fluorescence changes resulting from spontaneous action potentials of the neurons (FIG. 6B). FIGS. 7A-B show the fluorescence of rat hippocampal neurons expressing QuasAr-cpHaloTag (SEQ ID NO: 17 and SEQ ID NO: 18) labeled with JF549 (FIG. 7A) and voltage-dependent fluorescence changes resulting from field electrode-induced depolarization of the neurons (FIG. 7B). FIGS. 8A-B show the fluorescence of rat hippocampal neurons expressing QuasAr2-SNAP-Tag (SEQ ID NO: 19 and SEQ ID NO: 20) labeled with JF549 (FIG. 8A) and voltage-dependent fluorescence changes resulting from field electrode-induced depolarization of the neurons (FIG. 8B). FIGS. 9A-B show the fluorescence of rat hippocampal neurons expressing HaloTag-QuasAr2 (SEQ ID NO: 21 and SEQ ID NO: 22) labeled with JF549 (FIG. 9A) and voltage-dependent fluorescence changes resulting from field electrode-induced depolarization of the neurons (FIG. 9B).

Example 3

In this example, the fluorescence of Ace2N-HaloTag (SEQ ID NO: 23 and SEQ ID NO: 24) voltage indicators labeled with various fluorescent dyes was measured. As discussed below, changes in the cell membrane potential produced changes in the fluorescence of the dye when the indicators were tested in cultured rat hippocampal neurons and live zebrafish larvae.

Figure 11:
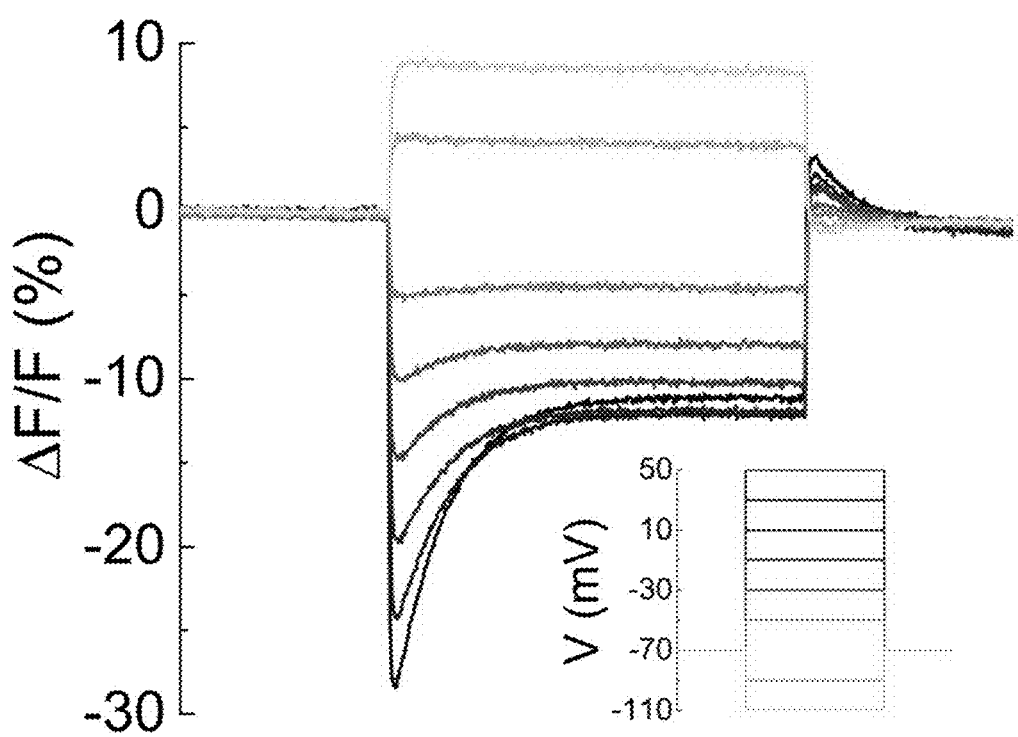
FIG. 11 shows a graph illustrating fluorescence response to voltage steps (inset) of Ace2N-HaloTag labeled with $JF_{525}$ in rat hippocampal neurons in culture.
Figure 12A:
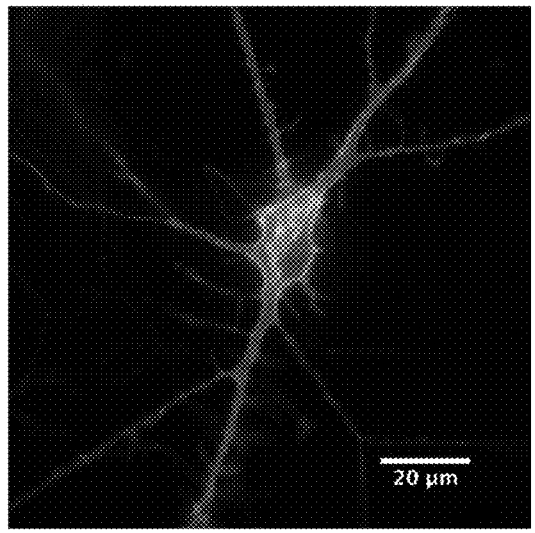
FIGS. 12A-C show graphs and images illustrating fluorescence of rat hippocampal neuron expressing Ace2N-HaloTag labeled with $JF_{505}$. (A) Fluorescence micrograph of rat hippocampal neuron in culture expressing Ace2N-HaloTag labeled with $JF_{505}$. (B) Fluorescence versus voltage for cells like in (A). (C) Fluorescence (top) compared with voltage (bottom, as measured with a whole-cell patch clamp pipette) from neurons like in (A) showing action potential spikes and subthreshold depolarizations.
Figure 12B:
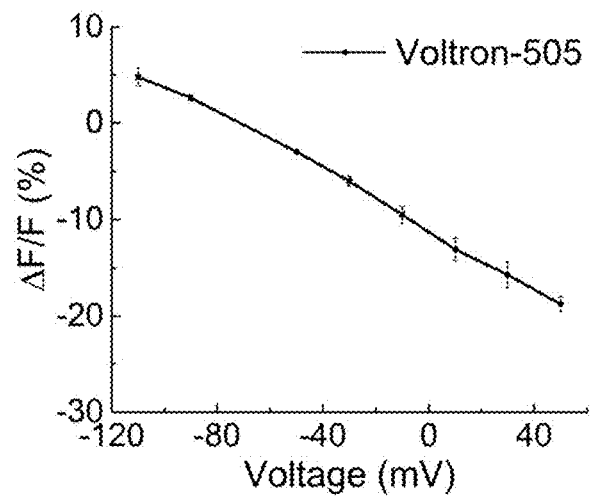
Figure 12C:
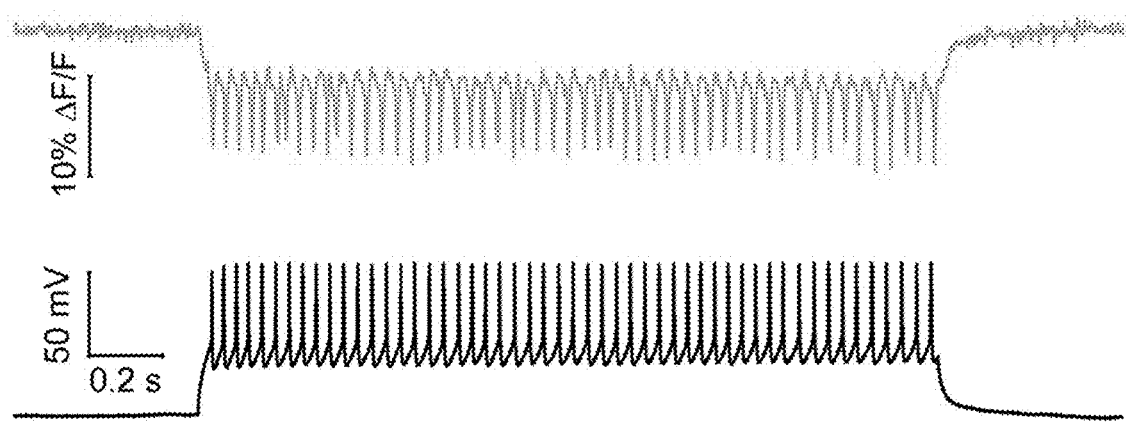
Figure 13A:
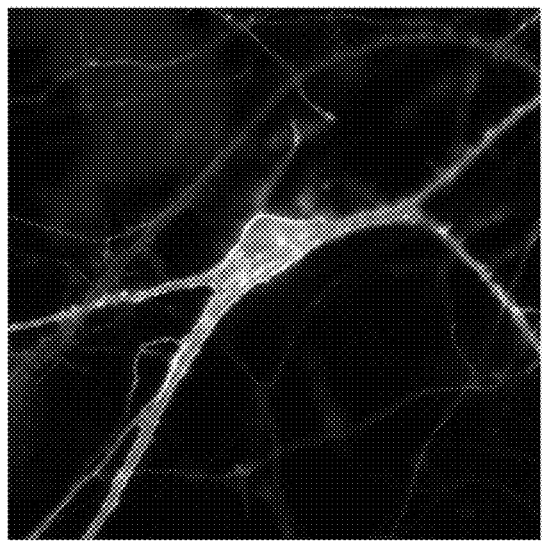
FIGS. 13A-C show graphs and images illustrating fluorescence of rat hippocampal neuron expressing Ace2N-HaloTag labeled with $JF_{525}$. (A) Fluorescence micrograph of rat hippocampal neuron in culture expressing Ace2N-HaloTag labeled with $JF_{525}$. (B) Fluorescence versus voltage for cells like in (A). (C) Fluorescence (top) compared with voltage (bottom, as measured with a whole-cell patch clamp pipette) from neurons like in (A) showing action potential spikes and subthreshold depolarizations.
Figure 13B:
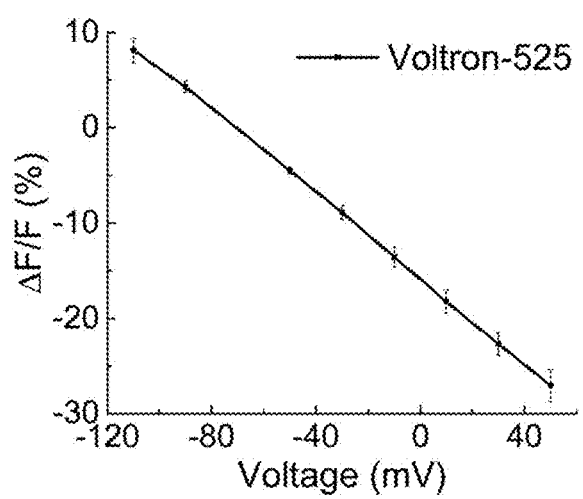
Figure 13C:
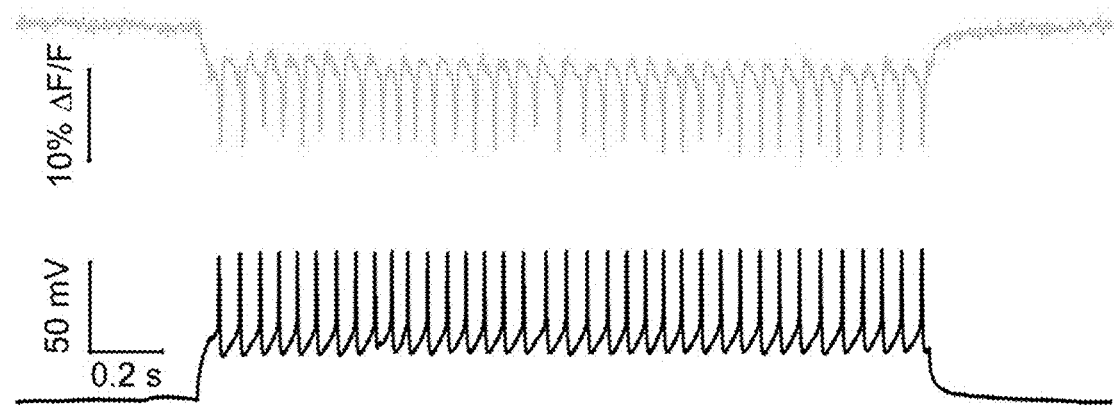
Figure 14A:
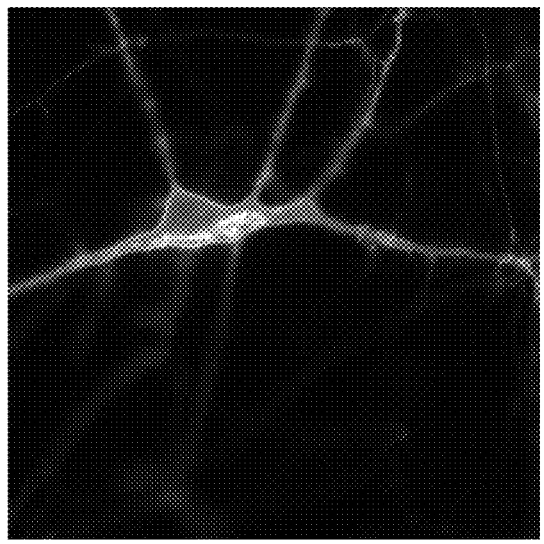
FIGS. 14A-C show graphs and images illustrating fluorescence of rat hippocampal neuron expressing Ace2N-HaloTag labeled with $JF_{549}$. (A) Fluorescence micrograph of rat hippocampal neuron in culture expressing Ace2N-HaloTag labeled with $JF_{549}$. (B) Fluorescence versus voltage for cells like in (A). (C) Fluorescence (top) compared with voltage (bottom, as measured with a whole-cell patch clamp pipette) from neurons like in (A) showing action potential spikes and subthreshold depolarizations.
Figure 14B:
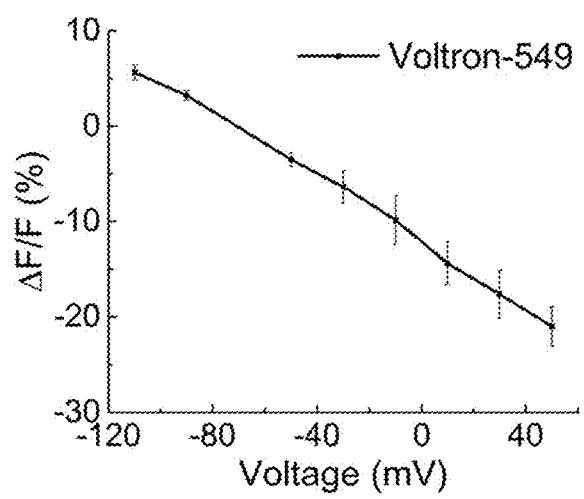
Figure 14C:
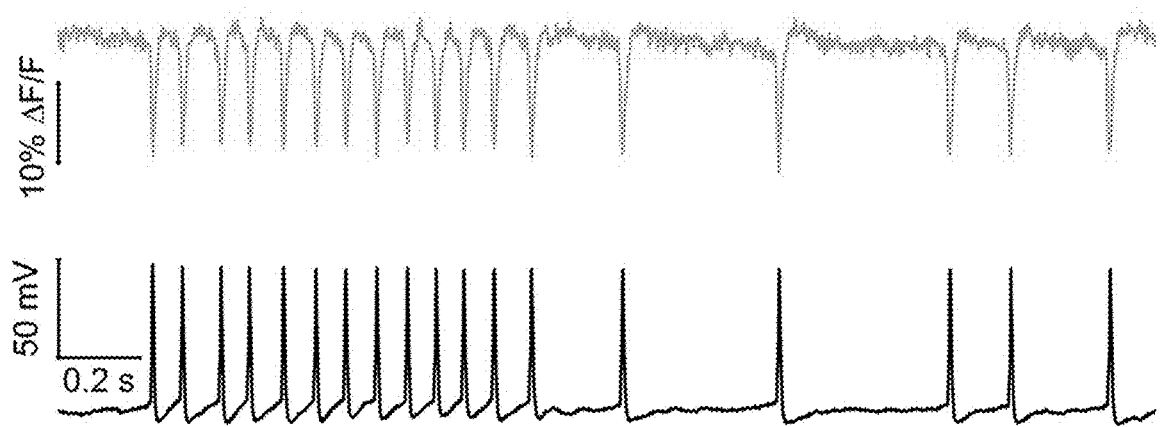
Figure 15A:
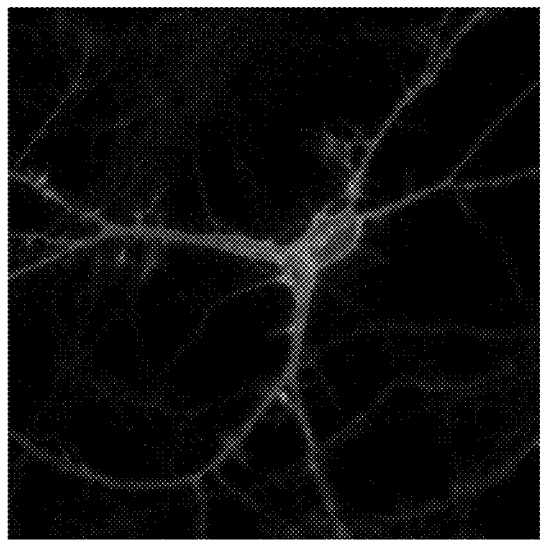
FIGS. 15A-C show graphs and images illustrating fluorescence of rat hippocampal neuron expressing Ace2N-HaloTag labeled with $JF_{585}$. (A) Fluorescence micrograph of rat hippocampal neuron in culture expressing Ace2N-HaloTag labeled with $JF_{585}$. (B) Fluorescence versus voltage for cells like in (A). (C) Fluorescence (top) compared with voltage (bottom, as measured with a whole-cell patch clamp pipette) from neurons like in (A) showing action potential spikes and subthreshold depolarizations.
Figure 15B:
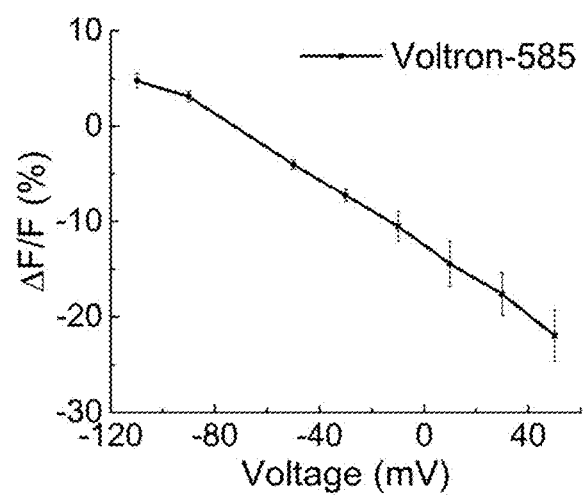
Figure 15C:
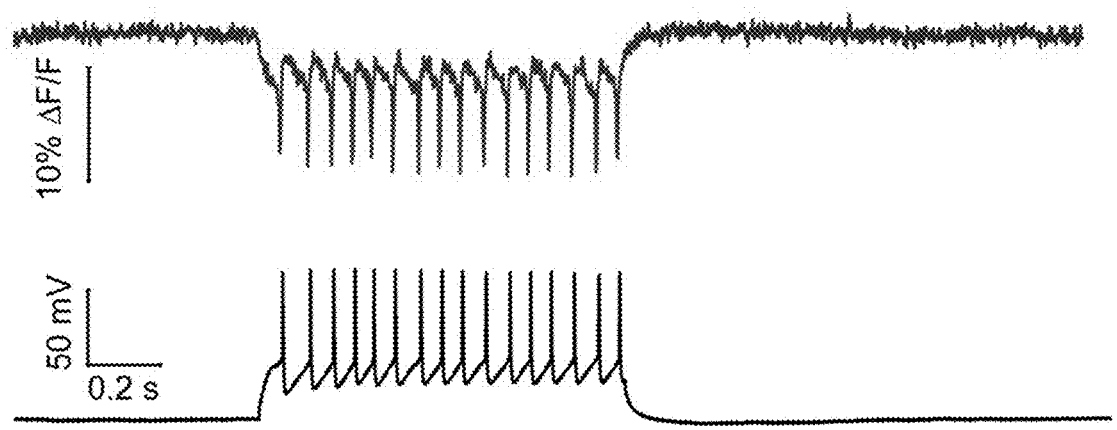
Figure 16A:
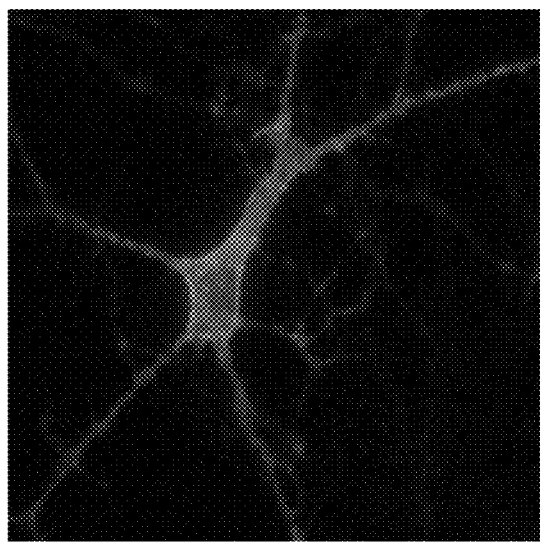
FIGS. 16A-C show graphs and images illustrating fluorescence of rat hippocampal neuron expressing Ace2N-HaloTag labeled with $JF_{635}$. (A) Fluorescence micrograph of rat hippocampal neuron in culture expressing Ace2N-HaloTag labeled with $JF_{635}$. (B) Fluorescence versus voltage for cells like in (A). (C) Fluorescence (top) compared with voltage (bottom, as measured with a whole-cell patch clamp pipette) from neurons like in (A) showing action potential spikes and subthreshold depolarizations.
Figure 16B:
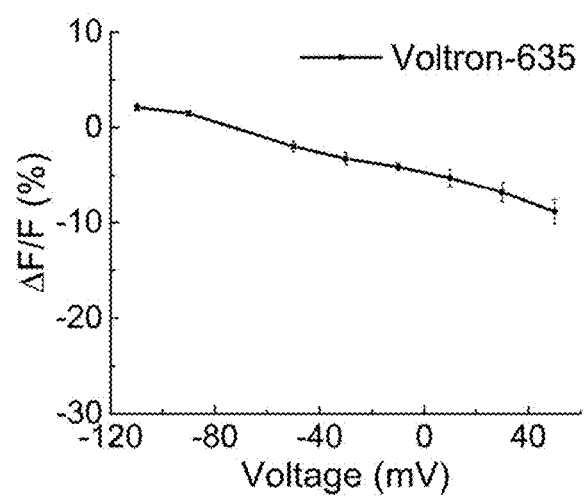
Figure 16C:
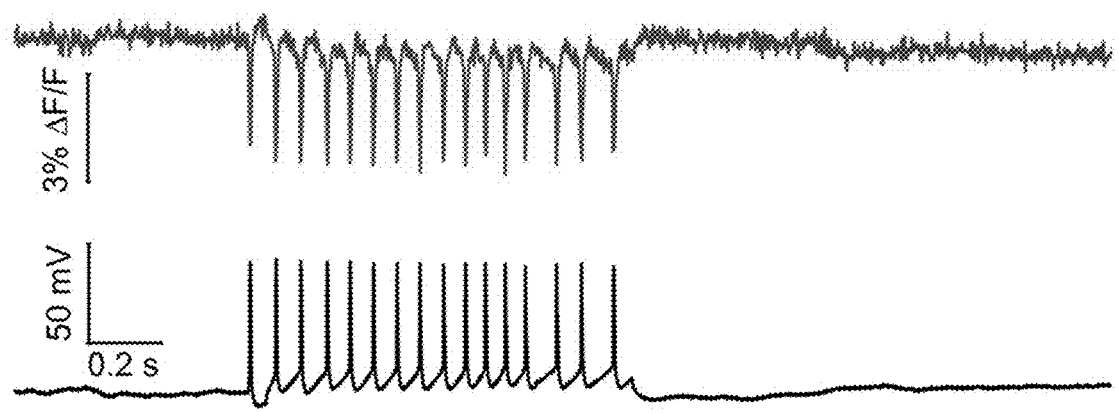

In one study, the sensors disclosed herein were used to image fluorescence voltage signals from 12 neurons simultaneously in an awake, behaving larval zebrafish for several minutes continuously. More specifically, FIGS. 10A-D show the fluorescence from neurons in zebrafish larvae expressing Ace2N-HaloTag labeled with $JF_{525}$. FIG. 11 shows fluorescence response to voltage steps of Ace2N-HaloTag labeled with $JF_{525}$ in rat hippocampal neurons in culture. FIGS. 12A-C show fluorescence of rat hippocampal neuron in culture expressing Ace2N-HaloTag labeled with $JF_{505}$ (FIG. 12A), fluorescence versus voltage (FIG. 12B), and fluorescence compared with voltage showing action potential spikes and subthreshold depolarizations (FIG. 12C). FIGS. 13A-C show fluorescence of rat hippocampal neuron in culture expressing Ace2N-HaloTag labeled with $JF_{525}$ (FIG. 13A), fluorescence versus voltage (FIG. 13B), and fluorescence compared with voltage showing action potential spikes and subthreshold depolarizations (FIG. 13C). FIGS. 14A-C show fluorescence of rat hippocampal neuron in culture expressing Ace2N-HaloTag labeled with $JF_{549}$ (FIG. 14A), fluorescence versus voltage (FIG. 14B), and fluorescence compared with voltage showing action potential spikes and subthreshold depolarizations (FIG. 14C). FIGS. 15A-C show fluorescence of rat hippocampal neuron in culture expressing Ace2N-HaloTag labeled with $JF_{585}$ (FIG. 15A), fluorescence versus voltage (FIG. 15B), and fluorescence compared with voltage showing action potential spikes and subthreshold depolarizations (FIG. 15C). FIGS. 16A-C show fluorescence of rat hippocampal neuron in culture expressing Ace2N-HaloTag labeled with $JF_{635}$ (FIG. 16A), fluorescence versus voltage (FIG. 16B), and fluorescence compared with voltage showing action potential spikes and subthreshold depolarizations (FIG. 16C).

Example 3

Figure 17A:
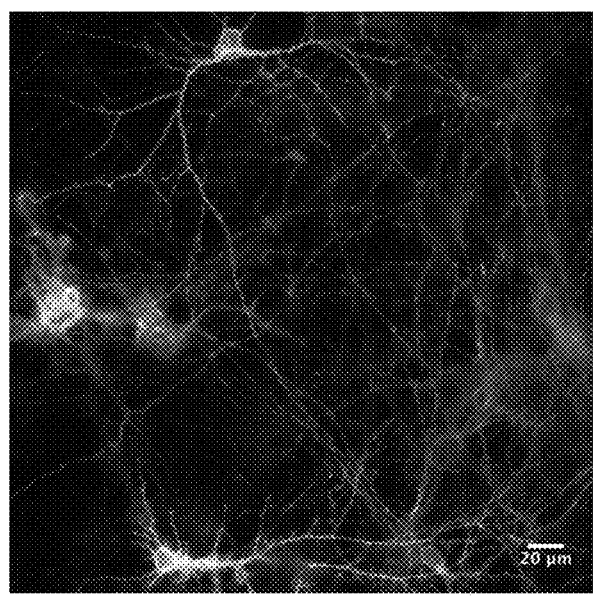
FIGS. 17A-B show graphs and images illustrating fluorescence of rat hippocampal neuron expressing CiVSD-HaloTag labeled with $JF_{635}$. (A) Fluorescence micrograph of rat hippocampal neurons in culture expressing CiVSD-HaloTag labeled with $JF_{635}$. (B) Fluorescence traces from six regions within the image from (A) showing voltage-dependent fluorescence changes resulting from spontaneous action potentials of the neurons.
Figure 17B:
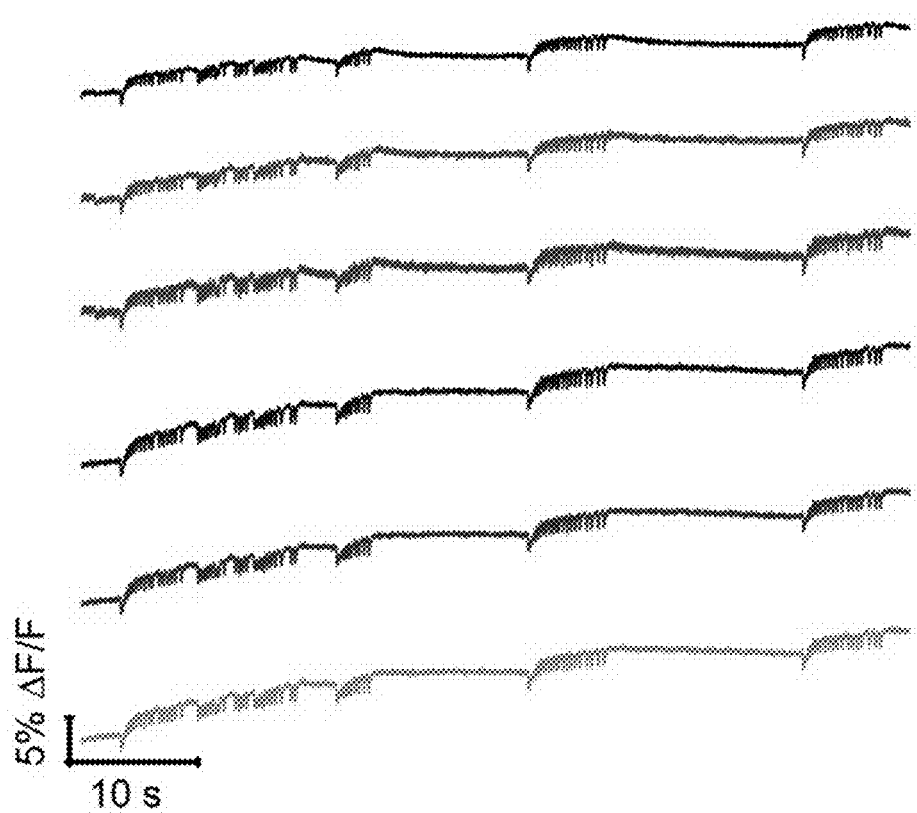
Figure 18A:
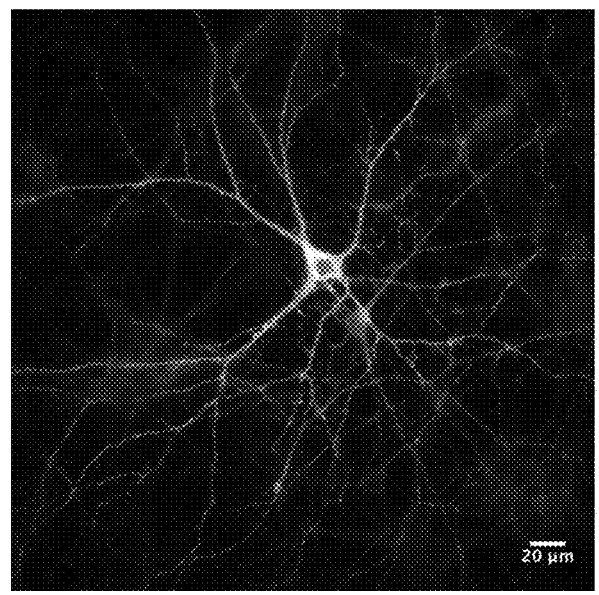
FIGS. 18A-B show graphs and images illustrating fluorescence of rat hippocampal neuron expressing CiVSD-cpHaloTag labeled with $JF_{635}$. (A) Fluorescence micrograph of rat hippocampal neurons in culture expressing CiVSD-cpHaloTag labeled with $JF_{635}$. (B) Fluorescence traces from three regions within the image from (A) showing voltage-dependent fluorescence changes resulting from spontaneous action potentials of the neurons.
Figure 18B:
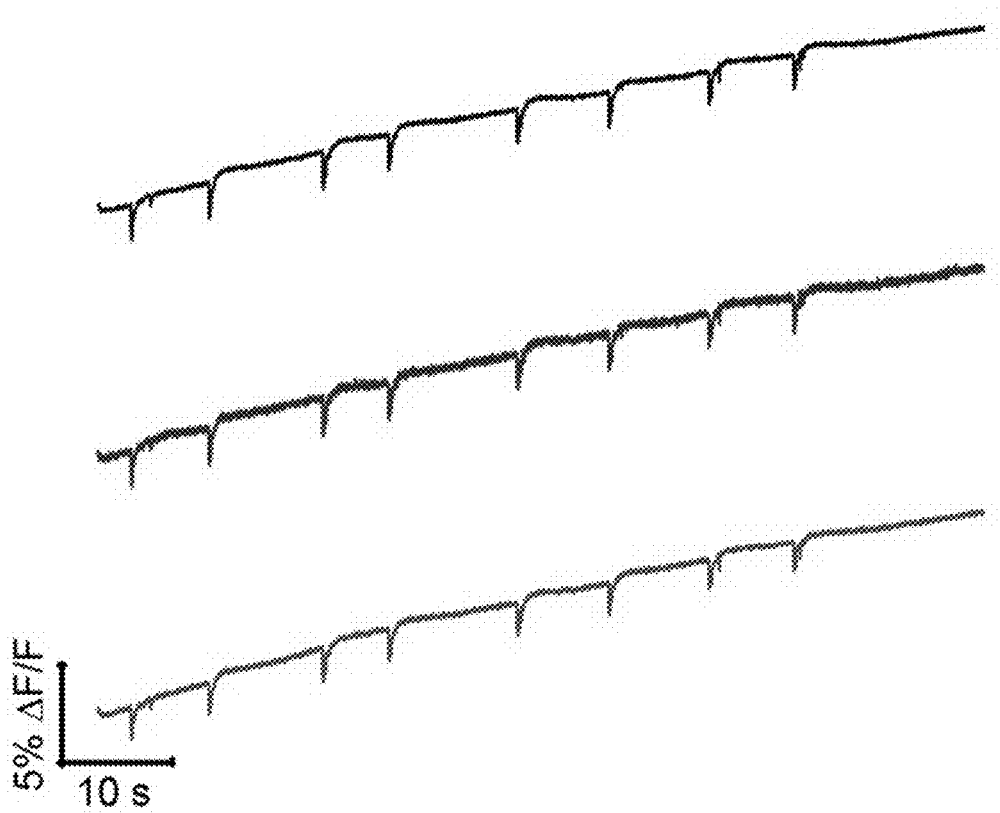
Figure 19A:
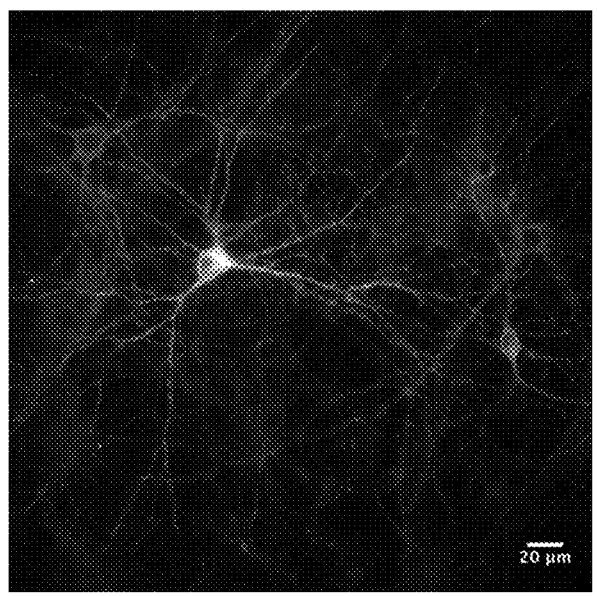
FIGS. 19A-B show graphs and images illustrating fluorescence of rat hippocampal neuron expressing DrVSD-HaloTag labeled with $JF_{635}$. (A) Fluorescence micrograph of rat hippocampal neurons in culture expressing DrVSD-HaloTag labeled with $JF_{635}$. (B) Fluorescence traces from four regions within the image from (A) showing voltage-dependent fluorescence changes resulting from spontaneous action potentials of the neurons.
Figure 19B:
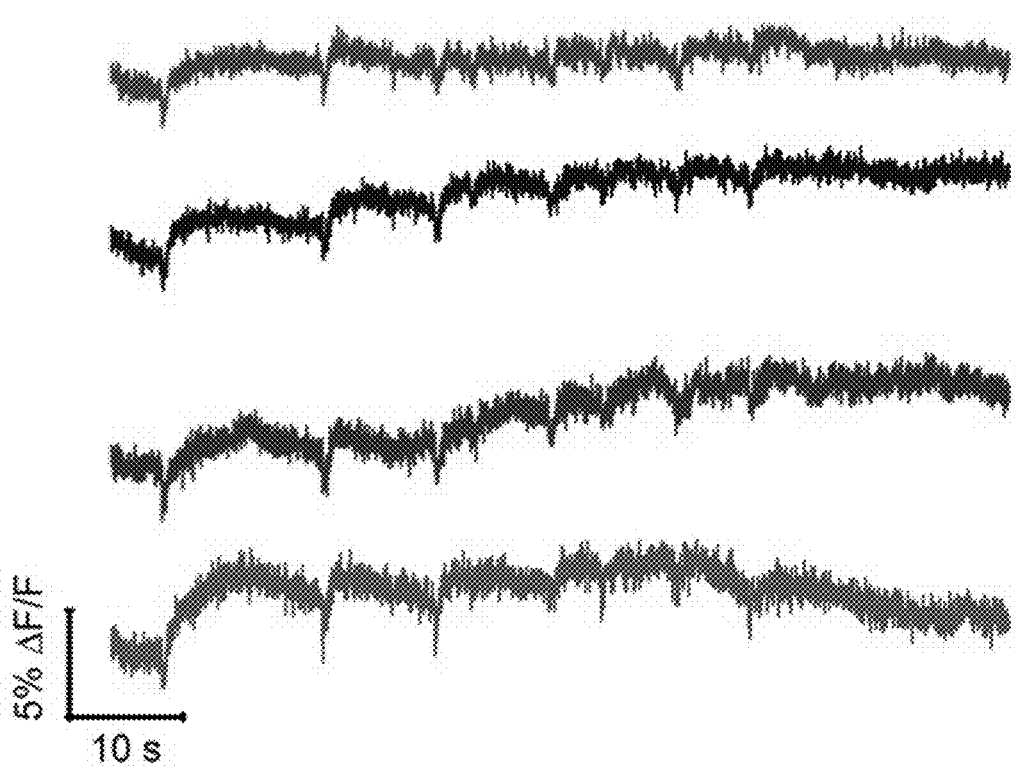
Figure 20A:
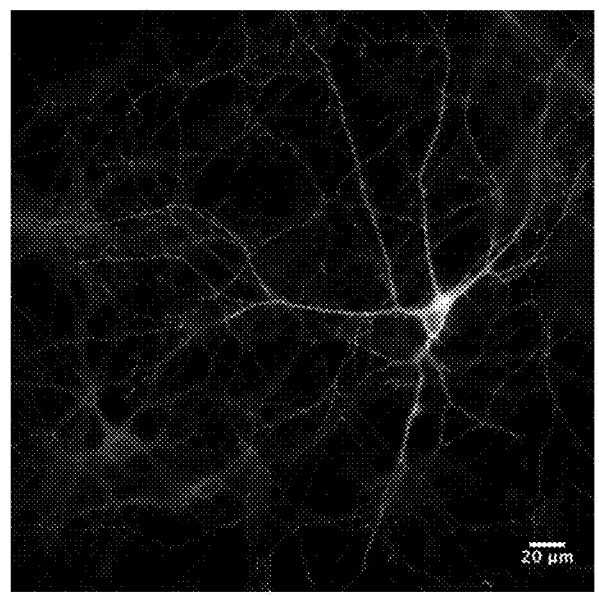
FIGS. 20A-B show graphs and images illustrating fluorescence of rat hippocampal neuron expressing GgVSD-HaloTag labeled with $JF_{635}$. (A) Fluorescence micrograph of rat hippocampal neurons in culture expressing GgVSD-HaloTag labeled with $JF_{635}$. (B) Fluorescence traces from five regions within the image from (A) showing voltage-dependent fluorescence changes resulting from spontaneous action potentials of the neurons.
Figure 20B:
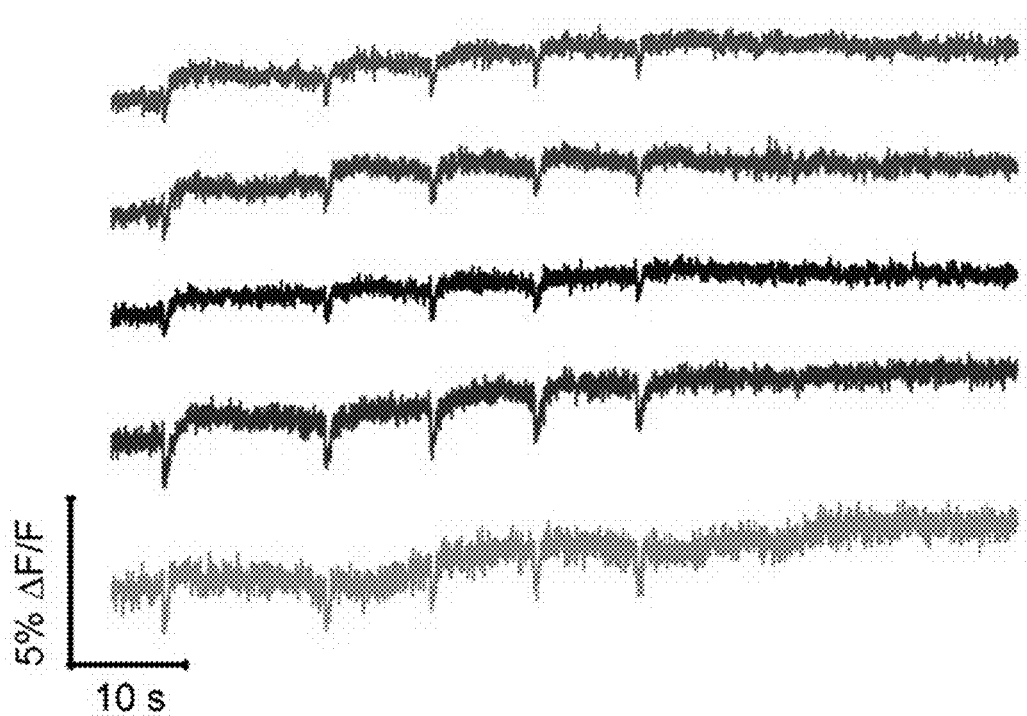

In this example, the fluorescence of $JF_{635}$ labeled HaloTag voltage indicators was measured with various different voltage sensitive proteins. More specifically, FIGS. 17A-B show the fluorescence of rat hippocampal neurons expressing CiVSD-HaloTag (SEQ ID NO: 25 and SEQ ID NO: 26) labeled with $JF_{635}$ (FIG. 17A) and voltage-dependent fluorescence changes resulting from spontaneous action potentials of the neurons (FIG. 17B). FIGS. 18A-B show the fluorescence of rat hippocampal neurons expressing CiVSD-cpHaloTag (SEQ ID NO: 27 and SEQ ID NO: 28) labeled with $JF_{635}$ (FIG. 18A) and voltage-dependent fluorescence changes resulting from spontaneous action potentials of the neurons (FIG. 18B). FIGS. 19A-B show the fluorescence of rat hippocampal neurons expressing DrVSD-HaloTag (SEQ ID NO: 29 and SEQ ID NO: 30) labeled with $JF_{635}$ (FIG. 19A) and voltage-dependent fluorescence changes resulting from spontaneous action potentials of the neurons (FIG. 19B). FIGS. 20A-B show the fluorescence of rat hippocampal neurons expressing GgVSD-HaloTag (SEQ ID NO: 31 and SEQ ID NO: 32) labeled with $JF_{635}$ (FIG. 20A) and voltage-dependent fluorescence changes resulting from spontaneous action potentials of the neurons (FIG. 20B).

All publications, patents, and patent applications mentioned in this specification are herein incorporated by reference to the same extent as if each individual publication, patent, or patent application was specifically and individually indicated to be incorporated by reference, including the references set forth in the following list:

REFERENCES

1. Grimm, J. B. et al. A general method to fine-tune fluorophores for live-cell and in vivo imaging. *Nat. Methods* 14, 987 (2017).
2. Platisa, J., Vasan, G., Yang, A. & Pieribone, V. A. Directed Evolution of Key Residues in Fluorescent Protein Inverses the Polarity of Voltage Sensitivity in the Genetically Encoded Indicator ArcLight. *ACS Chem. Neurosci.* 8, 513-523 (2017).
3. Chamberland, S. et al. Fast two-photon imaging of subcellular voltage dynamics in neuronal tissue with genetically encoded indicators. *Elife* 6, e25690 (2017).
4. Abdelfattah, A. S. et al. A bright and fast red fluorescent protein voltage indicator that reports neuronal activity in organotypic brain slices. *J. Neurosci.* 36, 2458-2472 (2016).
5. Abdelfattah, A. S., Rancic, V., Rawal, B., Ballanyi, K. & Campbell, R. E. Ratiometric and photoconvertible fluorescent protein-based voltage indicator prototypes. *Chem. Commun.* 104, 40-50 (2016).
6. Gong, Y. et al. High-speed recording of neural spikes in awake mice and flies with a fluorescent voltage sensor. *Science* (80-.). 350, 1361-1366 (2015).
7. Grimm, J. B. et al. A general method to improve fluorophores for live-cell and single-molecule microscopy. *Nat. Methods* 12, 244-250 (2015).
8. Woodford, C. R. et al. Improved PeT molecules for optically sensing voltage in neurons. *J. Am. Chem. Soc.* 137, 1817-1824 (2015).
9. Grenier, V., Walker, A. S. & Miller, E. W. A Small-Molecule Photoactivatable Optical Sensor of Transmembrane Potential. *J. Am. Chem. Soc.* 137, 10894-10897 (2015).
10. Huang, Y. L., Walker, A. S. & Miller, E. W. A Photostable Silicon Rhodamine Platform for Optical Voltage Sensing. *J. Am. Chem. Soc.* 137, 10767-10776 (2015).
11. Zou, P. et al. Bright and fast multicoloured voltage reporters via electrochromic FRET. *Nat. Commun.* 5, 4625 (2014).
12. St-Pierre, F. et al. High-fidelity optical reporting of neuronal electrical activity with an ultrafast fluorescent voltage sensor. *Nat. Neurosci.* 17, 884-889 (2014).
13. Hochbaum, D. R. et al. All-optical electrophysiology in mammalian neurons using engineered microbial rhodopsins. *Nat. Methods* 11, 825-833 (2014).
14. Gong, Y., Wagner, M. J., Zhong Li, J. & Schnitzer, M. J. Imaging neural spiking in brain tissue using FRET-opsin protein voltage sensors. *Nat. Commun.* 5, 3674 (2014).
15. Treger, J. S., Priest, M. F., Iezzi, R. & Bezanilla, F. Real-time imaging of electrical signals with an infrared FDA-approved dye. *Biophys. J.* 107, L09-L012 (2014).

16. Han, Z. et al. Fluorescent protein voltage probes derived from ArcLight that respond to membrane voltage changes with fast kinetics. *PLoS One* 8, e81295 (2013).
17. Gong, Y., Li, J. Z. & Schnitzer, M. J. Enhanced Archaerhodopsin Fluorescent Protein Voltage Indicators. *PLoS One* 8, e66959 (2013).
18. Barnett, L., Platisa, J., Popovic, M., Pieribone, V. A. & Hughes, T. A fluorescent, genetically-encoded voltage probe capable of resolving action potentials. *PLoS One* 7, e43454 (2012).
19. Akemann, W. et al. Imaging neural circuit dynamics with a voltage-sensitive fluorescent protein. *J. Neurophysiol.* 108, 2323-2337 (2012).
20. Encell, L. P. et al. Development of a dehalogenase-based protein fusion tag capable of rapid, selective and covalent attachment to customizable ligands. *Curr. Chem. Genomics* 6, 55-71 (2012).
21. Jin, L. et al. Single action potentials and subthreshold electrical events imaged in neurons with a fluorescent protein voltage probe. *Neuron* 75, 779-785 (2012).
22. Yan, P. et al. Palette of fluorinated voltage-sensitive hemicyanine dyes. *Proc. Natl. Acad. Sci.* 109, 20443-20448 (2012).
23. Miller, E. W. et al. Optically monitoring voltage in neurons by photo-induced electron transfer through molecular wires. *Proc. Natl. Acad. Sci.* 109, 2114-2119 (2012).
24. Kralj, J. M., Hochbaum, D. R., Douglass, A. D. & Cohen, A. E. Electrical spiking in *Escherichia coli* probed with a fluorescent voltage-indicating protein. *Science (80-.).* 333, 345-348 (2011).
25. Kralj, J. M., Douglass, A. D., Hochbaum, D. R., Maclaurin, D. & Cohen, A. E. Optical recording of action potentials in mammalian neurons using a microbial rhodopsin. *Nat. Methods* 9, 90-95 (2011).
26. Lebeuf, R., Férézou, I., Rossier, J., Arseniyadis, S. & Cossy, J. Straightforward synthesis of the near-Infrared fluorescent voltagesensitive dye RH1691 and analogues thereof. *Org. Lett.* 11, 4822-4825 (2009).
27. Bradley, J., Luo, R., Otis, T. S. & DiGregorio, D. A. Submillisecond Optical Reporting of Membrane Potential In Situ Using a Neuronal Tracer Dye. *J. Neurosci.* 29, 9197-9209 (2009).
28. Gautier, A. et al. An Engineered Protein Tag for Multiprotein Labeling in Living Cells. *Chem. Biol.* 15, 128-136 (2008).
29. Los, G. V. et al. HaloTag: A novel protein labeling technology for cell imaging and protein analysis. *ACS Chem. Biol.* 3, 373-382 (2008).
30. Fromherz, P., Hübener, G., Kuhn, B. & Hinner, M. J. ANNINE-6plus, a voltage-sensitive dye with good solubility, strong membrane binding and high sensitivity. *Eur. Biophys. J.* 37, 509-514 (2008).
31. Sjulson, L. & Miesenbock, G. Rational Optimization and Imaging In Vivo of a Genetically Encoded Optical Voltage Reporter. *J. Neurosci.* 28, 5582-5593 (2008).
32. Knopfel, T., Tomita, K., Shimazaki, R. & Sakai, R. Optical recordings of membrane potential using genetically targeted voltage-sensitive fluorescent proteins. *Methods* 30, 42-48 (2003).
33. Guerrero, G., Siegel, M. S., Roska, B., Loots, E. & Isacoff, E. Y. Tuning FlaSh: redesign of the dynamics, voltage range, and color of the genetically encoded optical sensor of membrane potential. *Biophys. J.* 83, 3607-3618 (2002).
34. Ataka, K. & Pieribone, V. A. A genetically targetable fluorescent probe of channel gating with rapid kinetics. *Biophys. J.* 82, 509-516 (2002).
35. Keppler, A. et al. A general method for the covalent labeling of fusion proteins with small molecules in vivo. *Nat. Biotechnol.* 21, 86-89 (2002).
37. Siegel, M. S. & Isacoff, E. Y. A genetically encoded optical probe of membrane voltage. *Neuron* 19, 735-741 (1997).

It will be understood that various details of the presently disclosed subject matter can be changed without departing from the scope of the subject matter disclosed herein. Furthermore, the foregoing description is for the purpose of illustration only, and not for the purpose of limitation.

What is claimed is:

1. A voltage indicator comprising:
   a polypeptide comprising a membrane-localized voltage-sensitive protein and a capture protein, and
   a cell-permeable fluorescent dye, wherein the voltage-sensitive protein is coupled to the capture protein and the capture protein is covalently or noncovalently labeled with the cell-permeable fluorescent dye.

2. The voltage indicator of claim 1, wherein the membrane-localized voltage sensitive protein is selected from the group consisting of QuasAr2, Ace2N, Ciona intestinalis voltage-sensing domain (CiVSD), *Danio rerio* voltage-sensing domain (DrVSD), *Gallus* voltage-sensing domain (GgVSD), and a combination thereof.

3. The voltage indicator of claim 2, wherein the voltage-sensitive protein and the capture protein are coupled through a linker.

4. The voltage indicator of claim 2, wherein the capture protein is a self-labeling protein.

5. The voltage indicator of claim 4, wherein the membrane-localized voltage sensitive protein comprises QuasAr2.

6. The voltage indicator of claim 5, wherein the polypeptide comprises an amino acid having the sequence selected from the group consisting of: SEQ ID NOS: 2, 4, 6, 8, 10, 12, 16, 18, 20, and 22.

7. The voltage indicator of claim 4, wherein the membrane-localized voltage sensitive protein comprises Ace2N.

8. The voltage indicator of claim 7, wherein the polypeptide comprises the amino acid sequence of SEQ ID NO: 24.

9. The voltage indicator of claim 4, wherein the membrane-localized voltage sensitive protein comprises CiVSD.

10. The voltage indicator of claim 9, wherein the polypeptide comprises an amino acid having the sequence selected from the group consisting of: SEQ ID NOS: 26 and 28.

11. The voltage indicator of claim 4, wherein the membrane-localized voltage sensitive protein comprises DrVSD.

12. The voltage indicator of claim 11, wherein the polypeptide comprises the amino acid sequence of SEQ ID NO: 30.

13. The voltage indicator of claim 4, wherein the membrane-localized voltage sensitive protein comprises GgVSD.

14. The voltage indicator of claim 13, wherein the polypeptide comprises the amino acid sequence of SEQ ID NO: 32.

15. The voltage indicator of claim 2, wherein the capture protein is biotin-avidin.

16. The voltage indicator of claim 1, wherein the cell permeable fluorescent dyes is an azetidine-containing dye.

17. The voltage indicator of claim 16, wherein the azetidine-containing dye is selected from the group consisting of

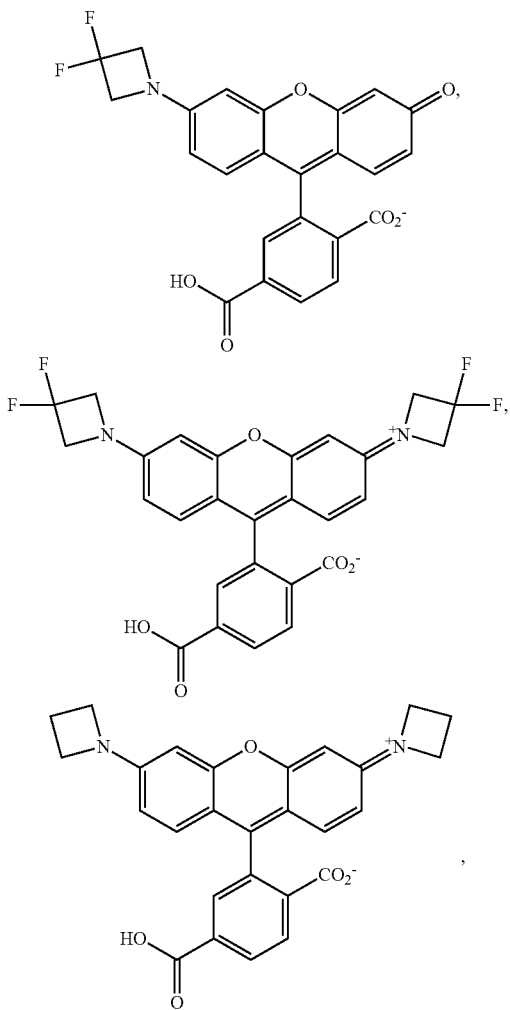

-continued

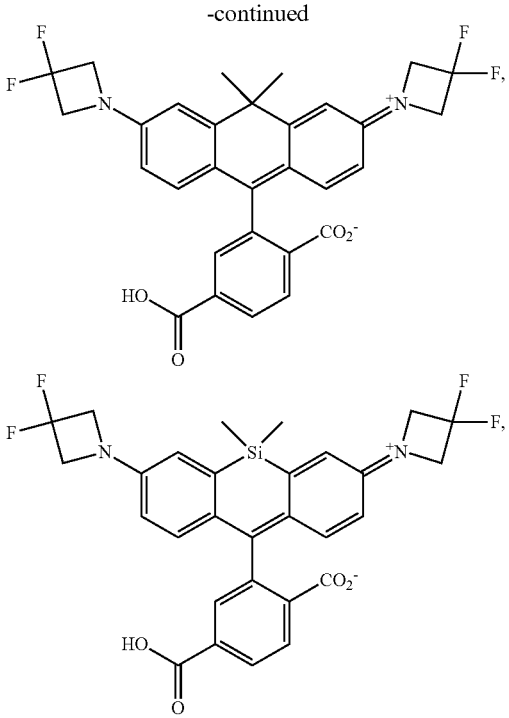

and combinations thereof.

18. A method of measuring voltage, the method comprising
administering
(a) a polypeptide comprising a membrane-localized voltage-sensitive protein coupled to a capture protein, and
(b) a cell-permeable fluorescent dye, wherein the capture protein is capable of capturing the cell-permeable fluorescent dye; and
measuring changes in fluorescence when the cell-permeable fluorescent dye is captured by the capture protein of the polypeptide.

19. The method of claim 18, wherein changes in fluorescence are observed with a microscope.

20. The method of claim 18, further comprising measuring changes in voltage based upon changes in fluorescence.

* * * * *

UNITED STATES PATENT AND TRADEMARK OFFICE
CERTIFICATE OF CORRECTION

| | | |
|---|---|---|
| PATENT NO. | : 12,474,345 B2 | Page 1 of 1 |
| APPLICATION NO. | : 17/835535 | |
| DATED | : November 18, 2025 | |
| INVENTOR(S) | : Schreiter et al. | |

It is certified that error appears in the above-identified patent and that said Letters Patent is hereby corrected as shown below:

In the Claims

Claim 15, Column 87, Line 2, replace "biotin-avidin." with "avidin."

Signed and Sealed this
Thirteenth Day of January, 2026

John A. Squires
*Director of the United States Patent and Trademark Office*

SEQUENCE LISTING

```
<160> NUMBER OF SEQ ID NOS: 32

<210> SEQ ID NO 1
<211> LENGTH: 1767
<212> TYPE: DNA
<213> ORGANISM: Artificial
<220> FEATURE:
<223> OTHER INFORMATION: QuasAr2-HaloTag Ligand

<400> SEQUENCE: 1
atggtaagta tcgctctgca ggctggttac gacctactgg gtgacggcag acctgaaacc      60
ctgtggctgg gcatcggcac tctgctgatg ctgattggaa ccttctactt tctggtccgc     120
ggatggggag tcaccgataa ggatgcccgg gaatattacg ctgtgactat cctggtgtcc     180
ggaatcgcat ccgccgcata tctgtctatg ttctttggta tcgggcttac tgaggtgtcc     240
gtcgggggcg aaatgttgga tatctattat gccaggtacg cccagtggct gtttaccacc     300
ccacttctgc tgctgcacct ggcccttctc gctaaggtgg atcgggtgac catcggcacc     360
ctggtgggtg tggacgccct gatgatcgtc actggcctca tcggagcctt gagccacacg     420
gccatagcca gatacagttg gtggttgttc tctacaattt gcatgatagt ggtgctctat     480
gttctggcta catccctgcg atctgctgca aaggagcggg gccccgaggt ggcatctacc     540
```

-continued

```
tttaacaccc tgacagctct ggtcttggtg ctgtggaccg cttaccctat cctgtggatc    600
ataggcactg agggcgctgg cgtggtgggc ctgggcatcg aaactctgct gtttatggtg    660
ttggacgtga ctgccaaggt cggctttggc tttatcctgt tgagatcccg ggctattctg    720
ggcgacaccg aggcaccaga acccagtgcc ggtgccgatg tcagtgccgc cgacatggca    780
gaaatcggta ctggctttcc attcgacccc cattatgtgg aagtcctggg cgagcgcatg    840
cactacgtcg atgttggtcc gcgcgatggc acccctgtgc tgttcctgca cggtaacccg    900
acctcctcct acgtgtggcg caacatcatc ccgcatgttg caccgaccca tcgctgcatt    960
gctccagacc tgatcggtat gggcaaatcc gacaaaccag acctgggtta tttcttcgac   1020
gaccacgtcc gcttcatgga tgccttcatc gaagccctgg tctggaaga ggtcgtcctg    1080 gtcattcacg actggggctc cgctctgggt ttccactggg ccaagcgcaa tccagagcgc   1140
gtcaaaggta ttgcatttat ggagttcatc cgccctatcc cgacctggga cgaatggcca   1200
gaatttgccc gcgagacctt ccaggccttc cgcaccaccg acgtcggccg caagctgatc   1260
atcgatcaga acgtttttat cgagggtacg ctgccgatgg gtgtcgtccg cccgctgact   1320
gaagtcgaga tggaccatta ccgcgagccg ttcctgaatc ctgttgaccg cgagccactg   1380
tggcgcttcc caaacgagct gccaatcgcc ggtgagccag cgaacatcgt cgcgctggtc   1440
gaagaataca tggactggct gcaccagtcc cctgtcccga gctgctgtt ctggggcacc    1500 ccaggcgttc tgatcccacc ggccgaagcc gctcgcctgg ccaaaagcct gcctaactgc   1560
aaggctgtgg acatcggccc gggtctgaat ctgctgcaag aagacaaccc ggacctgatc   1620
ggcagcgaga tcgcgcgctg gctgtcgacg ctcgagattt ccggcgagcc aaccactaag   1680
agtagaatca caagcgaagg cgagtacatc cccctggatc aaatagacat aaatgtaggt   1740
ggatttgttt atgagaatga agtataa                                      1767
```

<210> SEQ ID NO 2
<211> LENGTH: 588
<212> TYPE: PRT
<213> ORGANISM: Artificial
<220> FEATURE:
<223> OTHER INFORMATION: QuasAr2-HaloTag Ligand

<400> SEQUENCE: 2

```
Met Val Ser Ile Ala Leu Gln Ala Gly Tyr Asp Leu Leu Gly Asp Gly
1               5                   10                  15

Arg Pro Glu Thr Leu Trp Leu Gly Ile Gly Thr Leu Leu Met Leu Ile
            20                  25                  30

Gly Thr Phe Tyr Phe Leu Val Arg Gly Trp Gly Val Thr Asp Lys Asp
        35                  40                  45

Ala Arg Glu Tyr Tyr Ala Val Thr Ile Leu Val Ser Gly Ile Ala Ser
    50                  55                  60

Ala Ala Tyr Leu Ser Met Phe Phe Gly Ile Gly Leu Thr Glu Val Ser
65                  70                  75                  80

Val Gly Gly Glu Met Leu Asp Ile Tyr Tyr Ala Arg Tyr Ala Gln Trp
                85                  90                  95

Leu Phe Thr Thr Pro Leu Leu Leu Leu His Leu Ala Leu Leu Ala Lys
            100                 105                 110

Val Asp Arg Val Thr Ile Gly Thr Leu Val Gly Val Asp Ala Leu Met
        115                 120                 125

Ile Val Thr Gly Leu Ile Gly Ala Leu Ser His Thr Ala Ile Ala Arg
    130                 135                 140
```

```
Tyr Ser Trp Trp Leu Phe Ser Thr Ile Cys Met Ile Val Val Leu Tyr
145                 150                 155                 160

Val Leu Ala Thr Ser Leu Arg Ser Ala Ala Lys Glu Arg Gly Pro Glu
                165                 170                 175

Val Ala Ser Thr Phe Asn Thr Leu Thr Ala Leu Val Leu Val Leu Trp
            180                 185                 190

Thr Ala Tyr Pro Ile Leu Trp Ile Ile Gly Thr Glu Gly Ala Gly Val
            195                 200                 205

Val Gly Leu Gly Ile Glu Thr Leu Leu Phe Met Val Leu Asp Val Thr
            210                 215                 220

Ala Lys Val Gly Phe Gly Phe Ile Leu Leu Arg Ser Arg Ala Ile Leu
225                 230                 235                 240

Gly Asp Thr Glu Ala Pro Glu Pro Ser Ala Gly Ala Asp Val Ser Ala
                245                 250                 255

Ala Asp Met Ala Glu Ile Gly Thr Gly Phe Pro Phe Asp Pro His Tyr
            260                 265                 270

Val Glu Val Leu Gly Glu Arg Met His Tyr Val Asp Val Gly Pro Arg
            275                 280                 285

Asp Gly Thr Pro Val Leu Phe Leu His Gly Asn Pro Thr Ser Ser Tyr
            290                 295                 300

Val Trp Arg Asn Ile Ile Pro His Val Ala Pro Thr His Arg Cys Ile
305                 310                 315                 320

Ala Pro Asp Leu Ile Gly Met Gly Lys Ser Asp Lys Pro Asp Leu Gly
                325                 330                 335

Tyr Phe Phe Asp Asp His Val Arg Phe Met Asp Ala Phe Ile Glu Ala
            340                 345                 350

Leu Gly Leu Glu Glu Val Val Leu Val Ile His Asp Trp Gly Ser Ala
            355                 360                 365

Leu Gly Phe His Trp Ala Lys Arg Asn Pro Glu Arg Val Lys Gly Ile
            370                 375                 380

Ala Phe Met Glu Phe Ile Arg Pro Ile Pro Thr Trp Asp Glu Trp Pro
385                 390                 395                 400

Glu Phe Ala Arg Glu Thr Phe Gln Ala Phe Arg Thr Thr Asp Val Gly
                405                 410                 415

Arg Lys Leu Ile Ile Asp Gln Asn Val Phe Ile Glu Gly Thr Leu Pro
            420                 425                 430

Met Gly Val Val Arg Pro Leu Thr Glu Val Glu Met Asp His Tyr Arg
            435                 440                 445

Glu Pro Phe Leu Asn Pro Val Asp Arg Glu Pro Leu Trp Arg Phe Pro
            450                 455                 460

Asn Glu Leu Pro Ile Ala Gly Glu Pro Ala Asn Ile Val Ala Leu Val
465                 470                 475                 480

Glu Glu Tyr Met Asp Trp Leu His Gln Ser Pro Val Pro Lys Leu Leu
            485                 490                 495

Phe Trp Gly Thr Pro Gly Val Leu Ile Pro Pro Ala Glu Ala Ala Arg
            500                 505                 510

Leu Ala Lys Ser Leu Pro Asn Cys Lys Ala Val Asp Ile Gly Pro Gly
            515                 520                 525

Leu Asn Leu Leu Gln Glu Asp Asn Pro Asp Leu Ile Gly Ser Glu Ile
            530                 535                 540

Ala Arg Trp Leu Ser Thr Leu Glu Ile Ser Gly Glu Pro Thr Thr Lys
545                 550                 555                 560
```

Ser Arg Ile Thr Ser Glu Gly Glu Tyr Ile Pro Leu Asp Gln Ile Asp
            565                 570                 575

Ile Asn Val Gly Gly Phe Cys Tyr Glu Asn Glu Val
            580                 585

<210> SEQ ID NO 3
<211> LENGTH: 1755
<212> TYPE: DNA
<213> ORGANISM: Artificial
<220> FEATURE:
<223> OTHER INFORMATION: QuasAr2-HaloTag-4 Ligand

<400> SEQUENCE: 3

| | |
|---|---|
| atggtaagta tcgctctgca ggctggttac gacctactgg gtgacggcag acctgaaacc | 60 |
| ctgtggctgg gcatcggcac tctgctgatg ctgattggaa ccttctactt tctggtccgc | 120 |
| ggatggggag tcaccgataa ggatgcccgg aatattacg ctgtgactat cctggtgtcc | 180 |
| ggaatcgcat ccgccgcata tctgtctatg ttctttggta tcgggcttac tgaggtgtcc | 240 |
| gtcgggggcg aaatgttgga tatctattat gccaggtacg cccagtggct gtttaccacc | 300 |
| ccacttctgc tgctgcacct ggccttctc gctaaggtgg atcgggtgac catcggcacc | 360 |
| ctggtgggtg tggacgccct gatgatcgtc actggcctca tcggagcctt gagccacacg | 420 |
| gccatagcca gatacagttg gtggttgttc tctacaattt gcatgatagt ggtgctctat | 480 |
| gttctggcta catccctgcg atctgctgca aggagcggg ccccgaggt ggcatctacc | 540 |
| tttaacaccc tgacagctct ggtcttggtg ctgtggaccg cttaccctat cctgtggatc | 600 |
| ataggcactg agggcgctgg cgtggtgggc ctgggcatcg aaactctgct gtttatggtg | 660 |
| ttggacgtga ctgccaaggt cggctttggc tttatcctgt tgagatcccg ggctattctg | 720 |
| ggcgacaccg aggcaccaga acccagtgcc ggtgccgatg tcatggcaga atcggtact | 780 |
| ggctttccat cgaccccca ttatgtggaa gtcctgggcg agcgcatgca ctacgtcgat | 840 |
| gttggtccgc gcgatggcac ccctgtgctg ttcctgcacg gtaacccgac ctcctcctac | 900 |
| gtgtggcgca acatcatccc gcatgttgca ccgacccatc gctgcattgc tccagacctg | 960 |
| atcggtatgg gcaaatccga caaaccagac ctgggttatt tcttcgacga ccacgtccgc | 1020 |
| ttcatggatg ccttcatcga agccctgggt ctggaagagg tcgtcctggt cattcacgac | 1080 |
| tggggctccg ctctgggttt ccactgggcc aagcgcaatc cagagcgcgt caaaggtatt | 1140 |
| gcatttatgg agttcatccg ccctatcccg acctgggacg aatggccaga atttgcccgc | 1200 |
| gagaccttcc aggccttccg caccaccgac gtcggccgca gctgatcat cgatcagaac | 1260 |
| gtttttatcg agggtacgct gccgatgggt gtcgtccgcc cgctgactga agtcgagatg | 1320 |
| gaccattacc gcgagccgtt cctgaatcct gttaccgcg agccactgtg gcgcttccca | 1380 |
| aacgagctgc caatcgccgg tgagccagcg aacatcgtcg cgctggtcga agaatacatg | 1440 |
| gactggctgc accagtcccc tgtcccgaag ctgctgttct ggggcacccc aggcgttctg | 1500 |
| atcccaccgg ccgaagccgc tcgcctggcc aaaagcctgc taactgcaa ggctgtggac | 1560 |
| atcggcccgg gtctgaatct gctgcaagaa gacaacccgg acctgatcgg cagcgagatc | 1620 |
| gcgcgctggc tgtcgacgct cgagatttcc ggcgagccaa ccactaagag tagaatcaca | 1680 |
| agcgaaggcg agtacatccc cctggatcaa atagacataa atgtaggtgg attttgttat | 1740 |
| gagaatgaag tataa | 1755 |

<210> SEQ ID NO 4
<211> LENGTH: 584

```
<212> TYPE: PRT
<213> ORGANISM: Artificial
<220> FEATURE:
<223> OTHER INFORMATION: QuasAr2-HaloTag-4 Ligand

<400> SEQUENCE: 4
```

| | | | | | | | | | | | | | | |
|---|---|---|---|---|---|---|---|---|---|---|---|---|---|---|
| Met | Val | Ser | Ile | Ala | Leu | Gln | Ala | Gly | Tyr | Asp | Leu | Leu | Gly | Asp | Gly |
| 1 | | | | 5 | | | | | 10 | | | | | 15 | |
| Arg | Pro | Glu | Thr | Leu | Trp | Leu | Gly | Ile | Gly | Thr | Leu | Leu | Met | Leu | Ile |
| | | | 20 | | | | | 25 | | | | | 30 | | |
| Gly | Thr | Phe | Tyr | Phe | Leu | Val | Arg | Gly | Trp | Gly | Val | Thr | Asp | Lys | Asp |
| | | | 35 | | | | | 40 | | | | | 45 | | |
| Ala | Arg | Glu | Tyr | Tyr | Ala | Val | Thr | Ile | Leu | Val | Ser | Gly | Ile | Ala | Ser |
| | 50 | | | | | 55 | | | | | 60 | | | | |
| Ala | Ala | Tyr | Leu | Ser | Met | Phe | Phe | Gly | Ile | Gly | Leu | Thr | Glu | Val | Ser |
| 65 | | | | | 70 | | | | | 75 | | | | | 80 |
| Val | Gly | Gly | Glu | Met | Leu | Asp | Ile | Tyr | Tyr | Ala | Arg | Tyr | Ala | Gln | Trp |
| | | | | 85 | | | | | 90 | | | | | 95 | |
| Leu | Phe | Thr | Thr | Pro | Leu | Leu | Leu | His | Leu | Ala | Leu | Leu | Ala | Lys | |
| | | | | 100 | | | | | 105 | | | | | 110 | |
| Val | Asp | Arg | Val | Thr | Ile | Gly | Thr | Leu | Val | Gly | Val | Asp | Ala | Leu | Met |
| | | | 115 | | | | | 120 | | | | | 125 | | |
| Ile | Val | Thr | Gly | Leu | Ile | Gly | Ala | Leu | Ser | His | Thr | Ala | Ile | Ala | Arg |
| | 130 | | | | | 135 | | | | | 140 | | | | |
| Tyr | Ser | Trp | Trp | Leu | Phe | Ser | Thr | Ile | Cys | Met | Ile | Val | Val | Leu | Tyr |
| 145 | | | | | 150 | | | | | 155 | | | | | 160 |
| Val | Leu | Ala | Thr | Ser | Leu | Arg | Ser | Ala | Ala | Lys | Glu | Arg | Gly | Pro | Glu |
| | | | | 165 | | | | | 170 | | | | | 175 | |
| Val | Ala | Ser | Thr | Phe | Asn | Thr | Leu | Thr | Ala | Leu | Val | Leu | Val | Leu | Trp |
| | | | 180 | | | | | 185 | | | | | 190 | | |
| Thr | Ala | Tyr | Pro | Ile | Leu | Trp | Ile | Ile | Gly | Thr | Glu | Gly | Ala | Gly | Val |
| | | 195 | | | | | 200 | | | | | 205 | | | |
| Val | Gly | Leu | Gly | Ile | Glu | Thr | Leu | Leu | Phe | Met | Val | Leu | Asp | Val | Thr |
| | 210 | | | | | 215 | | | | | 220 | | | | |
| Ala | Lys | Val | Gly | Phe | Gly | Phe | Ile | Leu | Leu | Arg | Ser | Arg | Ala | Ile | Leu |
| 225 | | | | | 230 | | | | | 235 | | | | | 240 |
| Gly | Asp | Thr | Glu | Ala | Pro | Glu | Pro | Ser | Ala | Gly | Ala | Asp | Val | Met | Ala |
| | | | | 245 | | | | | 250 | | | | | 255 | |
| Glu | Ile | Gly | Thr | Gly | Phe | Pro | Phe | Asp | Pro | His | Tyr | Val | Glu | Val | Leu |
| | | | 260 | | | | | 265 | | | | | 270 | | |
| Gly | Glu | Arg | Met | His | Tyr | Val | Asp | Val | Gly | Pro | Arg | Asp | Gly | Thr | Pro |
| | | 275 | | | | | 280 | | | | | 285 | | | |
| Val | Leu | Phe | Leu | His | Gly | Asn | Pro | Thr | Ser | Ser | Tyr | Val | Trp | Arg | Asn |
| | 290 | | | | | 295 | | | | | 300 | | | | |
| Ile | Ile | Pro | His | Val | Ala | Pro | Thr | His | Arg | Cys | Ile | Ala | Pro | Asp | Leu |
| 305 | | | | | 310 | | | | | 315 | | | | | 320 |
| Ile | Gly | Met | Gly | Lys | Ser | Asp | Lys | Pro | Asp | Leu | Gly | Tyr | Phe | Phe | Asp |
| | | | | 325 | | | | | 330 | | | | | 335 | |
| Asp | His | Val | Arg | Phe | Met | Asp | Ala | Phe | Ile | Glu | Ala | Leu | Gly | Leu | Glu |
| | | | 340 | | | | | 345 | | | | | 350 | | |
| Glu | Val | Val | Leu | Val | Ile | His | Asp | Trp | Gly | Ser | Ala | Leu | Gly | Phe | His |
| | | 355 | | | | | 360 | | | | | 365 | | | |
| Trp | Ala | Lys | Arg | Asn | Pro | Glu | Arg | Val | Lys | Gly | Ile | Ala | Phe | Met | Glu |
| | 370 | | | | | 375 | | | | | 380 | | | | |

```
Phe Ile Arg Pro Ile Pro Thr Trp Asp Glu Trp Pro Glu Phe Ala Arg
385                 390                 395                 400
Glu Thr Phe Gln Ala Phe Arg Thr Thr Asp Val Gly Arg Lys Leu Ile
            405                 410                 415
Ile Asp Gln Asn Val Phe Ile Glu Gly Thr Leu Pro Met Gly Val Val
        420                 425                 430
Arg Pro Leu Thr Glu Val Glu Met Asp His Tyr Arg Glu Pro Phe Leu
    435                 440                 445
Asn Pro Val Asp Arg Glu Pro Leu Trp Arg Phe Pro Asn Glu Leu Pro
450                 455                 460
Ile Ala Gly Glu Pro Ala Asn Ile Val Ala Leu Val Glu Glu Tyr Met
465                 470                 475                 480
Asp Trp Leu His Gln Ser Pro Val Pro Lys Leu Leu Phe Trp Gly Thr
            485                 490                 495
Pro Gly Val Leu Ile Pro Pro Ala Glu Ala Ala Arg Leu Ala Lys Ser
        500                 505                 510
Leu Pro Asn Cys Lys Ala Val Asp Ile Gly Pro Gly Leu Asn Leu Leu
    515                 520                 525
Gln Glu Asp Asn Pro Asp Leu Ile Gly Ser Glu Ile Ala Arg Trp Leu
530                 535                 540
Ser Thr Leu Glu Ile Ser Gly Glu Pro Thr Thr Lys Ser Arg Ile Thr
545                 550                 555                 560
Ser Glu Gly Glu Tyr Ile Pro Leu Asp Gln Ile Asp Ile Asn Val Gly
            565                 570                 575
Gly Phe Cys Tyr Glu Asn Glu Val
            580
```

<210> SEQ ID NO 5
<211> LENGTH: 1743
<212> TYPE: DNA
<213> ORGANISM: Artificial
<220> FEATURE:
<223> OTHER INFORMATION: QuasAr2-HaloTag-8 Ligand

<400> SEQUENCE: 5

```
atggtaagta tcgctctgca ggctggttac gacctactgg gtgacggcag acctgaaacc    60
ctgtggctgg gcatcggcac tctgctgatg ctgattggaa ccttctactt tctggtccgc   120
ggatggggag tcaccgataa ggatgcccgg aatattacg ctgtgactat cctggtgtcc    180
ggaatcgcat ccgccgcata tctgtctatg ttctttggta tcgggcttac tgaggtgtcc   240
gtcggggggcg aaatgttgga tatctattat gccaggtacg cccagtggct gtttaccacc   300
ccacttctgc tgctgcacct ggccttctc gctaaggtgg atcgggtgac catcggcacc    360
ctggtgggtg tggacgccct gatgatcgtc actggcctca tcgagcctt gagccacacg    420
gccatagcca gatacagttg gtggttgttc tctacaattt gcatgatagt ggtgctctat   480
gttctggcta catccctgcg atctgctgca aaggagcggg ccccgaggt ggcatctacc    540
tttaacaccc tgacagctct ggtcttggtg ctgtggaccg cttaccctat cctgtggatc   600
ataggcactg agggcgctgg cgtggtgggc ctgggcatcg aaactctgct gtttatggtg   660
ttggacgtga ctgccaaggt cggctttgcg tttatcctgt tgagatcccg ggctattctg   720
ggcgacaccg aggcaccaga acccagtgcc atggcagaaa tcggtactgg ctttccattc   780
gaccccatt atgtggaagt cctgggcgag cgcatgcact acgtcgatgt tggtccgcgc   840
gatggcaccc ctgtgctgtt cctgcacggt aacccgacct cctcctacgt gtggcgcaac   900
```

-continued

```
atcatcccgc atgttgcacc gacccatcgc tgcattgctc cagacctgat cggtatgggc    960
aaatccgaca aaccagacct gggttatttc ttcgacgacc acgtccgctt catggatgcc   1020
ttcatcgaag ccctgggtct ggaagaggtc gtcctggtca ttcacgactg gggctccgct   1080
ctgggtttcc actgggccaa gcgcaatcca gagcgcgtca aggtattgc atttatggag    1140
ttcatccgcc ctatcccgac ctgggacgaa tggccagaat tgcccgcga gaccttccag    1200
gccttccgca ccaccgacgt cggccgcaag ctgatcatcg atcagaacgt ttttatcgag   1260
ggtacgctgc cgatgggtgt cgtccgcccg ctgactgaag tcgagatgga ccattaccgc   1320
gagccgttcc tgaatcctgt tgaccgcgag ccactgtggc gcttcccaaa cgagctgcca   1380
atcgccggtg agccagcgaa catcgtcgcg ctggtcgaag aatacatgga ctggctgcac   1440
cagtcccctg tcccgaagct gctgttctgg ggcaccccag gcgttctgat cccaccggcc   1500
gaagccgctc gcctggccaa agcctgcct aactgcaagg ctgtggacat cggcccgggt   1560
ctgaatctgc tgcaagaaga caaccccgga ctgatcggca gcgagatcgc gcgctggctg   1620
tcgacgctcg agatttccgg cgagccaacc actaagagta gaatcacaag cgaaggcgag   1680
tacatccccc tggatcaaat agacataaat gtaggtggat tttgttatga aatgaagta    1740
taa                                                                 1743
```

<210> SEQ ID NO 6
<211> LENGTH: 580
<212> TYPE: PRT
<213> ORGANISM: Artificial
<220> FEATURE:
<223> OTHER INFORMATION: QuasAr2-HaloTag-8 Ligand
<400> SEQUENCE: 6

```
Met Val Ser Ile Ala Leu Gln Ala Gly Tyr Asp Leu Leu Gly Asp Gly
1               5                   10                  15

Arg Pro Glu Thr Leu Trp Leu Gly Ile Gly Thr Leu Leu Met Leu Ile
            20                  25                  30

Gly Thr Phe Tyr Phe Leu Val Arg Gly Trp Gly Val Thr Asp Lys Asp
        35                  40                  45

Ala Arg Glu Tyr Tyr Ala Val Thr Ile Leu Val Ser Gly Ile Ala Ser
    50                  55                  60

Ala Ala Tyr Leu Ser Met Phe Phe Gly Ile Gly Leu Thr Glu Val Ser
65                  70                  75                  80

Val Gly Gly Glu Met Leu Asp Ile Tyr Tyr Ala Arg Tyr Ala Gln Trp
                85                  90                  95

Leu Phe Thr Thr Pro Leu Leu Leu His Leu Ala Leu Leu Ala Lys
            100                 105                 110

Val Asp Arg Val Thr Ile Gly Thr Leu Val Gly Val Asp Ala Leu Met
        115                 120                 125

Ile Val Thr Gly Leu Ile Gly Ala Leu Ser His Thr Ala Ile Ala Arg
    130                 135                 140

Tyr Ser Trp Trp Leu Phe Ser Thr Ile Cys Met Ile Val Val Leu Tyr
145                 150                 155                 160

Val Leu Ala Thr Ser Leu Arg Ser Ala Ala Lys Glu Arg Gly Pro Glu
                165                 170                 175

Val Ala Ser Thr Phe Asn Thr Leu Thr Ala Leu Val Leu Val Leu Trp
            180                 185                 190

Thr Ala Tyr Pro Ile Leu Trp Ile Ile Gly Thr Glu Gly Ala Gly Val
        195                 200                 205
```

```
Val Gly Leu Gly Ile Glu Thr Leu Leu Phe Met Val Leu Asp Val Thr
210                 215                 220

Ala Lys Val Gly Phe Gly Phe Ile Leu Leu Arg Ser Arg Ala Ile Leu
225                 230                 235                 240

Gly Asp Thr Glu Ala Pro Glu Pro Ser Ala Met Ala Glu Ile Gly Thr
            245                 250                 255

Gly Phe Pro Phe Asp Pro His Tyr Val Glu Val Leu Gly Glu Arg Met
            260                 265                 270

His Tyr Val Asp Val Gly Pro Arg Asp Gly Thr Pro Val Leu Phe Leu
                275                 280                 285

His Gly Asn Pro Thr Ser Ser Tyr Val Trp Arg Asn Ile Ile Pro His
290                 295                 300

Val Ala Pro Thr His Arg Cys Ile Ala Pro Asp Leu Ile Gly Met Gly
305                 310                 315                 320

Lys Ser Asp Lys Pro Asp Leu Gly Tyr Phe Phe Asp Asp His Val Arg
                325                 330                 335

Phe Met Asp Ala Phe Ile Glu Ala Leu Gly Leu Glu Glu Val Val Leu
            340                 345                 350

Val Ile His Asp Trp Gly Ser Ala Leu Gly Phe His Trp Ala Lys Arg
        355                 360                 365

Asn Pro Glu Arg Val Lys Gly Ile Ala Phe Met Glu Phe Ile Arg Pro
370                 375                 380

Ile Pro Thr Trp Asp Glu Trp Pro Glu Phe Ala Arg Glu Thr Phe Gln
385                 390                 395                 400

Ala Phe Arg Thr Thr Asp Val Gly Arg Lys Leu Ile Ile Asp Gln Asn
            405                 410                 415

Val Phe Ile Glu Gly Thr Leu Pro Met Gly Val Val Arg Pro Leu Thr
            420                 425                 430

Glu Val Glu Met Asp His Tyr Arg Glu Pro Phe Leu Asn Pro Val Asp
        435                 440                 445

Arg Glu Pro Leu Trp Arg Phe Pro Asn Glu Leu Pro Ile Ala Gly Glu
    450                 455                 460

Pro Ala Asn Ile Val Ala Leu Val Glu Glu Tyr Met Asp Trp Leu His
465                 470                 475                 480

Gln Ser Pro Val Pro Lys Leu Leu Phe Trp Gly Thr Pro Gly Val Leu
            485                 490                 495

Ile Pro Pro Ala Glu Ala Ala Arg Leu Ala Lys Ser Leu Pro Asn Cys
            500                 505                 510

Lys Ala Val Asp Ile Gly Pro Gly Leu Asn Leu Leu Gln Glu Asp Asn
        515                 520                 525

Pro Asp Leu Ile Gly Ser Glu Ile Ala Arg Trp Leu Ser Thr Leu Glu
530                 535                 540

Ile Ser Gly Glu Pro Thr Thr Lys Ser Arg Ile Thr Ser Glu Gly Glu
545                 550                 555                 560

Tyr Ile Pro Leu Asp Gln Ile Asp Ile Asn Val Gly Gly Phe Cys Tyr
            565                 570                 575

Glu Asn Glu Val
            580

<210> SEQ ID NO 7
<211> LENGTH: 1731
<212> TYPE: DNA
<213> ORGANISM: Artificial
<220> FEATURE:
<223> OTHER INFORMATION: QuasAr2-HaloTag-12 Ligand
```

<400> SEQUENCE: 7

```
atggtaagta tcgctctgca ggctggttac gacctactgg gtgacggcag acctgaaacc      60
ctgtggctgg gcatcggcac tctgctgatg ctgattggaa ccttctactt tctggtccgc     120
ggatggggag tcaccgataa ggatgcccgg gaatattacg ctgtgactat cctggtgtcc     180
ggaatcgcat ccgccgcata tctgtctatg ttctttggta tcgggcttac tgaggtgtcc     240
gtcggggcg aaatgttgga tatctattat gccaggtacg cccagtggct gtttaccacc     300
ccacttctgc tgctgcacct ggcccttctc gctaaggtgg atcgggtgac catcggcacc     360
ctggtgggtg tggacgccct gatgatcgtc actggcctca tcggagcctt gagccacacg     420
gccatagcca gatacagttg gtggttgttc tctacaattt gcatgatagt ggtgctctat     480
gttctggcta catccctgcg atctgctgca aggagcggg ccccgaggt ggcatctacc     540
tttaacaccc tgacagctct ggtcttggtg ctgtggaccg cttaccctat cctgtggatc     600
ataggcactg agggcgctgg cgtggtgggc ctgggcatca aaactctgct gtttatggtg     660
ttggacgtga ctgccaaggt cggctttggc tttatcctgt tgagatcccg ggctattctg     720
ggcgacaccg aggcaccaat ggcagaaatc ggtactggct ttccattcga cccccattat     780
gtggaagtcc tgggcgagcg catgcactac gtcgatgttg tccgcgcga tggcacccct     840
gtgctgttcc tgcacggtaa cccgacctcc tcctacgtgt ggcgcaacat catcccgcat     900
gttgcaccga cccatcgctg cattgctcca gacctgatcg tatgggcaa tccgacaaa     960
ccagacctgg ttatttctt cgacgaccac gtccgcttca tggatgcctt catcgaagcc    1020
ctgggtctgg aagaggtcgt cctggtcatt cacgactggg gctccgctct gggtttccac    1080
tgggccaagc gcaatccaga gcgcgtcaaa ggtattgcat ttatggagtt catccgccct    1140
atcccgacct gggacgaatg ccagaatttt gcccgcgaga ccttccaggc cttccgcacc    1200
accgacgtcg gccgcaagct gatcatcgat cagaacgttt ttatcgaggg tacgctgccg    1260
atgggtgtcg tccgcccgct gactgaagtc gagatggacc attaccgcga gccgttcctg    1320
aatcctgttg accgcgagcc actgtggcgc ttcccaaacg agctgccaat cgccggtgag    1380
ccagcgaaca tcgtcgcgct ggtcgaagaa tacatggact ggctgcacca gtcccctgtc    1440
ccgaagctgc tgttctgggg caccccaggc gttctgatcc caccggccga agccgctcgc    1500
ctggccaaaa gcctgcctaa ctgcaaggct gtggacatcg gccgggtct gaatctgctg    1560
caagaagaca cccggacct gatcggcagc gagatcgcgc gctggctgtc gacgctcgag    1620
atttccggcg agccaaccac taagagtaga atcacaagcg aaggcgagta catccccctg    1680
gatcaaatag acataaatgt aggtggattt tgttatgaga atgaagtata a              1731
```

<210> SEQ ID NO 8
<211> LENGTH: 576
<212> TYPE: PRT
<213> ORGANISM: Artificial
<220> FEATURE:
<223> OTHER INFORMATION: QuasAr2-HaloTag-12 Ligand

<400> SEQUENCE: 8

```
Met Val Ser Ile Ala Leu Gln Ala Gly Tyr Asp Leu Leu Gly Asp Gly
  1               5                  10                  15

Arg Pro Glu Thr Leu Trp Leu Gly Ile Gly Thr Leu Leu Met Leu Ile
             20                  25                  30

Gly Thr Phe Tyr Phe Leu Val Arg Gly Trp Gly Val Thr Asp Lys Asp
         35                  40                  45
```

```
Ala Arg Glu Tyr Tyr Ala Val Thr Ile Leu Val Ser Gly Ile Ala Ser
    50                  55                  60
Ala Ala Tyr Leu Ser Met Phe Phe Gly Ile Gly Leu Thr Glu Val Ser
65                  70                  75                  80
Val Gly Gly Glu Met Leu Asp Ile Tyr Tyr Ala Arg Tyr Ala Gln Trp
                    85                  90                  95
Leu Phe Thr Thr Pro Leu Leu Leu Leu His Leu Ala Leu Leu Ala Lys
                100                 105                 110
Val Asp Arg Val Thr Ile Gly Thr Leu Val Gly Val Asp Ala Leu Met
            115                 120                 125
Ile Val Thr Gly Leu Ile Gly Ala Leu Ser His Thr Ala Ile Ala Arg
        130                 135                 140
Tyr Ser Trp Trp Leu Phe Ser Thr Ile Cys Met Ile Val Val Leu Tyr
145                 150                 155                 160
Val Leu Ala Thr Ser Leu Arg Ser Ala Ala Lys Glu Arg Gly Pro Glu
                165                 170                 175
Val Ala Ser Thr Phe Asn Thr Leu Thr Ala Leu Val Leu Val Leu Trp
            180                 185                 190
Thr Ala Tyr Pro Ile Leu Trp Ile Ile Gly Thr Glu Gly Ala Gly Val
        195                 200                 205
Val Gly Leu Gly Ile Glu Thr Leu Leu Phe Met Val Leu Asp Val Thr
    210                 215                 220
Ala Lys Val Gly Phe Gly Phe Ile Leu Leu Arg Ser Arg Ala Ile Leu
225                 230                 235                 240
Gly Asp Thr Glu Ala Pro Met Ala Glu Ile Gly Thr Gly Phe Pro Phe
                245                 250                 255
Asp Pro His Tyr Val Glu Val Leu Gly Glu Arg Met His Tyr Val Asp
            260                 265                 270
Val Gly Pro Arg Asp Gly Thr Pro Val Leu Phe Leu His Gly Asn Pro
        275                 280                 285
Thr Ser Ser Tyr Val Trp Arg Asn Ile Ile Pro His Val Ala Pro Thr
    290                 295                 300
His Arg Cys Ile Ala Pro Asp Leu Ile Gly Met Gly Lys Ser Asp Lys
305                 310                 315                 320
Pro Asp Leu Gly Tyr Phe Phe Asp Asp His Val Arg Phe Met Asp Ala
                325                 330                 335
Phe Ile Glu Ala Leu Gly Leu Glu Glu Val Val Leu Val Ile His Asp
            340                 345                 350
Trp Gly Ser Ala Leu Gly Phe His Trp Ala Lys Arg Asn Pro Glu Arg
        355                 360                 365
Val Lys Gly Ile Ala Phe Met Glu Phe Ile Arg Pro Ile Pro Thr Trp
    370                 375                 380
Asp Glu Trp Pro Glu Phe Ala Arg Glu Thr Phe Gln Ala Phe Arg Thr
385                 390                 395                 400
Thr Asp Val Gly Arg Lys Leu Ile Ile Asp Gln Asn Val Phe Ile Glu
                405                 410                 415
Gly Thr Leu Pro Met Gly Val Val Arg Pro Leu Thr Glu Val Glu Met
            420                 425                 430
Asp His Tyr Arg Glu Pro Phe Leu Asn Pro Val Asp Arg Glu Pro Leu
        435                 440                 445
Trp Arg Phe Pro Asn Glu Leu Pro Ile Ala Gly Glu Pro Ala Asn Ile
    450                 455                 460
```

| | | | | | | | | | | | | | | |
|---|---|---|---|---|---|---|---|---|---|---|---|---|---|---|
|Val|Ala|Leu|Val|Glu|Glu|Tyr|Met|Asp|Trp|Leu|His|Gln|Ser|Pro|Val|
|465| | | | |470| | | | |475| | | | |480|

Pro Lys Leu Leu Phe Trp Gly Thr Pro Gly Val Leu Ile Pro Pro Ala
                485                 490                 495

Glu Ala Ala Arg Leu Ala Lys Ser Leu Pro Asn Cys Lys Ala Val Asp
            500                 505                 510

Ile Gly Pro Gly Leu Asn Leu Leu Gln Glu Asp Asn Pro Asp Leu Ile
        515                 520                 525

Gly Ser Glu Ile Ala Arg Trp Leu Ser Thr Leu Glu Ile Ser Gly Glu
    530                 535                 540

Pro Thr Thr Lys Ser Arg Ile Thr Ser Glu Gly Glu Tyr Ile Pro Leu
545                 550                 555                 560

Asp Gln Ile Asp Ile Asn Val Gly Gly Phe Cys Tyr Glu Asn Glu Val
                565                 570                 575

<210> SEQ ID NO 9
<211> LENGTH: 1719
<212> TYPE: DNA
<213> ORGANISM: Artificial
<220> FEATURE:
<223> OTHER INFORMATION: QuasAr2-HaloTag-16 Ligand

<400> SEQUENCE: 9

```
atggtaagta tcgctctgca ggctggttac gacctactgg gtgacggcag acctgaaacc      60
ctgtggctgg gcatcggcac tctgctgatg ctgattggaa ccttctactt tctggtccgc     120
ggatggggag tcaccgataa ggatgcccgg gaatattacg ctgtgactat cctggtgtcc     180
ggaatcgcat ccgccgcata tctgtctatg ttctttggta tcgggcttac tgaggtgtcc     240
gtcgggggcg aaatgttgga tatctattat gccaggtacg cccagtggct gtttaccacc     300
ccacttctgc tgctgcacct ggcccttctc gctaaggtgg atcgggtgac catcggcacc     360
ctggtgggtg tggacgccct gatgatcgtc actggcctca tcggagcctt gagccacacg     420
gccatagcca gatacagttg gtggttgttc tctacaattt gcatgatagt ggtgctctat     480
gttctggcta catccctgcg atctgctgca aggagcgggg ccccgaggt ggcatctacc     540
tttaacaccc tgacagctct ggtcttggtg ctgtggaccg cttaccctat cctgtggatc     600
ataggcactg agggcgctgg cgtggtgggc ctgggcatcg aaactctgct gtttatggtg     660
ttggacgtga ctgccaaggt cggctttggc tttatcctgt tgagatcccg ggctattctg     720
ggcgacaccg aggaaatcgg tactggcttt ccattcgacc ccattatgt ggaagtcctg     780
ggcgagcgca tgcactacgt cgatgttggt ccgcgcgatg caccccctgt gctgttcctg     840
cacggtaacc cgacctcctc ctacgtgtgg cgcaacatca tcccgcatgt tgcaccgacc     900
catcgctgca ttgctccaga cctgatcggt atgggcaaat ccgacaaacc agacctgggt     960
tatttcttcg acgaccacgt ccgcttcatg gatgccttca tcgaagccct gggtctggaa    1020
gaggtcgtcc tggtcattca cgactggggc tccgctctgg tttccactg gccaagcgc    1080
aatccagagc gcgtcaaagg tattgcattt atggagttca tccgccctat cccgacctgg    1140
gacgaatggc cagaatttgc ccgcgagacc ttccaggcct tccgcaccac cgacgtcggc    1200
cgcaagctga tcatcgatca gaacgttttt atcgagggta cgctgccgat gggtgtcgtc    1260
cgcccgctga ctgaagtcga gatggaccat taccgcgagc cgttcctgaa tcctgttgac    1320
cgcgagccac tgtggcgctt cccaaacgag ctgccaatcg ccggtgagcc agcgaacatc    1380
gtcgcgctgg tcgaagaata catggactgg ctgcaccagt cccctgtccc gaagctgctg    1440
```

```
ttctggggca ccccaggcgt tctgatccca ccggccgaag ccgctcgcct ggccaaaagc   1500
ctgcctaact gcaaggctgt ggacatcggc ccgggtctga atctgctgca agaagacaac   1560
ccggacctga tcggcagcga gatcgcgcgc tggctgtcga cgctcgagat ttccggcgag   1620
ccaaccacta agagtagaat cacaagcgaa ggcgagtaca tccccctgga tcaaatagac   1680
ataaatgtag gtggattttg ttatgagaat gaagtataa                         1719

<210> SEQ ID NO 10
<211> LENGTH: 572
<212> TYPE: PRT
<213> ORGANISM: Artificial
<220> FEATURE:
<223> OTHER INFORMATION: QuasAr2-HaloTag-16 Ligand

<400> SEQUENCE: 10

Met Val Ser Ile Ala Leu Gln Ala Gly Tyr Asp Leu Leu Gly Asp Gly
1               5                   10                  15

Arg Pro Glu Thr Leu Trp Leu Gly Ile Gly Thr Leu Leu Met Leu Ile
            20                  25                  30

Gly Thr Phe Tyr Phe Leu Val Arg Gly Trp Gly Val Thr Asp Lys Asp
        35                  40                  45

Ala Arg Glu Tyr Tyr Ala Val Thr Ile Leu Val Ser Gly Ile Ala Ser
    50                  55                  60

Ala Ala Tyr Leu Ser Met Phe Phe Gly Ile Gly Leu Thr Glu Val Ser
65                  70                  75                  80

Val Gly Gly Glu Met Leu Asp Ile Tyr Tyr Ala Arg Tyr Ala Gln Trp
                85                  90                  95

Leu Phe Thr Thr Pro Leu Leu Leu Leu His Leu Ala Leu Leu Ala Lys
            100                 105                 110

Val Asp Arg Val Thr Ile Gly Thr Leu Val Gly Val Asp Ala Leu Met
        115                 120                 125

Ile Val Thr Gly Leu Ile Gly Ala Leu Ser His Thr Ala Ile Ala Arg
    130                 135                 140

Tyr Ser Trp Trp Leu Phe Ser Thr Ile Cys Met Ile Val Val Leu Tyr
145                 150                 155                 160

Val Leu Ala Thr Ser Leu Arg Ser Ala Ala Lys Glu Arg Gly Pro Glu
                165                 170                 175

Val Ala Ser Thr Phe Asn Thr Leu Thr Ala Leu Val Leu Val Leu Trp
            180                 185                 190

Thr Ala Tyr Pro Ile Leu Trp Ile Ile Gly Thr Glu Gly Ala Gly Val
        195                 200                 205

Val Gly Leu Gly Ile Glu Thr Leu Leu Phe Met Val Leu Asp Val Thr
    210                 215                 220

Ala Lys Val Gly Phe Gly Phe Ile Leu Leu Arg Ser Arg Ala Ile Leu
225                 230                 235                 240

Gly Asp Thr Glu Glu Ile Gly Thr Gly Phe Pro Phe Asp Pro His Tyr
                245                 250                 255

Val Glu Val Leu Gly Glu Arg Met His Tyr Val Asp Val Gly Pro Arg
            260                 265                 270

Asp Gly Thr Pro Val Leu Phe Leu His Gly Asn Pro Thr Ser Ser Tyr
        275                 280                 285

Val Trp Arg Asn Ile Ile Pro His Val Ala Pro Thr His Arg Cys Ile
    290                 295                 300

Ala Pro Asp Leu Ile Gly Met Gly Lys Ser Asp Lys Pro Asp Leu Gly
305                 310                 315                 320
```

Tyr Phe Phe Asp Asp His Val Arg Phe Met Asp Ala Phe Ile Glu Ala
            325                 330                 335

Leu Gly Leu Glu Glu Val Val Leu Val Ile His Asp Trp Gly Ser Ala
        340                 345                 350

Leu Gly Phe His Trp Ala Lys Arg Asn Pro Glu Arg Val Lys Gly Ile
        355                 360                 365

Ala Phe Met Glu Phe Ile Arg Pro Ile Pro Thr Trp Asp Glu Trp Pro
370                 375                 380

Glu Phe Ala Arg Glu Thr Phe Gln Ala Phe Arg Thr Thr Asp Val Gly
385                 390                 395                 400

Arg Lys Leu Ile Ile Asp Gln Asn Val Phe Ile Glu Gly Thr Leu Pro
                405                 410                 415

Met Gly Val Val Arg Pro Leu Thr Glu Val Glu Met Asp His Tyr Arg
            420                 425                 430

Glu Pro Phe Leu Asn Pro Val Asp Arg Glu Pro Leu Trp Arg Phe Pro
        435                 440                 445

Asn Glu Leu Pro Ile Ala Gly Glu Pro Ala Asn Ile Val Ala Leu Val
        450                 455                 460

Glu Glu Tyr Met Asp Trp Leu His Gln Ser Pro Val Pro Lys Leu Leu
465                 470                 475                 480

Phe Trp Gly Thr Pro Gly Val Leu Ile Pro Pro Ala Glu Ala Ala Arg
                485                 490                 495

Leu Ala Lys Ser Leu Pro Asn Cys Lys Ala Val Asp Ile Gly Pro Gly
            500                 505                 510

Leu Asn Leu Leu Gln Glu Asp Asn Pro Asp Leu Ile Gly Ser Glu Ile
        515                 520                 525

Ala Arg Trp Leu Ser Thr Leu Glu Ile Ser Gly Glu Pro Thr Thr Lys
530                 535                 540

Ser Arg Ile Thr Ser Glu Gly Glu Tyr Ile Pro Leu Asp Gln Ile Asp
545                 550                 555                 560

Ile Asn Val Gly Gly Phe Cys Tyr Glu Asn Glu Val
                565                 570

<210> SEQ ID NO 11
<211> LENGTH: 1713
<212> TYPE: DNA
<213> ORGANISM: Artificial
<220> FEATURE:
<223> OTHER INFORMATION: QuasAr2-HaloTag-18 Ligand

<400> SEQUENCE: 11
atggtaagta tcgctctgca ggctggttac gacctactgg gtgacggcag acctgaaacc      60
ctgtggctgg gcatcggcac tctgctgatg ctgattggaa ccttctactt tctggtccgc     120
ggatggggag tcaccgataa ggatgcccgg gaatattacg ctgtgactat cctggtgtcc     180
ggaatcgcat ccgccgcata tctgtctatg ttctttggta tcgggcttac tgaggtgtcc     240
gtcgggggcg aaatgttgga tatctattat gccaggtacg cccagtggct gtttaccacc     300
ccacttctgc tgctgcacct ggcccttctc gctaaggtgg atcgggtgac catcggcacc     360
ctggtgggtg tggacgccct gatgatcgtc actggcctca tcgagccctt gagccacacg     420
gccatagcca gatacagttg gtggttgttc tctacaattt gcatgatagt ggtgctctat     480
gttctggcta catccctgcg atctgctgca aaggagcggg ccccgaggt ggcatctacc     540 tttaacaccc tgacagctct ggtcttggtg ctgtggaccg cttaccctat cctgtggatc     600

```
ataggcactg agggcgctgg cgtggtgggc ctgggcatcg aaactctgct gtttatggtg    660
ttggacgtga ctgccaaggt cggctttggc tttatcctgt tgagatcccg ggctattctg    720
ggcgacacca tcggtactgg ctttccattc gaccccatt atgtggaagt cctgggcgag    780
cgcatgcact acgtcgatgt tggtccgcgc gatggcaccc ctgtgctgtt cctgcacggt    840
aacccgacct cctcctacgt gtggcgcaac atcatcccgc atgttgcacc gacccatcgc    900
tgcattgctc cagacctgat cggtatgggc aaatccgaca aaccagacct gggttatttc    960
ttcgacgacc acgtccgctt catggatgcc ttcatcgaag ccctgggtct ggaagaggtc   1020
gtcctggtca ttcacgactg gggctccgct ctgggttttcc actgggccaa gcgcaatcca   1080
gagcgcgtca aggtattgc atttatggag ttcatccgcc ctatcccgac ctgggacgaa   1140
tggccagaat tgcccgcga gaccttccag gccttccgca ccaccgacgt cggccgcaag   1200
ctgatcatcg atcagaacgt ttttatcgag ggtacgctgc cgatgggtgt cgtccgcccg   1260
ctgactgaag tcgagatgga ccattaccgc gagccgttcc tgaatcctgt tgaccgcgag   1320
ccactgtggc gcttcccaaa cgagctgcca atcgccggtg agccagcgaa catcgtcgcg   1380
ctggtcgaag aatacatgga ctggctgcac cagtcccctg tcccgaagct gctgttctgg   1440
ggcacccag gcgttctgat cccaccggcc gaagccgctc gcctggccaa agcctgcct   1500
aactgcaagg ctgtggacat cggcccgggt ctgaatctgc tgcaagaaga caacccggac   1560
ctgatcggca gcgagatcgc gcgctggctg tcgacgctcg agatttccgg cgagccaacc   1620
actaagagta gaatcacaag cgaaggcgag tacatccccc tggatcaaat agacataaat   1680
gtaggtggat tttgttatga gaatgaagta taa                                 1713

<210> SEQ ID NO 12
<211> LENGTH: 570
<212> TYPE: PRT
<213> ORGANISM: Artificial
<220> FEATURE:
<223> OTHER INFORMATION: QuasAr2-HaloTag-18 Ligand

<400> SEQUENCE: 12

Met Val Ser Ile Ala Leu Gln Ala Gly Tyr Asp Leu Leu Gly Asp Gly
1               5                   10                  15

Arg Pro Glu Thr Leu Trp Leu Gly Ile Gly Thr Leu Leu Met Leu Ile
                20                  25                  30

Gly Thr Phe Tyr Phe Leu Val Arg Gly Trp Gly Val Thr Asp Lys Asp
            35                  40                  45

Ala Arg Glu Tyr Tyr Ala Val Thr Ile Leu Val Ser Gly Ile Ala Ser
        50                  55                  60

Ala Ala Tyr Leu Ser Met Phe Phe Gly Ile Gly Leu Thr Glu Val Ser
65                  70                  75                  80

Val Gly Gly Glu Met Leu Asp Ile Tyr Tyr Ala Arg Tyr Ala Gln Trp
                85                  90                  95

Leu Phe Thr Thr Pro Leu Leu Leu His Leu Ala Leu Leu Ala Lys
                100                 105                 110

Val Asp Arg Val Thr Ile Gly Thr Leu Val Gly Val Asp Ala Leu Met
            115                 120                 125

Ile Val Thr Gly Leu Ile Gly Ala Leu Ser His Thr Ala Ile Ala Arg
        130                 135                 140

Tyr Ser Trp Trp Leu Phe Ser Thr Ile Cys Met Ile Val Val Leu Tyr
145                 150                 155                 160
```

```
Val Leu Ala Thr Ser Leu Arg Ser Ala Ala Lys Glu Arg Gly Pro Glu
                165                 170                 175

Val Ala Ser Thr Phe Asn Thr Leu Thr Ala Leu Val Leu Val Leu Trp
            180                 185                 190

Thr Ala Tyr Pro Ile Leu Trp Ile Ile Gly Thr Glu Gly Ala Gly Val
        195                 200                 205

Val Gly Leu Gly Ile Glu Thr Leu Leu Phe Met Val Leu Asp Val Thr
    210                 215                 220

Ala Lys Val Gly Phe Gly Phe Ile Leu Leu Arg Ser Arg Ala Ile Leu
225                 230                 235                 240

Gly Asp Thr Ile Gly Thr Gly Phe Pro Phe Asp Pro His Tyr Val Glu
                245                 250                 255

Val Leu Gly Glu Arg Met His Tyr Val Asp Val Gly Pro Arg Asp Gly
            260                 265                 270

Thr Pro Val Leu Phe Leu His Gly Asn Pro Thr Ser Ser Tyr Val Trp
        275                 280                 285

Arg Asn Ile Ile Pro His Val Ala Pro Thr His Arg Cys Ile Ala Pro
    290                 295                 300

Asp Leu Ile Gly Met Gly Lys Ser Asp Lys Pro Asp Leu Gly Tyr Phe
305                 310                 315                 320

Phe Asp Asp His Val Arg Phe Met Asp Ala Phe Ile Glu Ala Leu Gly
                325                 330                 335

Leu Glu Glu Val Val Leu Val Ile His Asp Trp Gly Ser Ala Leu Gly
            340                 345                 350

Phe His Trp Ala Lys Arg Asn Pro Glu Arg Val Lys Gly Ile Ala Phe
        355                 360                 365

Met Glu Phe Ile Arg Pro Ile Pro Thr Trp Asp Glu Trp Pro Glu Phe
    370                 375                 380

Ala Arg Glu Thr Phe Gln Ala Phe Arg Thr Thr Asp Val Gly Arg Lys
385                 390                 395                 400

Leu Ile Ile Asp Gln Asn Val Phe Ile Glu Gly Thr Leu Pro Met Gly
                405                 410                 415

Val Val Arg Pro Leu Thr Glu Val Glu Met Asp His Tyr Arg Glu Pro
            420                 425                 430

Phe Leu Asn Pro Val Asp Arg Glu Pro Leu Trp Arg Phe Pro Asn Glu
        435                 440                 445

Leu Pro Ile Ala Gly Glu Pro Ala Asn Ile Val Ala Leu Val Glu Glu
    450                 455                 460

Tyr Met Asp Trp Leu His Gln Ser Pro Val Pro Lys Leu Leu Phe Trp
465                 470                 475                 480

Gly Thr Pro Gly Val Leu Ile Pro Pro Ala Glu Ala Ala Arg Leu Ala
                485                 490                 495

Lys Ser Leu Pro Asn Cys Lys Ala Val Asp Ile Gly Pro Gly Leu Asn
            500                 505                 510

Leu Leu Gln Glu Asp Asn Pro Asp Leu Ile Gly Ser Glu Ile Ala Arg
        515                 520                 525

Trp Leu Ser Thr Leu Glu Ile Ser Gly Glu Pro Thr Thr Lys Ser Arg
    530                 535                 540

Ile Thr Ser Glu Gly Glu Tyr Ile Pro Leu Asp Gln Ile Asp Ile Asn
545                 550                 555                 560

Val Gly Gly Phe Cys Tyr Glu Asn Glu Val
                565                 570
```

<210> SEQ ID NO 13
<211> LENGTH: 1707
<212> TYPE: DNA
<213> ORGANISM: Artificial
<220> FEATURE:
<223> OTHER INFORMATION: QuasAr2-HaloTag-20 Ligand

<400> SEQUENCE: 13

```
atggtaagta tcgctctgca ggctggttac gacctactgg gtgacggcag acctgaaacc      60
ctgtggctgg gcatcggcac tctgctgatg ctgattggaa ccttctactt tctggtccgc     120
ggatggggag tcaccgataa ggatgcccgg aatattacg ctgtgactat cctggtgtcc      180
ggaatcgcat ccgccgcata tctgtctatg ttctttggta tcgggcttac tgaggtgtcc     240
gtcggggggcg aaatgttgga tatctattat gccaggtacg cccagtggct gtttaccacc    300
ccacttctgc tgctgcacct ggcccttctc gctaaggtgg atcgggtgac catcggcacc    360
ctggtgggtg tggacgccct gatgatcgtc actggcctca tcggagcctt gagccacacg    420
gccatagcca gatacagttg gtggttgttc tctacaattt gcatgatagt ggtgctctat    480
gttctggcta catccctgcg atctgctgca aaggagcggg gccccgaggt ggcatctacc    540
tttaacaccc tgacagctct ggtcttggtg ctgtggaccg cttaccctat cctgtggatc    600
ataggcactg agggcgctgg cgtggtgggc ctgggcatcg aaactctgct gtttatggtg    660
ttggacgtga ctgccaaggt cggctttggc tttatcctgt tgagatcccg ggctattctg    720
ggcgacacca ctggctttcc attcgacccc cattatgtgg aagtcctggg cgagcgcatg    780
cactacgtcg atgttggtcc gcgcgatggc acccctgtgc tgttcctgca cggtaacccg    840
acctcctcct acgtgtggcg caacatcatc ccgcatgttg caccgaccca tcgctgcatt    900
gctccagacc tgatcggtat gggcaaatcc gacaaaccag acctgggtta tttcttcgac    960
gaccacgtcc gcttcatgga tgccttcatc gaagccctgg gtctggaaga ggtcgtcctg    1020
gtcattcacg actggggctc cgctctgggt ttccactggg ccaagcgcaa tccagagcgc    1080
gtcaaaggta ttgcatttat ggagttcatc cgccctatcc cgacctggga cgaatggcca    1140
gaatttgccc gcgagacctt ccaggccttc cgcaccaccg acgtcggccg caagctgatc    1200
atcgatcaga acgtttttat cgagggtacg ctgccgatgg gtgtcgtccg cccgctgact    1260
gaagtcgaga tggaccatta ccgcgagccg ttcctgaatc ctgttgaccg cgagccactg    1320
tggcgcttcc caaacgagct gccaatcgcc ggtgagccag cgaacatcgt cgcgctggtc    1380
gaagaataca tggactggct gcaccagtcc cctgtcccga gctgctgtt ctggggcacc    1440
ccaggcgttc tgatcccacc ggccgaagcc gctcgcctgg ccaaaagcct gctaactgc    1500
aaggctgtgg acatcggccc gggtctgaat ctgctgcaag aagacaaccc ggacctgatc    1560
ggcagcgaga tcgcgcgctg gctgtcgacg ctcgagattt ccggcgagcc aaccactaag    1620
agtagaatca aagcgaagg cgagtacatc cccctggatc aaatagacat aaatgtaggt    1680
ggattttgtt atgagaatga agtataa                                        1707
```

<210> SEQ ID NO 14
<211> LENGTH: 568
<212> TYPE: PRT
<213> ORGANISM: Artificial
<220> FEATURE:
<223> OTHER INFORMATION: QuasAr2-HaloTag-20 Ligand

<400> SEQUENCE: 14

```
Met Val Ser Ile Ala Leu Gln Ala Gly Tyr Asp Leu Leu Gly Asp Gly
1               5                   10                  15

Arg Pro Glu Thr Leu Trp Leu Gly Ile Gly Thr Leu Met Leu Ile
            20                  25                  30

Gly Thr Phe Tyr Phe Leu Val Arg Gly Trp Gly Val Thr Asp Lys Asp
                35                  40                  45

Ala Arg Glu Tyr Tyr Ala Val Thr Ile Leu Val Ser Gly Ile Ala Ser
        50                  55                  60

Ala Ala Tyr Leu Ser Met Phe Phe Gly Ile Gly Leu Thr Glu Val Ser
65                  70                  75                  80

Val Gly Gly Glu Met Leu Asp Ile Tyr Ala Arg Tyr Ala Gln Trp
            85                  90                  95

Leu Phe Thr Thr Pro Leu Leu Leu Leu His Leu Ala Leu Leu Ala Lys
                100                 105                 110

Val Asp Arg Val Thr Ile Gly Thr Leu Val Gly Val Asp Ala Leu Met
            115                 120                 125

Ile Val Thr Gly Leu Ile Gly Ala Leu Ser His Thr Ala Ile Ala Arg
        130                 135                 140

Tyr Ser Trp Trp Leu Phe Ser Thr Ile Cys Met Ile Val Val Leu Tyr
145                 150                 155                 160

Val Leu Ala Thr Ser Leu Arg Ser Ala Ala Lys Glu Arg Gly Pro Glu
                165                 170                 175

Val Ala Ser Thr Phe Asn Thr Leu Thr Ala Leu Val Leu Val Leu Trp
            180                 185                 190

Thr Ala Tyr Pro Ile Leu Trp Ile Ile Gly Thr Glu Gly Ala Gly Val
        195                 200                 205

Val Gly Leu Gly Ile Glu Thr Leu Leu Phe Met Val Leu Asp Val Thr
210                 215                 220

Ala Lys Val Gly Phe Gly Phe Ile Leu Leu Arg Ser Arg Ala Ile Leu
225                 230                 235                 240

Gly Asp Thr Thr Gly Phe Pro Phe Asp Pro His Tyr Val Glu Val Leu
                245                 250                 255

Gly Glu Arg Met His Tyr Val Asp Val Gly Pro Arg Asp Gly Thr Pro
            260                 265                 270

Val Leu Phe Leu His Gly Asn Pro Thr Ser Ser Tyr Val Trp Arg Asn
        275                 280                 285

Ile Ile Pro His Val Ala Pro Thr His Arg Cys Ile Ala Pro Asp Leu
290                 295                 300

Ile Gly Met Gly Lys Ser Asp Lys Pro Asp Leu Gly Tyr Phe Phe Asp
305                 310                 315                 320

Asp His Val Arg Phe Met Asp Ala Phe Ile Glu Ala Leu Gly Leu Glu
                325                 330                 335

Glu Val Val Leu Val Ile His Asp Trp Gly Ser Ala Leu Gly Phe His
            340                 345                 350

Trp Ala Lys Arg Asn Pro Glu Arg Val Lys Gly Ile Ala Phe Met Glu
        355                 360                 365

Phe Ile Arg Pro Ile Pro Thr Trp Asp Glu Trp Pro Glu Phe Ala Arg
370                 375                 380

Glu Thr Phe Gln Ala Phe Arg Thr Thr Asp Val Gly Arg Lys Leu Ile
385                 390                 395                 400
```

```
Ile Asp Gln Asn Val Phe Ile Glu Gly Thr Leu Pro Met Gly Val Val
            405                 410                 415
Arg Pro Leu Thr Glu Val Glu Met Asp His Tyr Arg Glu Pro Phe Leu
        420                 425                 430
Asn Pro Val Asp Arg Glu Pro Leu Trp Arg Phe Pro Asn Glu Leu Pro
    435                 440                 445
Ile Ala Gly Glu Pro Ala Asn Ile Val Ala Leu Val Glu Glu Tyr Met
450                 455                 460
Asp Trp Leu His Gln Ser Pro Val Pro Lys Leu Leu Phe Trp Gly Thr
465                 470                 475                 480
Pro Gly Val Leu Ile Pro Pro Ala Glu Ala Ala Arg Leu Ala Lys Ser
                485                 490                 495
Leu Pro Asn Cys Lys Ala Val Asp Ile Gly Pro Gly Leu Asn Leu Leu
            500                 505                 510
Gln Glu Asp Asn Pro Asp Leu Ile Gly Ser Glu Ile Ala Arg Trp Leu
        515                 520                 525
Ser Thr Leu Glu Ile Ser Gly Glu Pro Thr Thr Lys Ser Arg Ile Thr
    530                 535                 540
Ser Glu Gly Glu Tyr Ile Pro Leu Asp Gln Ile Asp Ile Asn Val Gly
545                 550                 555                 560
Gly Phe Cys Tyr Glu Asn Glu Val
                565
```

<210> SEQ ID NO 15
<211> LENGTH: 1701
<212> TYPE: DNA
<213> ORGANISM: Artificial
<220> FEATURE:
<223> OTHER INFORMATION: QuasAr2-HaloTag-22 Ligand

<400> SEQUENCE: 15

```
atggtaagta tcgctctgca ggctggttac gacctactgg gtgacggcag acctgaaacc      60
ctgtggctgg gcatcggcac tctgctgatg ctgattggaa ccttctactt tctggtccgc     120
ggatggggag tcaccgataa ggatgcccgg gaatattacg ctgtgactat cctggtgtcc     180
ggaatcgcat ccgccgcata tctgtctatg ttctttggta tcgggcttac tgaggtgtcc     240
gtcgggggcg aaatgttgga tatctattat gccaggtacg cccagtggct gtttaccacc     300
ccacttctgc tgctgcacct ggcccttctc gctaaggtgg atcgggtgac catcggcacc     360
ctggtgggtg tggacgccct gatgatcgtc actggcctca tcggagcctt gagccacacg     420
gccatagcca gatacagttg gtggttgttc tctacaattt gcatgatagt ggtgctctat     480
gttctggcta catccctgcg atctgctgca aaggagcggg ccccgaggt ggcatctacc     540
tttaacaccc tgacagctct ggtcttggtg ctgtggaccg cttaccctat cctgtggatc     600
ataggcactg agggcgctgg cgtggtgggc ctgggcatcg aaactctgct gtttatggtg     660
ttggacgtga ctgccaaggt cggctttggc tttatcctgt tgagatcccg ggctattctg     720
ggcgacacct ttccattcga cccccattat gtggaagtcc tgggcgagcg catgcactac     780
gtcgatgttg tccgcgcga tgccacccct gtgctgttcc tgcacggtaa cccgacctcc     840
tcctacgtgt ggcgcaacat catcccgcat gttgcaccga cccatcgctg cattgctcca     900
gacctgatcg gtatgggcaa atccgacaaa ccagacctgg ttatttcttc gacgaccac     960
gtccgcttca tggatgcctt catcgaagcc ctgggtctgg aagaggtcgt cctggtcatt    1020
cacgactggg gctccgctct gggtttccac tgggccaagc gcaatccaga gcgcgtcaaa    1080
```

```
ggtattgcat ttatggagtt catccgccct atcccgacct gggacgaatg ccagaattt       1140 gcccgcgaga ccttccaggc cttccgcacc accgacgtcg ccgcaagct gatcatcgat      1200 cagaacgttt ttatcgaggg tacgctgccg atgggtgtcg tccgcccgct gactgaagtc      1260
gagatggacc attaccgcga gccgttcctg aatcctgttg accgcgagcc actgtggcgc      1320
ttcccaaacg agctgccaat cgccggtgag ccagcgaaca tcgtcgcgct ggtcgaagaa      1380
tacatggact ggctgcacca gtcccctgtc ccgaagctgc tgttctgggg caccccaggc      1440
gttctgatcc caccggccga agccgctcgc ctggccaaaa gcctgcctaa ctgcaaggct      1500
gtggacatcg cccgggtct gaatctgctg caagaagaca cccggacct gatcggcagc       1560 gagatcgcgc gctggctgtc gacgctcgag atttccggcg agccaaccac taagagtaga      1620
atcacaagcg aaggcgagta catccccctg gatcaaatag acataaatgt aggtggattt      1680
tgttatgaga atgaagtata a                                                1701
```

<210> SEQ ID NO 16
<211> LENGTH: 566
<212> TYPE: PRT
<213> ORGANISM: Artificial
<220> FEATURE:
<223> OTHER INFORMATION: QuasAr2-HaloTag-22 Ligand

<400> SEQUENCE: 16

```
Met Val Ser Ile Ala Leu Gln Ala Gly Tyr Asp Leu Leu Gly Asp Gly
1               5                   10                  15

Arg Pro Glu Thr Leu Trp Leu Gly Ile Gly Thr Leu Leu Met Leu Ile
            20                  25                  30

Gly Thr Phe Tyr Phe Leu Val Arg Gly Trp Gly Val Thr Asp Lys Asp
        35                  40                  45

Ala Arg Glu Tyr Tyr Ala Val Thr Ile Leu Val Ser Gly Ile Ala Ser
    50                  55                  60

Ala Ala Tyr Leu Ser Met Phe Phe Gly Ile Gly Leu Thr Glu Val Ser
65                  70                  75                  80

Val Gly Gly Glu Met Leu Asp Ile Tyr Tyr Ala Arg Tyr Ala Gln Trp
                85                  90                  95

Leu Phe Thr Thr Pro Leu Leu Leu Leu His Leu Ala Leu Leu Ala Lys
            100                 105                 110

Val Asp Arg Val Thr Ile Gly Thr Leu Val Gly Val Asp Ala Leu Met
        115                 120                 125

Ile Val Thr Gly Leu Ile Gly Ala Leu Ser His Thr Ala Ile Ala Arg
    130                 135                 140

Tyr Ser Trp Trp Leu Phe Ser Thr Ile Cys Met Ile Val Val Leu Tyr
145                 150                 155                 160

Val Leu Ala Thr Ser Leu Arg Ser Ala Ala Lys Glu Arg Gly Pro Glu
                165                 170                 175

Val Ala Ser Thr Phe Asn Thr Leu Thr Ala Leu Val Leu Val Leu Trp
            180                 185                 190

Thr Ala Tyr Pro Ile Leu Trp Ile Ile Gly Thr Glu Gly Ala Gly Val
        195                 200                 205

Val Gly Leu Gly Ile Glu Thr Leu Leu Phe Met Val Leu Asp Val Thr
    210                 215                 220

Ala Lys Val Gly Phe Gly Phe Ile Leu Leu Arg Ser Arg Ala Ile Leu
225                 230                 235                 240
```

Gly Asp Thr Phe Pro Phe Asp Pro His Tyr Val Glu Val Leu Gly Glu
                245                 250                 255

Arg Met His Tyr Val Asp Val Gly Pro Arg Asp Gly Thr Pro Val Leu
            260                 265                 270

Phe Leu His Gly Asn Pro Thr Ser Ser Tyr Val Trp Arg Asn Ile Ile
        275                 280                 285

Pro His Val Ala Pro Thr His Arg Cys Ile Ala Pro Asp Leu Ile Gly
    290                 295                 300

Met Gly Lys Ser Asp Lys Pro Asp Leu Gly Tyr Phe Phe Asp Asp His
305                 310                 315                 320

Val Arg Phe Met Asp Ala Phe Ile Glu Ala Leu Gly Leu Glu Glu Val
                325                 330                 335

Val Leu Val Ile His Asp Trp Gly Ser Ala Leu Gly Phe His Trp Ala
            340                 345                 350

Lys Arg Asn Pro Glu Arg Val Lys Gly Ile Ala Phe Met Glu Phe Ile
        355                 360                 365

Arg Pro Ile Pro Thr Trp Asp Glu Trp Pro Glu Phe Ala Arg Glu Thr
    370                 375                 380

Phe Gln Ala Phe Arg Thr Thr Asp Val Gly Arg Lys Leu Ile Ile Asp
385                 390                 395                 400

Gln Asn Val Phe Ile Glu Gly Thr Leu Pro Met Gly Val Val Arg Pro
                405                 410                 415

Leu Thr Glu Val Glu Met Asp His Tyr Arg Glu Pro Phe Leu Asn Pro
            420                 425                 430

Val Asp Arg Glu Pro Leu Trp Arg Phe Pro Asn Glu Leu Pro Ile Ala
        435                 440                 445

Gly Glu Pro Ala Asn Ile Val Ala Leu Val Glu Glu Tyr Met Asp Trp
    450                 455                 460

Leu His Gln Ser Pro Val Pro Lys Leu Leu Phe Trp Gly Thr Pro Gly
465                 470                 475                 480

Val Leu Ile Pro Pro Ala Glu Ala Ala Arg Leu Ala Lys Ser Leu Pro
                485                 490                 495

Asn Cys Lys Ala Val Asp Ile Gly Pro Gly Leu Asn Leu Leu Gln Glu
            500                 505                 510

Asp Asn Pro Asp Leu Ile Gly Ser Glu Ile Ala Arg Trp Leu Ser Thr
        515                 520                 525

Leu Glu Ile Ser Gly Glu Pro Thr Thr Lys Ser Arg Ile Thr Ser Glu
    530                 535                 540

Gly Glu Tyr Ile Pro Leu Asp Gln Ile Asp Ile Asn Val Gly Gly Phe
545                 550                 555                 560

Cys Tyr Glu Asn Glu Val
                565

<210> SEQ ID NO 17
<211> LENGTH: 1797
<212> TYPE: DNA
<213> ORGANISM: Artificial
<220> FEATURE:
<223> OTHER INFORMATION: QuasAr2-cpHaloTag Ligand

<400> SEQUENCE: 17
atggtaagta tcgctctgca ggctggttac gacctactgg gtgacggcag acctgaaacc    60
ctgtggctgg gcatcggcac tctgctgatg ctgattggaa ccttctactt tctggtccgc    120
ggatggggag tcaccgataa ggatgcccgg gaatattacg ctgtgactat cctggtgtcc    180

```
ggaatcgcat ccgccgcata tctgtctatg ttctttggta tcgggcttac tgaggtgtcc    240
gtcgggggcg aaatgttgga tatctattat gccaggtacg cccagtggct gtttaccacc    300
ccacttctgc tgctgcacct ggcccttctc gctaaggtgg atcgggtgac catcggcacc    360
ctggtgggtg tggacgccct gatgatcgtc actggcctca tcgagccttt gagccacacg    420
gccatagcca gatacagttg gtggttgttc tctacaattt gcatgatagt ggtgctctat    480
gttctggcta catccctgcg atctgctgca aggagcggg ccccgaggt ggcatctacc     540 tttaacaccc tgacagctct ggtcttggtg ctgtggaccg cttaccctat cctgtggatc    600
ataggcactg agggcgctgg cgtggtgggc ctgggcatcg aaactctgct gtttatggtg    660
ttggacgtga ctgccaaggt cggctttggc tttatcctgt tgagatcccg ggctattctg    720
ggcgacaccg aggcaccaga acccagtgcc ggtgccgatg tcagtgccgc cgacaccttc    780
caggccttcc gcaccaccga cgtcggccgc aagctgatca tcgatcagaa cgtttttatc    840
gagggtacgc tgccgatggg tgtcgtccgc ccgctgactg aagtcgagat ggaccattac    900
cgcgagccgt tcctgaatcc tgttgaccgc gagccactgt ggcgcttccc aaacgagctg    960
ccaatcgccg gtgagccagc gaacatcgtc gcgctggtcg aagaatacat ggactggctg   1020
caccagtccc ctgtcccgaa gctgctgttc tggggcaccc caggcgttct gatcccaccg   1080
gccgaagccg ctcgcctggc caaaagcctg cctaactgca aggctgtgga catcggcccg   1140
ggtctgaatc tgctgcaaga agacaacccg gacctgatcg gcagcgagat cgcgcgctgg   1200
ctgtcgacgc tcgagatttc cggcgagcca accactggag gcagcggagg cacaggaggc   1260
agcggaggca caggaggcag catggcagaa atcggtactg gctttccatt cgaccccat   1320 tatgtggaag tcctgggcga gcgcatgcac tacgtcgatg ttggtccgcg cgatggcacc   1380
cctgtgctgt tcctgcacgg taacccgacc tcctcctacg tgtggcgcaa catcatcccg   1440
catgttgcac cgacccatcg ctgcattgct ccagacctga tcggtatggg caaatccgac   1500
aaaccagacc tgggttattt cttcgacgac cacgtccgct tcatggatgc cttcatcgaa   1560
gccctgggtc tggaagaggt cgtcctggtc attcacgact ggggctccgc tctgggtttc   1620
cactgggcca agcgcaatcc agagcgcgtc aaaggtattg catttatgga gttcatccgc   1680
cctatcccga cctgggacga atggccaaag agtagaatca caagcgaagg cgagtacatc   1740
cccctggatc aaatagacat aaatgtaggt ggattttgtt atgagaatga agtataa      1797
```

<210> SEQ ID NO 18
<211> LENGTH: 598
<212> TYPE: PRT
<213> ORGANISM: Artificial
<220> FEATURE:
<223> OTHER INFORMATION: QuasAr2-cpHaloTag Ligand

<400> SEQUENCE: 18

Met Val Ser Ile Ala Leu Gln Ala Gly Tyr Asp Leu Leu Gly Asp Gly
1               5                   10                  15

Arg Pro Glu Thr Leu Trp Leu Gly Ile Gly Thr Leu Leu Met Leu Ile
                20                  25                  30

Gly Thr Phe Tyr Phe Leu Val Arg Gly Trp Gly Val Thr Asp Lys Asp
            35                  40                  45

Ala Arg Glu Tyr Tyr Ala Val Thr Ile Leu Val Ser Gly Ile Ala Ser
        50                  55                  60

Ala Ala Tyr Leu Ser Met Phe Phe Gly Ile Gly Leu Thr Glu Val Ser
65                  70                  75                  80

```
Val Gly Gly Glu Met Leu Asp Ile Tyr Tyr Ala Arg Tyr Ala Gln Trp
                85                  90                  95

Leu Phe Thr Thr Pro Leu Leu Leu Leu His Leu Ala Leu Leu Ala Lys
            100                 105                 110

Val Asp Arg Val Thr Ile Gly Thr Leu Val Gly Val Asp Ala Leu Met
        115                 120                 125

Ile Val Thr Gly Leu Ile Gly Ala Leu Ser His Thr Ala Ile Ala Arg
    130                 135                 140

Tyr Ser Trp Trp Leu Phe Ser Thr Ile Cys Met Ile Val Val Leu Tyr
145                 150                 155                 160

Val Leu Ala Thr Ser Leu Arg Ser Ala Ala Lys Glu Arg Gly Pro Glu
                165                 170                 175

Val Ala Ser Thr Phe Asn Thr Leu Thr Ala Leu Val Leu Val Leu Trp
                180                 185                 190

Thr Ala Tyr Pro Ile Leu Trp Ile Ile Gly Thr Glu Gly Ala Gly Val
            195                 200                 205

Val Gly Leu Gly Ile Glu Thr Leu Leu Phe Met Val Leu Asp Val Thr
        210                 215                 220

Ala Lys Val Gly Phe Gly Phe Ile Leu Leu Arg Ser Arg Ala Ile Leu
225                 230                 235                 240

Gly Asp Thr Glu Ala Pro Glu Pro Ser Ala Gly Ala Asp Val Ser Ala
                245                 250                 255

Ala Asp Thr Phe Gln Ala Phe Arg Thr Thr Asp Val Gly Arg Lys Leu
                260                 265                 270

Ile Ile Asp Gln Asn Val Phe Ile Glu Gly Thr Leu Pro Met Gly Val
            275                 280                 285

Val Arg Pro Leu Thr Glu Val Glu Met Asp His Tyr Arg Glu Pro Phe
        290                 295                 300

Leu Asn Pro Val Asp Arg Glu Pro Leu Trp Arg Phe Pro Asn Glu Leu
305                 310                 315                 320

Pro Ile Ala Gly Glu Pro Ala Asn Ile Val Ala Leu Val Glu Glu Tyr
                325                 330                 335

Met Asp Trp Leu His Gln Ser Pro Val Pro Lys Leu Leu Phe Trp Gly
                340                 345                 350

Thr Pro Gly Val Leu Ile Pro Pro Ala Glu Ala Ala Arg Leu Ala Lys
            355                 360                 365

Ser Leu Pro Asn Cys Lys Ala Val Asp Ile Gly Pro Gly Leu Asn Leu
370                 375                 380

Leu Gln Glu Asp Asn Pro Asp Leu Ile Gly Ser Glu Ile Ala Arg Trp
385                 390                 395                 400

Leu Ser Thr Leu Glu Ile Ser Gly Glu Pro Thr Thr Gly Gly Ser Gly
                405                 410                 415

Gly Thr Gly Gly Ser Gly Gly Thr Gly Gly Ser Met Ala Glu Ile Gly
            420                 425                 430

Thr Gly Phe Pro Phe Asp Pro His Tyr Val Glu Val Leu Gly Glu Arg
            435                 440                 445

Met His Tyr Val Asp Val Gly Pro Arg Asp Gly Thr Pro Val Leu Phe
    450                 455                 460

Leu His Gly Asn Pro Thr Ser Ser Tyr Val Trp Arg Asn Ile Ile Pro
465                 470                 475                 480

His Val Ala Pro Thr His Arg Cys Ile Ala Pro Asp Leu Ile Gly Met
                485                 490                 495
```

Gly Lys Ser Asp Lys Pro Asp Leu Gly Tyr Phe Phe Asp His Val
            500                 505                 510

Arg Phe Met Asp Ala Phe Ile Glu Ala Leu Gly Leu Glu Glu Val Val
            515                 520                 525

Leu Val Ile His Asp Trp Gly Ser Ala Leu Gly Phe His Trp Ala Lys
        530                 535                 540

Arg Asn Pro Glu Arg Val Lys Gly Ile Ala Phe Met Glu Phe Ile Arg
545                 550                 555                 560

Pro Ile Pro Thr Trp Asp Glu Trp Pro Lys Ser Arg Ile Thr Ser Glu
                565                 570                 575

Gly Glu Tyr Ile Pro Leu Asp Gln Ile Asp Ile Asn Val Gly Gly Phe
            580                 585                 590

Cys Tyr Glu Asn Glu Val
        595

<210> SEQ ID NO 19
<211> LENGTH: 1365
<212> TYPE: DNA
<213> ORGANISM: Artificial
<220> FEATURE:
<223> OTHER INFORMATION: QuasAr2-SNAP-Tag Ligand

<400> SEQUENCE: 19

| | | | | | |
|---|---|---|---|---|---|
| atggtaagta | tcgctctgca | ggctggttac | gacctactgg | gtgacggcag | acctgaaacc | 60 |
| ctgtggctgg | gcatcggcac | tctgctgatg | ctgattggaa | ccttctactt | tctggtccgc | 120 |
| ggatggggag | tcaccgataa | ggatgcccgg | gaatattacg | ctgtgactat | cctggtgtcc | 180 |
| ggaatcgcat | ccgccgcata | tctgtctatg | ttctttggta | tcgggcttac | tgaggtgtcc | 240 |
| gtcgggggcg | aaatgttgga | tatctattat | gccaggtacg | cccagtggct | gtttaccacc | 300 |
| ccacttctgc | tgctgcacct | ggcccttctc | gctaaggtgg | atcgggtgac | catcggcacc | 360 |
| ctggtgggtg | tggacgccct | gatgatcgtc | actggcctca | tcggagcctt | gagccacacg | 420 |
| gccatagcca | gatacagttg | gtggttgttc | tctacaattt | gcatgatagt | ggtgctctat | 480 |
| gttctggcta | catccctgcg | atctgctgca | aggagcggg | ccccgaggt | ggcatctacc | 540 |
| tttaacaccc | tgacagctct | ggtcttggtg | ctgtggaccg | cttaccctat | cctgtggatc | 600 |
| ataggcactg | agggcgctgg | cgtggtgggc | ctgggcatcg | aaactctgct | gtttatggtg | 660 |
| ttggacgtga | ctgccaaggt | cggctttggc | tttatcctgt | tgagatcccg | ggctattctg | 720 |
| ggcgacaccg | aggacaaaga | ctgcgaaatg | aagcgcacca | ccctggatag | ccctctgggc | 780 |
| aagctggaac | tgtctgggtg | cgaacagggc | ctgaccgta | tcatcttcct | gggcaaagga | 840 |
| acatctgccg | ccgacgccgt | ggaagtgcct | gccccagccg | ccgtgctggg | cggaccagag | 900 |
| ccactgatgc | aggccaccgc | ctggctcaac | gcctactttc | accagcctga | ggccatcgag | 960 |
| gagttccctg | tgccagccct | gcaccaccca | gtgttccagc | aggagagctt | acccgccag | 1020 |
| gtgctgtgga | aactgctgaa | agtggtgaag | ttcggagagg | tcatcagcta | cagccacctg | 1080 |
| gccgccctgg | ccggcaatcc | cgccgccacc | gccgccgtga | aaaccgccct | gagcggaaat | 1140 |
| cccgtgccca | ttctgatccc | ctgccaccgg | gtggtgcagg | gcgacctgga | cgtgggggc | 1200 |
| tacgagggcg | ggctcgccgt | gaaagagtgg | ctgctggccc | acgagggcca | cagactgggc | 1260 |
| aagcctgggc | tgggtaagag | tagaatcaca | agcgaaggcg | agtacatccc | cctggatcaa | 1320 |
| atagacataa | atgtaggtgg | attttgttat | gagaatgaag | tataa | | 1365 |

<210> SEQ ID NO 20

-continued

```
<211> LENGTH: 454
<212> TYPE: PRT
<213> ORGANISM: Artificial
<220> FEATURE:
<223> OTHER INFORMATION: QuasAr2-SNAP-Tag Ligand

<400> SEQUENCE: 20
```

| | | | | | | | | | | | | | | |
|---|---|---|---|---|---|---|---|---|---|---|---|---|---|---|
| Met | Val | Ser | Ile | Ala | Leu | Gln | Ala | Gly | Tyr | Asp | Leu | Leu | Gly | Asp | Gly |
| 1 | | | | 5 | | | | | 10 | | | | | 15 | |
| Arg | Pro | Glu | Thr | Leu | Trp | Leu | Gly | Ile | Gly | Thr | Leu | Leu | Met | Leu | Ile |
| | | | 20 | | | | | 25 | | | | | 30 | | |
| Gly | Thr | Phe | Tyr | Phe | Leu | Val | Arg | Gly | Trp | Gly | Val | Thr | Asp | Lys | Asp |
| | | | 35 | | | | 40 | | | | | 45 | | | |
| Ala | Arg | Glu | Tyr | Tyr | Ala | Val | Thr | Ile | Leu | Val | Ser | Gly | Ile | Ala | Ser |
| 50 | | | | | 55 | | | | | 60 | | | | | |
| Ala | Ala | Tyr | Leu | Ser | Met | Phe | Phe | Gly | Ile | Gly | Leu | Thr | Glu | Val | Ser |
| 65 | | | | | 70 | | | | | 75 | | | | | 80 |
| Val | Gly | Gly | Glu | Met | Leu | Asp | Ile | Tyr | Tyr | Ala | Arg | Tyr | Ala | Gln | Trp |
| | | | | 85 | | | | | 90 | | | | | 95 | |
| Leu | Phe | Thr | Thr | Pro | Leu | Leu | Leu | His | Leu | Ala | Leu | Ala | Lys |
| | | | 100 | | | | | 105 | | | | | 110 | |
| Val | Asp | Arg | Val | Thr | Ile | Gly | Thr | Leu | Val | Gly | Val | Asp | Ala | Leu | Met |
| | | 115 | | | | | 120 | | | | | 125 | | | |
| Ile | Val | Thr | Gly | Leu | Ile | Gly | Ala | Leu | Ser | His | Thr | Ala | Ile | Ala | Arg |
| 130 | | | | | 135 | | | | | 140 | | | | | |
| Tyr | Ser | Trp | Trp | Leu | Phe | Ser | Thr | Ile | Cys | Met | Ile | Val | Val | Leu | Tyr |
| 145 | | | | | 150 | | | | | 155 | | | | | 160 |
| Val | Leu | Ala | Thr | Ser | Leu | Arg | Ser | Ala | Ala | Lys | Glu | Arg | Gly | Pro | Glu |
| | | | | 165 | | | | | 170 | | | | | 175 | |
| Val | Ala | Ser | Thr | Phe | Asn | Thr | Leu | Thr | Ala | Leu | Val | Leu | Val | Leu | Trp |
| | | | 180 | | | | | 185 | | | | | 190 | | |
| Thr | Ala | Tyr | Pro | Ile | Leu | Trp | Ile | Ile | Gly | Thr | Glu | Gly | Ala | Gly | Val |
| | | | 195 | | | | | 200 | | | | | 205 | | |
| Val | Gly | Leu | Gly | Ile | Glu | Thr | Leu | Leu | Phe | Met | Val | Leu | Asp | Val | Thr |
| | 210 | | | | | 215 | | | | | 220 | | | | |
| Ala | Lys | Val | Gly | Phe | Gly | Phe | Ile | Leu | Leu | Arg | Ser | Arg | Ala | Ile | Leu |
| 225 | | | | | 230 | | | | | 235 | | | | | 240 |
| Gly | Asp | Thr | Glu | Asp | Lys | Asp | Cys | Glu | Met | Lys | Arg | Thr | Thr | Leu | Asp |
| | | | | 245 | | | | | 250 | | | | | 255 | |
| Ser | Pro | Leu | Gly | Lys | Leu | Glu | Leu | Ser | Gly | Cys | Glu | Gln | Gly | Leu | His |
| | | | 260 | | | | | 265 | | | | | 270 | | |
| Arg | Ile | Ile | Phe | Leu | Gly | Lys | Gly | Thr | Ser | Ala | Ala | Asp | Ala | Val | Glu |
| | | 275 | | | | | 280 | | | | | 285 | | | |
| Val | Pro | Ala | Pro | Ala | Ala | Val | Leu | Gly | Gly | Pro | Glu | Pro | Leu | Met | Gln |
| | 290 | | | | | 295 | | | | | 300 | | | | |
| Ala | Thr | Ala | Trp | Leu | Asn | Ala | Tyr | Phe | His | Gln | Pro | Glu | Ala | Ile | Glu |
| 305 | | | | | 310 | | | | | 315 | | | | | 320 |
| Glu | Phe | Pro | Val | Pro | Ala | Leu | His | His | Pro | Val | Phe | Gln | Gln | Glu | Ser |
| | | | | 325 | | | | | 330 | | | | | 335 | |
| Phe | Thr | Arg | Gln | Val | Leu | Trp | Lys | Leu | Leu | Lys | Val | Val | Lys | Phe | Gly |
| | | | 340 | | | | | 345 | | | | | 350 | | |
| Glu | Val | Ile | Ser | Tyr | Ser | His | Leu | Ala | Ala | Leu | Ala | Gly | Asn | Pro | Ala |
| | | | 355 | | | | | 360 | | | | | 365 | | |
| Ala | Thr | Ala | Ala | Val | Lys | Thr | Ala | Leu | Ser | Gly | Asn | Pro | Val | Pro | Ile |
| | 370 | | | | | 375 | | | | | 380 | | | | |

```
Leu Ile Pro Cys His Arg Val Val Gln Gly Asp Leu Asp Val Gly Gly
385                 390                 395                 400

Tyr Glu Gly Gly Leu Ala Val Lys Glu Trp Leu Leu Ala His Glu Gly
                405                 410                 415

His Arg Leu Gly Lys Pro Gly Leu Gly Lys Ser Arg Ile Thr Ser Glu
            420                 425                 430

Gly Glu Tyr Ile Pro Leu Asp Gln Ile Asp Ile Asn Val Gly Gly Phe
        435                 440                 445

Cys Tyr Glu Asn Glu Val
    450

<210> SEQ ID NO 21
<211> LENGTH: 1812
<212> TYPE: DNA
<213> ORGANISM: Artificial
<220> FEATURE:
<223> OTHER INFORMATION: HaloTag-QuasAr2 Ligand

<400> SEQUENCE: 21
atggagacag acacactcct gctatgggta ctgctgctct ggttccagg ttccactggt      60 gacatcggta ctggctttcc attcgacccc cattatgtgg aagtcctggg cgagcgcatg    120
cactacgtcg atgttggtcc gcgcgatggc acccctgtgc tgttcctgca cggtaacccg    180
acctcctcct acgtgtggcg caacatcatc ccgcatgttg caccgaccca tcgctgcatt    240
gctccagacc tgatcggtat gggcaaatcc gacaaaccag acctgggtta tttcttcgac    300
gaccacgtcc gcttcatgga tgccttcatc gaagccctgg gtctggaaga ggtcgtcctg    360
gtcattcacg actggggctc cgctctgggt ttccactggg ccaagcgcaa tccagagcgc    420
gtcaaaggta ttgcatttat ggagttcatc cgccctatcc cgacctggga cgaatggcca    480
gaatttgccc gcgagacctt ccaggccttc cgcaccaccg acgtcggccg caagctgatc    540
atcgatcaga acgtttttat cgagggtacg ctgccgatgg tgtcgtccg cccgctgact    600 gaagtcgaga tggaccatta ccgcgagccg ttcctgaatc ctgttgaccg cgagccactg    660
tggcgcttcc caaacgagct gccaatcgcc ggtgagccag cgaacatcgt cgcgctggtc    720
gaagaataca tggactggct gcaccagtcc cctgtcccga agctgctgtt ctggggcacc    780
ccaggcgttc tgatcccacc ggccgaagcc gctcgcctgg ccaaaagcct gcctaactgc    840
aaggctgtgg acatcggccc gggtctgaat ctgctgcaag aagacaaccc ggacctgatc    900
ggcagcgaga tcgcgcgctg gctgtcgacg ctcgagattt ccggcgagcc aaccactatg    960
gtaagtatcg ctctgcaggc tggttacgac ctactgggtg acggcagacc tgaaaccctg   1020
tggctgggca tcggcactct gctgatgctg attggaacct tctactttct ggtccgcgga   1080
tggggagtca ccgataagga tgcccgggaa tattacgctg tgactatcct ggtgtccgga   1140
atcgcatccg ccgcatatct gtctatgttc tttggtatcg gcttactga ggtgtccgtc   1200 gggggcgaaa tgttggatat ctattatgcc aggtacgccc agtggctgtt taccacccca   1260
cttctgctgc tgcacctggc ccttctcgct aaggtggatc gggtgaccat cggcaccctg   1320
gtgggtgtgg acgccctgat gatcgtcact ggcctcatcg agccttgag ccacacggcc   1380 atagccagat acagttggtg ttgttctct acaatttgca tgatagtggt gctctatgtt   1440
ctggctacat ccctgcgatc tgctgcaaag gagcggggcc ccgaggtggc atctacctt   1500 aacaccctga cagctctggt cttggtgctg tggaccgctt accctatcct gtggatcata   1560
ggcactgagg gcgctggcgt ggtgggcctg ggcatcgaaa ctctgctgtt tatggtgttg   1620
```

```
gacgtgactg ccaaggtcgg ctttggcttt atcctgttga gatcccgggc tattctgggc    1680
gacaccgagg caccagaacc cagtgccggt gccgatacgt tgaagagtag aatcacaagc    1740
gaaggcgagt acatccccct ggatcaaata gacataaatg taggtggatt ttgttatgag    1800
aatgaagtat aa                                                        1812
```

<210> SEQ ID NO 22
<211> LENGTH: 603
<212> TYPE: PRT
<213> ORGANISM: Artificial
<220> FEATURE:
<223> OTHER INFORMATION: HaloTag-QuasAr2 Ligand

<400> SEQUENCE: 22

```
Met Glu Thr Asp Thr Leu Leu Leu Trp Val Leu Leu Leu Trp Val Pro
1               5                   10                  15

Gly Ser Thr Gly Asp Ile Gly Thr Gly Phe Pro Phe Asp Pro His Tyr
            20                  25                  30

Val Glu Val Leu Gly Glu Arg Met His Tyr Val Asp Val Gly Pro Arg
        35                  40                  45

Asp Gly Thr Pro Val Leu Phe Leu His Gly Asn Pro Thr Ser Ser Tyr
    50                  55                  60

Val Trp Arg Asn Ile Ile Pro His Val Ala Pro Thr His Arg Cys Ile
65                  70                  75                  80

Ala Pro Asp Leu Ile Gly Met Gly Lys Ser Asp Lys Pro Asp Leu Gly
                85                  90                  95

Tyr Phe Phe Asp Asp His Val Arg Phe Met Asp Ala Phe Ile Glu Ala
            100                 105                 110

Leu Gly Leu Glu Glu Val Val Leu Val Ile His Asp Trp Gly Ser Ala
        115                 120                 125

Leu Gly Phe His Trp Ala Lys Arg Asn Pro Glu Arg Val Lys Gly Ile
    130                 135                 140

Ala Phe Met Glu Phe Ile Arg Pro Ile Pro Thr Trp Asp Glu Trp Pro
145                 150                 155                 160

Glu Phe Ala Arg Glu Thr Phe Gln Ala Phe Arg Thr Thr Asp Val Gly
                165                 170                 175

Arg Lys Leu Ile Ile Asp Gln Asn Val Phe Ile Glu Gly Thr Leu Pro
            180                 185                 190

Met Gly Val Val Arg Pro Leu Thr Glu Val Glu Met Asp His Tyr Arg
        195                 200                 205

Glu Pro Phe Leu Asn Pro Val Asp Arg Glu Pro Leu Trp Arg Phe Pro
    210                 215                 220

Asn Glu Leu Pro Ile Ala Gly Glu Pro Ala Asn Ile Val Ala Leu Val
225                 230                 235                 240

Glu Glu Tyr Met Asp Trp Leu His Gln Ser Pro Val Pro Lys Leu Leu
                245                 250                 255

Phe Trp Gly Thr Pro Gly Val Leu Ile Pro Pro Ala Glu Ala Ala Arg
            260                 265                 270

Leu Ala Lys Ser Leu Pro Asn Cys Lys Ala Val Asp Ile Gly Pro Gly
        275                 280                 285

Leu Asn Leu Leu Gln Glu Asp Asn Pro Asp Leu Ile Gly Ser Glu Ile
    290                 295                 300

Ala Arg Trp Leu Ser Thr Leu Glu Ile Ser Gly Glu Pro Thr Thr Met
305                 310                 315                 320
```

Val Ser Ile Ala Leu Gln Gly Tyr Asp Leu Leu Gly Asp Gly Arg
            325                 330                 335

Pro Glu Thr Leu Trp Leu Gly Ile Gly Thr Leu Met Leu Ile Gly
        340                 345                 350

Thr Phe Tyr Phe Leu Val Arg Gly Trp Gly Val Thr Asp Lys Asp Ala
        355                 360                 365

Arg Glu Tyr Tyr Ala Val Thr Ile Leu Val Ser Gly Ile Ala Ser Ala
    370                 375                 380

Ala Tyr Leu Ser Met Phe Phe Gly Ile Gly Leu Thr Glu Val Ser Val
385                 390                 395                 400

Gly Gly Glu Met Leu Asp Ile Tyr Tyr Ala Arg Tyr Ala Gln Trp Leu
                405                 410                 415

Phe Thr Thr Pro Leu Leu Leu His Leu Ala Leu Leu Ala Lys Val
        420                 425                 430

Asp Arg Val Thr Ile Gly Thr Leu Val Gly Val Asp Ala Leu Met Ile
            435                 440                 445

Val Thr Gly Leu Ile Gly Ala Leu Ser His Thr Ala Ile Ala Arg Tyr
    450                 455                 460

Ser Trp Trp Leu Phe Ser Thr Ile Cys Met Ile Val Val Leu Tyr Val
465                 470                 475                 480

Leu Ala Thr Ser Leu Arg Ser Ala Ala Lys Glu Arg Gly Pro Glu Val
                485                 490                 495

Ala Ser Thr Phe Asn Thr Leu Thr Ala Leu Val Leu Val Leu Trp Thr
        500                 505                 510

Ala Tyr Pro Ile Leu Trp Ile Ile Gly Thr Glu Gly Ala Gly Val Val
        515                 520                 525

Gly Leu Gly Ile Glu Thr Leu Leu Phe Met Val Leu Asp Val Thr Ala
    530                 535                 540

Lys Val Gly Phe Gly Phe Ile Leu Leu Arg Ser Arg Ala Ile Leu Gly
545                 550                 555                 560

Asp Thr Glu Ala Pro Glu Pro Ser Ala Gly Ala Asp Thr Leu Lys Ser
                565                 570                 575

Arg Ile Thr Ser Glu Gly Glu Tyr Ile Pro Leu Asp Gln Ile Asp Ile
        580                 585                 590

Asn Val Gly Gly Phe Cys Tyr Glu Asn Glu Val
        595                 600

<210> SEQ ID NO 23
<211> LENGTH: 1659
<212> TYPE: DNA
<213> ORGANISM: Artificial
<220> FEATURE:
<223> OTHER INFORMATION: Ace2N-HaloTag Ligand

<400> SEQUENCE: 23
atggctgacg tggaaaccga gaccggcatg attgcacagt ggattgtctt tgctattatg      60
gctgctgctg ctattgcttt tggagtggct gtgcactttc ggccttcaga gctgaagagc     120
gcatactata tcaacattgc catctgcact atcgccgcta ccgcttacta tgcaatggcc     180
gtgaactacc aggacctgac aatgaatggt gaaaggcagg tggtctacgc aagatatatt     240
aactgggtgc tgaccacacc actgctcctg ctcgatctca tcgtcatgac caagatgggc     300
ggagtgatga tttcttgggt catcggcgca gacattttca tgatcgtgtt tggtattctg     360
ggcgccttcg aggatgaaca caagttcaaa tgggtgtact ttatcgctgg atgtgtgatg     420
caggcagtcc tgacatacgg gatgtataac gccacttgga agacgatct gaagaaaagc     480

```
cccgagtacc atagctccta tgtcagtctg ctcgtcttcc tgtcaatcct ctgggtgttt    540
tatcctgtcg tgtgggcttt cgggtctggt agtggcgtgc tgtccgtcga caatgaggcc    600
attctcatgg gaatcctgga tgtgctcgct aagccactgt ttggaatggg gtgcctcatt    660
gcccatgaga ctatcttcaa gatcggtact ggctttccat tcgacccca ttatgtggaa    720 gtcctgggcg agcgcatgca ctacgtcgat gttggtccgc gcgatggcac ccctgtgctg    780
ttcctgcacg gtaacccgac ctcctcctac gtgtggcgca acatcatccc gcatgttgca    840
ccgacccatc gctgcattgc tccagacctg atcggtatgg gcaaatccga caaccagac    900 ctgggttatt tcttcgacga ccacgtccgc ttcatggatg ccttcatcga agccctgggt    960
ctggaagagg tcgtcctggt cattcacgac tggggctccg ctctgggttt ccactgggcc   1020
aagcgcaatc agagcgcgt caaaggtatt gcatttatgg agttcatccg ccctatcccg   1080
acctgggacg aatggccaga atttgcccgc gagaccttcc aggccttccg caccaccgac   1140
gtcggccgca agctgatcat cgatcagaac gtttttatcg agggtacgct gccgatgggt   1200
gtcgtccgcc cgctgactga agtcgagatg gaccattacc gcgagccgtt cctgaatcct   1260
gttgaccgcg agccactgtg gcgcttccca aacgagctgc caatcgccgg tgagccagcg   1320
aacatcgtcg cgctggtcga agaatacatg gactggctgc accagtcccc tgtcccgaag   1380
ctgctgttct ggggcacccc caggcgttct gatcccaccgg ccgaagccgc tcgcctggcc   1440
aaaagcctgc taactgcaa ggctgtggac atcggcccgg gtctgaatct gctgcaagaa   1500
gacaacccgg acctgatcgg cagcgagatc gcgcgctggc tgtcgacgct cgagatttcc   1560
ggcgagccaa ccactaagag caggatcacc agcgagggcg agtacatccc cctggaccag   1620
atcgacatca acgtgttctg ctacgagaac gaggtgtaa                          1659

<210> SEQ ID NO 24
<211> LENGTH: 552
<212> TYPE: PRT
<213> ORGANISM: Artificial
<220> FEATURE:
<223> OTHER INFORMATION: Ace2N-HaloTag Ligand

<400> SEQUENCE: 24

Met Ala Asp Val Glu Thr Glu Thr Gly Met Ile Ala Gln Trp Ile Val
1               5                   10                  15

Phe Ala Ile Met Ala Ala Ala Ile Ala Phe Gly Val Ala Val His
            20                  25                  30

Phe Arg Pro Ser Glu Leu Lys Ser Ala Tyr Tyr Ile Asn Ile Ala Ile
        35                  40                  45

Cys Thr Ile Ala Ala Thr Ala Tyr Tyr Ala Met Ala Val Asn Tyr Gln
    50                  55                  60

Asp Leu Thr Met Asn Gly Glu Arg Gln Val Val Tyr Ala Arg Tyr Ile
65                  70                  75                  80

Asn Trp Val Leu Thr Thr Pro Leu Leu Leu Leu Asp Leu Ile Val Met
                85                  90                  95

Thr Lys Met Gly Gly Val Met Ile Ser Trp Val Ile Gly Ala Asp Ile
            100                 105                 110

Phe Met Ile Val Phe Gly Ile Leu Gly Ala Phe Glu Asp Glu His Lys
        115                 120                 125

Phe Lys Trp Val Tyr Phe Ile Ala Gly Cys Val Met Gln Ala Val Leu
    130                 135                 140
```

```
Thr Tyr Gly Met Tyr Asn Ala Thr Trp Lys Asp Asp Leu Lys Lys Ser
145                 150                 155                 160

Pro Glu Tyr His Ser Ser Tyr Val Ser Leu Leu Val Phe Leu Ser Ile
                165                 170                 175

Leu Trp Val Phe Tyr Pro Val Val Trp Ala Phe Gly Ser Gly Ser Gly
            180                 185                 190

Val Leu Ser Val Asp Asn Glu Ala Ile Leu Met Gly Ile Leu Asp Val
        195                 200                 205

Leu Ala Lys Pro Leu Phe Gly Met Gly Cys Leu Ile Ala His Glu Thr
    210                 215                 220

Ile Phe Lys Ile Gly Thr Gly Phe Pro Phe Asp Pro His Tyr Val Glu
225                 230                 235                 240

Val Leu Gly Glu Arg Met His Tyr Val Asp Val Gly Pro Arg Asp Gly
                245                 250                 255

Thr Pro Val Leu Phe Leu His Gly Asn Pro Thr Ser Ser Tyr Val Trp
            260                 265                 270

Arg Asn Ile Ile Pro His Val Ala Pro Thr His Arg Cys Ile Ala Pro
        275                 280                 285

Asp Leu Ile Gly Met Gly Lys Ser Asp Lys Pro Asp Leu Gly Tyr Phe
    290                 295                 300

Phe Asp Asp His Val Arg Phe Met Asp Ala Phe Ile Glu Ala Leu Gly
305                 310                 315                 320

Leu Glu Glu Val Val Leu Val Ile His Asp Trp Gly Ser Ala Leu Gly
                325                 330                 335

Phe His Trp Ala Lys Arg Asn Pro Glu Arg Val Lys Gly Ile Ala Phe
            340                 345                 350

Met Glu Phe Ile Arg Pro Ile Pro Thr Trp Asp Glu Trp Pro Glu Phe
        355                 360                 365

Ala Arg Glu Thr Phe Gln Ala Phe Arg Thr Thr Asp Val Gly Arg Lys
    370                 375                 380

Leu Ile Ile Asp Gln Asn Val Phe Ile Glu Gly Thr Leu Pro Met Gly
385                 390                 395                 400

Val Val Arg Pro Leu Thr Glu Val Glu Met Asp His Tyr Arg Glu Pro
                405                 410                 415

Phe Leu Asn Pro Val Asp Arg Glu Pro Leu Trp Arg Phe Pro Asn Glu
            420                 425                 430

Leu Pro Ile Ala Gly Glu Pro Ala Asn Ile Val Ala Leu Val Glu Glu
        435                 440                 445

Tyr Met Asp Trp Leu His Gln Ser Pro Val Pro Lys Leu Leu Phe Trp
    450                 455                 460

Gly Thr Pro Gly Val Leu Ile Pro Pro Ala Glu Ala Ala Arg Leu Ala
465                 470                 475                 480

Lys Ser Leu Pro Asn Cys Lys Ala Val Asp Ile Gly Pro Gly Leu Asn
                485                 490                 495

Leu Leu Gln Glu Asp Asn Pro Asp Leu Ile Gly Ser Glu Ile Ala Arg
            500                 505                 510

Trp Leu Ser Thr Leu Glu Ile Ser Gly Glu Pro Thr Thr Lys Ser Arg
        515                 520                 525

Ile Thr Ser Glu Gly Glu Tyr Ile Pro Leu Asp Gln Ile Asp Ile Asn
    530                 535                 540

Val Phe Cys Tyr Glu Asn Glu Val
545                 550
```

<210> SEQ ID NO 25
<211> LENGTH: 1614
<212> TYPE: DNA
<213> ORGANISM: Artificial
<220> FEATURE:
<223> OTHER INFORMATION: CiVSD-HaloTag Ligand

<400> SEQUENCE: 25

| | | | | | |
|---|---|---|---|---|---|
| atggagggat | tcgacggttc | agattttagt | cctccagctg | atttagttgg cgttggcggt | 60 |
| gcagtcatgc | ggaacgtcgt | tgacgtcacg | ataaatggtg | acgtcactgc tccgccgaaa | 120 |
| gcagcgccaa | gaaaaagtga | atcggtaaag | aaagttcatt | ggaatgatgt agaccaagga | 180 |
| ccgagtgaaa | aaccagagac | aagacaggag | gaacgaatag | atatacccga gatttcaggt | 240 |
| ctatggtggg | gcgagaatga | acatggagtg | ggcggtggga | gaatggagat acctactact | 300 |
| ggtgtaggtc | gcgtccagtt | tcgtgtccga | gcagtgattg | atcatctagg gatgcgagcc | 360 |
| tttggagtct | tcctaattct | cttggacatc | atcctcatga | tcattgatct cagtcttcca | 420 |
| ggaaaaagtg | aatcttcaca | atccttttat | gacgggttgg | ctttggctct ttcttgttat | 480 |
| ttcatgctgg | atttaggatt | aaggatattt | gcctacgggc | caagaatttt cttcaccaac | 540 |
| ccctgggagg | ttgctgatgg | cttgattatc | gttgtcacat | cgtcgtcac gatattttac | 600 |
| actgtgttag | atgaatactt | tcaagaaaca | ggagccgatg | gtttgggca gttggttgtg | 660 |
| ttggcccgtt | tgctgcgtgt | ggttcgatta | gcaagaatat | tttattccca tcaacaaatc | 720 |
| ggtactggct | ttccattcga | cccccattat | gtggaagtcc | tgggcgagcg catgcactac | 780 |
| gtcgatgttg | gtccgcgcga | tggcaccccct | gtgctgttcc | tgcacggtaa cccgacctcc | 840 |
| tcctacgtgt | ggcgcaacat | catcccgcat | gttgcaccga | cccatcgctg cattgctcca | 900 |
| gacctgatcg | gtatgggcaa | atccgacaaa | ccagacctgg | ttatttctt cgacgaccac | 960 |
| gtccgcttca | tggatgcctt | catcgaagcc | ctgggtctgg | aagaggtcgt cctggtcatt | 1020 |
| cacgactggg | gctccgctct | gggttttcca | ctgggccaagc | gcaatccaga gcgcgtcaaa | 1080 |
| ggtattgcat | ttatggagtt | catccgccct | atcccgacct | gggacgaatg ccagaatttt | 1140 |
| gcccgcgaga | ccttccaggc | cttcgcacc | accgacgtcg | gccgcaagct gatcatcgat | 1200 |
| cagaacgttt | ttatcgaggg | tacgctgccg | atgggtgtcg | tccgcccgct gactgaagtc | 1260 |
| gagatggacc | attaccgcga | gccgttcctg | aatcctgttg | accgcgagcc actgtggcgc | 1320 |
| ttcccaaacg | agctgccaat | cgccggtgag | ccagcgaaca | tcgtcgcgct ggtcgaagaa | 1380 |
| tacatggact | ggctgcacca | gtcccctgtc | ccgaagctgc | tgttctgggg cacccccaggc | 1440 |
| gttctgatcc | caccggccga | agccgctcgc | ctggccaaaa | gcctgcctaa ctgcaaggct | 1500 |
| gtggacatcg | gcccgggtct | gaatctgctg | caagaagaca | accccgaccct gatcggcagc | 1560 |
| gagatcgcgc | gctggctgtc | gacgctcgag | atttccggcg | agccaaccac ttaa | 1614 |

<210> SEQ ID NO 26
<211> LENGTH: 537
<212> TYPE: PRT
<213> ORGANISM: Artificial
<220> FEATURE:
<223> OTHER INFORMATION: CiVSD-HaloTag Ligand

<400> SEQUENCE: 26

Met Glu Gly Phe Asp Gly Ser Asp Phe Ser Pro Pro Ala Asp Leu Val
1               5                   10                  15

Gly Val Gly Gly Ala Val Met Arg Asn Val Val Asp Val Thr Ile Asn
            20                  25                  30

-continued

Gly Asp Val Thr Ala Pro Pro Lys Ala Ala Pro Arg Lys Ser Glu Ser
            35                  40                  45

Val Lys Lys Val His Trp Asn Asp Val Asp Gln Gly Pro Ser Glu Lys
 50                      55                  60

Pro Glu Thr Arg Gln Glu Arg Ile Asp Ile Pro Glu Ile Ser Gly
 65              70                  75                  80

Leu Trp Trp Gly Glu Asn Glu His Gly Val Gly Gly Arg Met Glu
                 85                  90                  95

Ile Pro Thr Thr Gly Val Gly Arg Val Gln Phe Arg Val Arg Ala Val
                100             105                 110

Ile Asp His Leu Gly Met Arg Ala Phe Gly Val Phe Leu Ile Leu Leu
        115                 120                 125

Asp Ile Ile Leu Met Ile Ile Asp Leu Ser Leu Pro Gly Lys Ser Glu
 130                 135                 140

Ser Ser Gln Ser Phe Tyr Asp Gly Leu Ala Leu Ala Leu Ser Cys Tyr
 145                 150                 155                 160

Phe Met Leu Asp Leu Gly Leu Arg Ile Phe Ala Tyr Gly Pro Lys Asn
                165                 170                 175

Phe Phe Thr Asn Pro Trp Glu Val Ala Asp Gly Leu Ile Ile Val Val
                180                 185                 190

Thr Phe Val Val Thr Ile Phe Tyr Thr Val Leu Asp Glu Tyr Phe Gln
                195                 200                 205

Glu Thr Gly Ala Asp Gly Leu Gly Gln Leu Val Val Leu Ala Arg Leu
        210                 215                 220

Leu Arg Val Val Arg Leu Ala Arg Ile Phe Tyr Ser His Gln Gln Ile
225                 230                 235                 240

Gly Thr Gly Phe Pro Phe Asp Pro His Tyr Val Glu Val Leu Gly Glu
                245                 250                 255

Arg Met His Tyr Val Asp Val Gly Pro Arg Asp Gly Thr Pro Val Leu
                260                 265                 270

Phe Leu His Gly Asn Pro Thr Ser Ser Tyr Val Trp Arg Asn Ile Ile
        275                 280                 285

Pro His Val Ala Pro Thr His Arg Cys Ile Ala Pro Asp Leu Ile Gly
        290                 295                 300

Met Gly Lys Ser Asp Lys Pro Asp Leu Gly Tyr Phe Phe Asp Asp His
305                 310                 315                 320

Val Arg Phe Met Asp Ala Phe Ile Glu Ala Leu Gly Leu Glu Glu Val
                325                 330                 335

Val Leu Val Ile His Asp Trp Gly Ser Ala Leu Gly Phe His Trp Ala
                340                 345                 350

Lys Arg Asn Pro Glu Arg Val Lys Gly Ile Ala Phe Met Glu Phe Ile
                355                 360                 365

Arg Pro Ile Pro Thr Trp Asp Glu Trp Pro Glu Phe Ala Arg Glu Thr
 370                 375                 380

Phe Gln Ala Phe Arg Thr Thr Asp Val Gly Arg Lys Leu Ile Ile Asp
385                 390                 395                 400

Gln Asn Val Phe Ile Glu Gly Thr Leu Pro Met Gly Val Val Arg Pro
                405                 410                 415

Leu Thr Glu Val Glu Met Asp His Tyr Arg Glu Pro Phe Leu Asn Pro
                420                 425                 430

Val Asp Arg Glu Pro Leu Trp Arg Phe Pro Asn Glu Leu Pro Ile Ala
                435                 440                 445

```
Gly Glu Pro Ala Asn Ile Val Ala Leu Val Glu Glu Tyr Met Asp Trp
            450                 455                 460
Leu His Gln Ser Pro Val Pro Lys Leu Leu Phe Trp Gly Thr Pro Gly
465                 470                 475                 480
Val Leu Ile Pro Pro Ala Glu Ala Ala Arg Leu Ala Lys Ser Leu Pro
                485                 490                 495
Asn Cys Lys Ala Val Asp Ile Gly Pro Gly Leu Asn Leu Leu Gln Glu
                500                 505                 510
Asp Asn Pro Asp Leu Ile Gly Ser Glu Ile Ala Arg Trp Leu Ser Thr
                515                 520                 525
Leu Glu Ile Ser Gly Glu Pro Thr Thr
            530                 535

<210> SEQ ID NO 27
<211> LENGTH: 1653
<212> TYPE: DNA
<213> ORGANISM: Artificial
<220> FEATURE:
<223> OTHER INFORMATION: CiVSD-cpHaloTag Ligand

<400> SEQUENCE: 27
atggagggat cgacggttc agattttagt cctccagctg atttagttgg cgttggcggt      60
gcagtcatgc ggaacgtcgt tgacgtcacg ataaatggtg acgtcactgc tccgccgaaa    120
gcagcgccaa gaaaaagtga atcggtaaag aaagttcatt ggaatgatgt agaccaagga    180
ccgagtgaaa aaccagagac aagacaggag gaacgaatag atatacccga gatttcaggt    240
ctatggtggg gcgagaatga acatggagtg ggcggtggga gaatggagat acctactact    300
ggtgtaggtc gcgtccagtt tcgtgtccga gcagtgattg atcatctagg gatgcgagcc    360
tttggagtct tcctaattct cttggacatc atcctcatga tcattgatct cagtcttcca    420
ggaaaaagtg aatcttcaca atcctttta gacgggttgg cttggctct tcttgttat      480
ttcatgctgg atttaggatt aaggatattt gcctacgggc caagaatt cttcaccaac      540
ccctgggagg ttgctgatgg cttgattatc gttgtcacat cgtcgtcac gatattttac    600
actgtgttag atgaatactt tcaagaaaca ggagccgatg gtttgggca gttggttgtg    660
ttggcccgtt gctgcgtgt ggttcgatta gcaagaatat tttattccca tcaacaaacc    720
ttccaggcct tccgcaccac cgacgtcggc cgcaagctga tcatcgatca gaacgttttt    780
atcgagggta cgctgccgat gggtgtcgtc cgcccgctga ctgaagtcga gatggaccat    840
taccgcgagc cgttcctgaa tcctgttgac cgcgagccac tgtggcgctt cccaaacgag    900
ctgccaatcg ccggtgagcc agcgaacatc gtcgcgctgg tcgaagaata catggactgg    960
ctgcaccagt ccctgtccc gaagctgctg ttctggggca ccccaggcgt tctgatccca   1020
ccggccgaag ccgctcgcct ggccaaaagc ctgcctaact gcaaggctgt ggacatcggc   1080
ccgggtctga tctgctgca agaagacaac ccggacctga tcggcagcga gatcgcgcgc   1140
tggctgtcga cgctcgagat tccggcgag ccaaccactg gaggcagcgg cggaacagga   1200
ggctccggcg gcaccggagg atccatggca gaaatcggta ctggctttcc attcgacccc   1260
cattatgtgg aagtcctggg cgagcgcatg cactacgtcg atgttggtcc gcgcgatggc   1320
acccctgtgc tgttcctgca cggtaacccg acctcctcct acgtgtggcg caacatcatc   1380
ccgcatgttg caccgacccca tcgctgcatt gctccagacc tgatcggtat gggcaaatcc   1440
gacaaaccag acctgggtta tttcttcgac gaccacgtcc gcttcatgga tgccttcatc   1500
gaagccctgg gtctggaaga ggtcgtcctg gtcattcacg actggggctc cgctctgggt   1560
```

```
ttccactggg ccaagcgcaa tccagagcgc gtcaaaggta ttgcatttat ggagttcatc      1620
cgccctatcc cgacctggga cgaatggcca taa                                  1653

<210> SEQ ID NO 28
<211> LENGTH: 550
<212> TYPE: PRT
<213> ORGANISM: Artificial
<220> FEATURE:
<223> OTHER INFORMATION: CiVSD-cpHaloTag Ligand

<400> SEQUENCE: 28
```

| Met | Glu | Gly | Phe | Asp | Gly | Ser | Asp | Phe | Ser | Pro | Pro | Ala | Asp | Leu | Val |
|---|---|---|---|---|---|---|---|---|---|---|---|---|---|---|---|
| 1 | | | | 5 | | | | | 10 | | | | | 15 | |

| Gly | Val | Gly | Gly | Ala | Val | Met | Arg | Asn | Val | Val | Asp | Val | Thr | Ile | Asn |
| | | | 20 | | | | | 25 | | | | | 30 | | |

| Gly | Asp | Val | Thr | Ala | Pro | Pro | Lys | Ala | Ala | Pro | Arg | Lys | Ser | Glu | Ser |
| | | | 35 | | | | 40 | | | | | 45 | | | |

| Val | Lys | Lys | Val | His | Trp | Asn | Asp | Val | Asp | Gln | Gly | Pro | Ser | Glu | Lys |
| | 50 | | | | | 55 | | | | | 60 | | | | |

| Pro | Glu | Thr | Arg | Gln | Glu | Glu | Arg | Ile | Asp | Ile | Pro | Glu | Ile | Ser | Gly |
| 65 | | | | | 70 | | | | | 75 | | | | | 80 |

| Leu | Trp | Trp | Gly | Glu | Asn | Glu | His | Gly | Val | Gly | Gly | Arg | Met | Glu |
| | | | | 85 | | | | | 90 | | | | | 95 |

| Ile | Pro | Thr | Thr | Gly | Val | Gly | Arg | Val | Gln | Phe | Arg | Val | Arg | Ala | Val |
| | | | 100 | | | | | 105 | | | | | 110 | | |

| Ile | Asp | His | Leu | Gly | Met | Arg | Ala | Phe | Gly | Val | Phe | Leu | Ile | Leu | Leu |
| | | | 115 | | | | | 120 | | | | | 125 | | |

| Asp | Ile | Ile | Leu | Met | Ile | Ile | Asp | Leu | Ser | Leu | Pro | Gly | Lys | Ser | Glu |
| | 130 | | | | | 135 | | | | | 140 | | | | |

| Ser | Ser | Gln | Ser | Phe | Tyr | Asp | Gly | Leu | Ala | Leu | Ala | Leu | Ser | Cys | Tyr |
| 145 | | | | | 150 | | | | | 155 | | | | | 160 |

| Phe | Met | Leu | Asp | Leu | Gly | Leu | Arg | Ile | Phe | Ala | Tyr | Gly | Pro | Lys | Asn |
| | | | 165 | | | | | 170 | | | | | 175 | | |

| Phe | Phe | Thr | Asn | Pro | Trp | Glu | Val | Ala | Asp | Gly | Leu | Ile | Ile | Val | Val |
| | | | 180 | | | | | 185 | | | | | 190 | | |

| Thr | Phe | Val | Val | Thr | Ile | Phe | Tyr | Thr | Val | Leu | Asp | Glu | Tyr | Phe | Gln |
| | | | 195 | | | | | 200 | | | | | 205 | | |

| Glu | Thr | Gly | Ala | Asp | Gly | Leu | Gly | Gln | Leu | Val | Val | Leu | Ala | Arg | Leu |
| | 210 | | | | | 215 | | | | | 220 | | | | |

| Leu | Arg | Val | Val | Arg | Leu | Ala | Arg | Ile | Phe | Tyr | Ser | His | Gln | Gln | Thr |
| 225 | | | | | 230 | | | | | 235 | | | | | 240 |

| Phe | Gln | Ala | Phe | Arg | Thr | Thr | Asp | Val | Gly | Arg | Lys | Leu | Ile | Ile | Asp |
| | | | 245 | | | | | 250 | | | | | 255 | | |

| Gln | Asn | Val | Phe | Ile | Glu | Gly | Thr | Leu | Pro | Met | Gly | Val | Val | Arg | Pro |
| | | | 260 | | | | | 265 | | | | | 270 | | |

| Leu | Thr | Glu | Val | Glu | Met | Asp | His | Tyr | Arg | Glu | Pro | Phe | Leu | Asn | Pro |
| | | | 275 | | | | | 280 | | | | | 285 | | |

| Val | Asp | Arg | Glu | Pro | Leu | Trp | Arg | Phe | Pro | Asn | Glu | Leu | Pro | Ile | Ala |
| | 290 | | | | | 295 | | | | | 300 | | | | |

| Gly | Glu | Pro | Ala | Asn | Ile | Val | Ala | Leu | Val | Glu | Glu | Tyr | Met | Asp | Trp |
| 305 | | | | | 310 | | | | | 315 | | | | | 320 |

| Leu | His | Gln | Ser | Pro | Val | Pro | Lys | Leu | Leu | Phe | Trp | Gly | Thr | Pro | Gly |
| | | | 325 | | | | | 330 | | | | | 335 | | |

```
Val Leu Ile Pro Pro Ala Glu Ala Ala Arg Leu Ala Lys Ser Leu Pro
        340                 345                 350

Asn Cys Lys Ala Val Asp Ile Gly Pro Gly Leu Asn Leu Leu Gln Glu
            355                 360                 365

Asp Asn Pro Asp Leu Ile Gly Ser Glu Ile Ala Arg Trp Leu Ser Thr
370                 375                 380

Leu Glu Ile Ser Gly Glu Pro Thr Thr Gly Ser Gly Thr Gly
385                 390                 395                 400

Gly Ser Gly Gly Thr Gly Gly Ser Met Ala Glu Ile Gly Thr Gly Phe
                405                 410                 415

Pro Phe Asp Pro His Tyr Val Glu Val Leu Gly Glu Arg Met His Tyr
                420                 425                 430

Val Asp Val Gly Pro Arg Asp Gly Thr Pro Val Leu Phe Leu His Gly
                435                 440                 445

Asn Pro Thr Ser Ser Tyr Val Trp Arg Asn Ile Ile Pro His Val Ala
450                 455                 460

Pro Thr His Arg Cys Ile Ala Pro Asp Leu Ile Gly Met Gly Lys Ser
465                 470                 475                 480

Asp Lys Pro Asp Leu Gly Tyr Phe Phe Asp Asp His Val Arg Phe Met
                485                 490                 495

Asp Ala Phe Ile Glu Ala Leu Gly Leu Glu Glu Val Val Leu Val Ile
                500                 505                 510

His Asp Trp Gly Ser Ala Leu Gly Phe His Trp Ala Lys Arg Asn Pro
                515                 520                 525

Glu Arg Val Lys Gly Ile Ala Phe Met Glu Phe Ile Arg Pro Ile Pro
                530                 535                 540

Thr Trp Asp Glu Trp Pro
545                 550

<210> SEQ ID NO 29
<211> LENGTH: 1434
<212> TYPE: DNA
<213> ORGANISM: Artificial
<220> FEATURE:
<223> OTHER INFORMATION: DrVSD-HaloTag Ligand

<400> SEQUENCE: 29
atggagacgt ctgtgcattt taaccctggg ttagattcca agaagttaa tggtaattcg      60 gtgaaagaag aggcagaggt gcagatcgat gatggaaagg aagaaaccaa agacccagac    120
acaatgtacc atcaggtccg gaaaaagata actccttttg tgatgtcctt ggttttcgt    180 gtttttggcc tggtactgat catcttggac atcattatgg tcattgtgga cttgtctctt    240
tctgagaaga gtcgtgatgt ggaggtgca ccggagactg tttctctggt catctctttc    300
ttttttctca tcgatgtatt gctccgtgtt tatgtggagg gattcaaggt gtatttcagc    360
tcaaaactga atatagtaga tgcttgtatt gtggtcatta ctctggtggt caccatgatc    420
tacgcattct ccgatttctc aggagccagt ctgattcccc aggtggtgac attcctgagg    480
tctctgagga tcctaattct ggtacgcatc ttcagactgg cctcgcaggg agatcccatc    540
ggtactggct ttccattcga ccccattat gtggaagtcc tgggcgagcg catgcactac    600
gtcgatgttg gtccgcgcga tggcacccct gtgctgttcc tgcacggtaa cccgacctcc    660
tcctacgtgt ggcgcaacat catcccgcat gttgcaccga cccatcgctg cattgctcca    720
gacctgatcg gtatgggcaa atccgacaaa ccagacctgg gttatttctt cgacgaccac    780
```

```
gtccgcttca tggatgcctt catcgaagcc ctgggtctgg aagaggtcgt cctggtcatt      840
cacgactggg gctccgctct gggtttccac tgggccaagc gcaatccaga gcgcgtcaaa      900
ggtattgcat ttatggagtt catccgccct atcccgacct gggacgaatg ccagaatttt      960
gcccgcgaga ccttccaggc cttcgcacc accgacgtcg gccgcaagct gatcatcgat      1020
cagaacgttt ttatcgaggg tacgctgccg atgggtgtcg tccgcccgct gactgaagtc      1080
gagatggacc attaccgcga gccgttcctg aatcctgttg accgcgagcc actgtggcgc      1140
ttcccaaacg agctgccaat cgccggtgag ccagcgaaca tcgtcgcgct ggtcgaagaa      1200
tacatggact ggctgcacca gtcccctgtc ccgaagctgc tgttctgggg cacccccaggc      1260 gttctgatcc caccggccga agccgctcgc ctggccaaaa gcctgcctaa ctgcaaggct      1320
gtggacatcg gccgggtct gaatctgctg caagaagaca cccggacct gatcggcagc      1380 gagatcgcgc gctggctgtc gacgctcgag atttccggcg agccaaccac ttaa            1434
```

<210> SEQ ID NO 30
<211> LENGTH: 477
<212> TYPE: PRT
<213> ORGANISM: Artificial
<220> FEATURE:
<223> OTHER INFORMATION: DrVSD-HaloTag Ligand

<400> SEQUENCE: 30

```
Met Glu Thr Ser Val His Phe Asn Pro Gly Leu Asp Ser Lys Glu Val
 1               5                  10                  15

Asn Gly Asn Ser Val Lys Glu Glu Ala Glu Val Gln Ile Asp Asp Gly
             20                  25                  30

Lys Glu Thr Lys Asp Pro Asp Thr Met Tyr His Gln Val Arg Lys
         35                  40                  45

Lys Ile Thr Pro Phe Val Met Ser Phe Gly Phe Arg Val Phe Gly Leu
     50                  55                  60

Val Leu Ile Ile Leu Asp Ile Ile Met Val Ile Val Asp Leu Ser Leu
 65                  70                  75                  80

Ser Glu Lys Ser Arg Asp Val Gly Gly Ala Pro Glu Thr Val Ser Leu
                 85                  90                  95

Val Ile Ser Phe Phe Leu Ile Asp Val Leu Leu Arg Val Tyr Val
            100                 105                 110

Glu Gly Phe Lys Val Tyr Phe Ser Ser Lys Leu Asn Ile Val Asp Ala
        115                 120                 125

Cys Ile Val Val Ile Thr Leu Val Val Thr Met Ile Tyr Ala Phe Ser
    130                 135                 140

Asp Phe Ser Gly Ala Ser Leu Ile Pro Gln Val Val Thr Phe Leu Arg
145                 150                 155                 160

Ser Leu Arg Ile Leu Ile Leu Val Arg Ile Phe Arg Leu Ala Ser Gln
                165                 170                 175

Gly Asp Pro Ile Gly Thr Gly Phe Pro Phe Asp Pro His Tyr Val Glu
            180                 185                 190

Val Leu Gly Glu Arg Met His Tyr Val Asp Val Gly Pro Arg Asp Gly
        195                 200                 205

Thr Pro Val Leu Phe Leu His Gly Asn Pro Thr Ser Ser Tyr Val Trp
    210                 215                 220

Arg Asn Ile Ile Pro His Val Ala Pro Thr His Arg Cys Ile Ala Pro
225                 230                 235                 240

Asp Leu Ile Gly Met Gly Lys Ser Asp Lys Pro Asp Leu Gly Tyr Phe
                245                 250                 255
```

```
Phe Asp Asp His Val Arg Phe Met Asp Ala Phe Ile Glu Ala Leu Gly
            260                 265                 270

Leu Glu Glu Val Val Leu Val Ile His Asp Trp Gly Ser Ala Leu Gly
            275                 280                 285

Phe His Trp Ala Lys Arg Asn Pro Glu Arg Val Lys Gly Ile Ala Phe
            290                 295                 300

Met Glu Phe Ile Arg Pro Ile Pro Thr Trp Asp Glu Trp Pro Glu Phe
305                 310                 315                 320

Ala Arg Glu Thr Phe Gln Ala Phe Arg Thr Thr Asp Val Gly Arg Lys
                325                 330                 335

Leu Ile Ile Asp Gln Asn Val Phe Ile Glu Gly Thr Leu Pro Met Gly
            340                 345                 350

Val Val Arg Pro Leu Thr Glu Val Glu Met Asp His Tyr Arg Glu Pro
            355                 360                 365

Phe Leu Asn Pro Val Asp Arg Glu Pro Leu Trp Arg Phe Pro Asn Glu
    370                 375                 380

Leu Pro Ile Ala Gly Glu Pro Ala Asn Ile Val Ala Leu Val Glu Glu
385                 390                 395                 400

Tyr Met Asp Trp Leu His Gln Ser Pro Val Pro Lys Leu Leu Phe Trp
                405                 410                 415

Gly Thr Pro Gly Val Leu Ile Pro Pro Ala Glu Ala Ala Arg Leu Ala
            420                 425                 430

Lys Ser Leu Pro Asn Cys Lys Ala Val Asp Ile Gly Pro Gly Leu Asn
            435                 440                 445

Leu Leu Gln Glu Asp Asn Pro Asp Leu Ile Gly Ser Glu Ile Ala Arg
    450                 455                 460

Trp Leu Ser Thr Leu Glu Ile Ser Gly Glu Pro Thr Thr
465                 470                 475
```

<210> SEQ ID NO 31
<211> LENGTH: 1434
<212> TYPE: DNA
<213> ORGANISM: Artificial
<220> FEATURE:
<223> OTHER INFORMATION: GgVSD-HaloTag Ligand

<400> SEQUENCE: 31

```
atggagacga ctgtgaggta tgaacagggg tcagagctca ctaaaacttc gagctctcca      60
acagcagatg agcccacgat aaagattgat gatggtcgtg atgagggtaa tgaacaagac     120
agctgttcca ataccattag gagaaaaatt tccccgtttg tgatgtcatt tggattcaga     180
gtatttggag ttgtgcttat cattgtagac atcatagtgg tgattgtgga tctggccatc     240
agtgagaaga aaagaggcat tagagagatt cttgaaggtg tttccctggc tatagcactc     300
ttcttccttg ttgatgttct catgagagtg tttgttgaag cttcaagaa ctatttccgg      360 tccaaactga atactttgga tgcagtcata gtagtgggca ctctgctaat taatatgacc     420
tactccttct ctgaccttgc tgccacagat cagatgccgc agatggttac tcttcttcga     480
gttctgagaa ttgttatctt aataagaata tttcgcctgg cttcacaggg ggatcccatc     540
ggtactggct tccattcga cccccattat gtggaagtcc tgggcgagcg catgcactac     600
gtcgatgttg gtccgcgcga tggcaccct gtgctgttcc tgcacggtaa cccgacctcc     660
tcctacgtgt ggcgcaacat catcccgcat gttgcaccga cccatcgctg cattgctcca     720
gacctgatcg gtatgggcaa atccgacaaa ccagacctgg gttatttctt cgacgaccac     780
```

```
gtccgcttca tggatgcctt catcgaagcc ctgggtctgg aagaggtcgt cctggtcatt      840
cacgactggg gctccgctct gggtttccac tgggccaagc gcaatccaga gcgcgtcaaa      900
ggtattgcat ttatggagtt catccgccct atcccgacct gggacgaatg ccagaatttt      960
gcccgcgaga ccttccaggc cttccgcacc accgacgtcg gccgcaagct gatcatcgat     1020
cagaacgttt ttatcgaggg tacgctgccg atgggtgtcg tccgcccgct gactgaagtc     1080
gagatggacc attaccgcga gccgttcctg aatcctgttg accgcgagcc actgtggcgc     1140
ttcccaaacg agctgccaat cgccggtgag ccagcgaaca tcgtcgcgct ggtcgaagaa     1200
tacatggact ggctgcacca gtcccctgtc ccgaagctgc tgttctgggg cacccccaggc    1260 gttctgatcc caccggccga agccgctcgc ctggccaaaa gcctgcctaa ctgcaaggct     1320
gtggacatcg gccgggtct gaatctgctg caagaagaca accgggacct gatcggcagc     1380
gagatcgcgc gctggctgtc gacgctcgag atttccggcg agccaaccac ttaa           1434
```

<210> SEQ ID NO 32
<211> LENGTH: 477
<212> TYPE: PRT
<213> ORGANISM: Artificial
<220> FEATURE:
<223> OTHER INFORMATION: GgVSD-HaloTag Ligand

<400> SEQUENCE: 32

Met Glu Thr Thr Val Arg Tyr Glu Gln Gly Ser Glu Leu Thr Lys Thr
1               5                   10                  15

Ser Ser Pro Thr Ala Asp Glu Pro Thr Ile Lys Ile Asp Asp Gly
        20                  25                  30

Arg Asp Glu Gly Asn Glu Gln Asp Ser Cys Ser Asn Thr Ile Arg Arg
    35                  40                  45

Lys Ile Ser Pro Phe Val Met Ser Phe Gly Phe Arg Val Phe Gly Val
    50                  55                  60

Val Leu Ile Ile Val Asp Ile Ile Val Ile Val Asp Leu Ala Ile
65                  70                  75                  80

Ser Glu Lys Lys Arg Gly Ile Arg Glu Ile Leu Glu Gly Val Ser Leu
                85                  90                  95

Ala Ile Ala Leu Phe Phe Leu Val Asp Val Leu Met Arg Val Phe Val
            100                 105                 110

Glu Gly Phe Lys Asn Tyr Phe Arg Ser Lys Leu Asn Thr Leu Asp Ala
        115                 120                 125

Val Ile Val Val Gly Thr Leu Leu Ile Asn Met Thr Tyr Ser Phe Ser
    130                 135                 140

Asp Leu Ala Ala Thr Asp Gln Met Pro Gln Met Val Thr Leu Leu Arg
145                 150                 155                 160

Val Leu Arg Ile Val Ile Leu Ile Arg Ile Phe Arg Leu Ala Ser Gln
                165                 170                 175

Gly Asp Pro Ile Gly Thr Gly Phe Pro Phe Asp Pro His Tyr Val Glu
            180                 185                 190

Val Leu Gly Glu Arg Met His Tyr Val Asp Val Gly Pro Arg Asp Gly
        195                 200                 205

Thr Pro Val Leu Phe Leu His Gly Asn Pro Thr Ser Ser Tyr Val Trp
    210                 215                 220

-continued

```
Arg Asn Ile Ile Pro His Val Ala Pro Thr His Arg Cys Ile Ala Pro
225                 230                 235                 240

Asp Leu Ile Gly Met Gly Lys Ser Asp Lys Pro Asp Leu Gly Tyr Phe
                245                 250                 255

Phe Asp Asp His Val Arg Phe Met Asp Ala Phe Ile Glu Ala Leu Gly
            260                 265                 270

Leu Glu Glu Val Val Leu Val Ile His Asp Trp Gly Ser Ala Leu Gly
            275                 280                 285

Phe His Trp Ala Lys Arg Asn Pro Glu Arg Val Lys Gly Ile Ala Phe
        290                 295                 300

Met Glu Phe Ile Arg Pro Ile Pro Thr Trp Asp Glu Trp Pro Glu Phe
305                 310                 315                 320

Ala Arg Glu Thr Phe Gln Ala Phe Arg Thr Thr Asp Val Gly Arg Lys
                325                 330                 335

Leu Ile Ile Asp Gln Asn Val Phe Ile Glu Gly Thr Leu Pro Met Gly
            340                 345                 350

Val Val Arg Pro Leu Thr Glu Val Glu Met Asp His Tyr Arg Glu Pro
            355                 360                 365

Phe Leu Asn Pro Val Asp Arg Glu Pro Leu Trp Arg Phe Pro Asn Glu
        370                 375                 380

Leu Pro Ile Ala Gly Glu Pro Ala Asn Ile Val Ala Leu Val Glu Glu
385                 390                 395                 400

Tyr Met Asp Trp Leu His Gln Ser Pro Val Pro Lys Leu Leu Phe Trp
                405                 410                 415

Gly Thr Pro Gly Val Leu Ile Pro Pro Ala Glu Ala Ala Arg Leu Ala
            420                 425                 430

Lys Ser Leu Pro Asn Cys Lys Ala Val Asp Ile Gly Pro Gly Leu Asn
            435                 440                 445

Leu Leu Gln Glu Asp Asn Pro Asp Leu Ile Gly Ser Glu Ile Ala Arg
    450                 455                 460

Trp Leu Ser Thr Leu Glu Ile Ser Gly Glu Pro Thr Thr
465                 470                 475
```